US011163846B1

(12) United States Patent
Kadayam et al.

(10) Patent No.: US 11,163,846 B1
(45) Date of Patent: Nov. 2, 2021

(54) MULTI-FRONT PROCUREMENT RECOMMENDATION BASED ON QUERY CONTEXT

(71) Applicant: Coupa Software Incorporated, San Mateo, CA (US)

(72) Inventors: Sundaresan R. Kadayam, Cincinnati, OH (US); Mark William Reed, Fort Thomas, KY (US)

(73) Assignee: Coupa Software Incorporated, San Mateo, CA (US)

( * ) Notice: Subject to any disclaimer, the term of this patent is extended or adjusted under 35 U.S.C. 154(b) by 104 days.

(21) Appl. No.: 16/777,704

(22) Filed: Jan. 30, 2020

Related U.S. Application Data

(63) Continuation of application No. 16/523,736, filed on Jul. 26, 2019.

(60) Provisional application No. 62/720,358, filed on Aug. 21, 2018, provisional application No. 62/765,167, filed on Aug. 17, 2018, provisional application No. 62/717,500, filed on Aug. 10, 2018, provisional application No. 62/703,678, filed on Jul. 26, 2018.

(51) Int. Cl.
*G06Q 30/00* (2012.01)
*G06F 16/954* (2019.01)
*G06F 16/9535* (2019.01)
*G06Q 30/02* (2012.01)

(52) U.S. Cl.
CPC ........ *G06F 16/954* (2019.01); *G06F 16/9535* (2019.01); *G06Q 30/016* (2013.01); *G06Q 30/0222* (2013.01); *G06Q 30/0224* (2013.01)

(58) Field of Classification Search
None
See application file for complete search history.

(56) References Cited

U.S. PATENT DOCUMENTS

| 2011/0125867 | A1* | 5/2011 | Denk, Jr. | G06Q 30/02 709/217 |
| 2013/0297697 | A1* | 11/2013 | Haimovitch | G06Q 30/0633 709/204 |
| 2014/0058902 | A1* | 2/2014 | Taylor | G06Q 30/06 705/26.81 |
| 2014/0114728 | A1* | 4/2014 | Kaufmann | G06F 16/217 705/7.39 |
| 2014/0172815 | A1* | 6/2014 | Jammalamadaka | G06F 16/3338 707/706 |
| 2015/0142711 | A1* | 5/2015 | Pinckney | G06Q 30/02 706/12 |
| 2015/0312603 | A1* | 10/2015 | Singh | H04N 21/251 725/93 |
| 2017/0109807 | A1* | 4/2017 | Krishnan | G06Q 30/0253 |

(Continued)

OTHER PUBLICATIONS

STIC EIC 3600 Search Report dated Jul. 13, 2021 (Year: 2021).*
IP.com Search Strategy dated Jul. 6, 2021 (Year: 2021).*

*Primary Examiner* — Matthew T Sittner
(74) *Attorney, Agent, or Firm* — Baker Botts L.L.P.

(57) ABSTRACT

An improved electronic procurement system is disclosed. The electronic procurement system ("system") implements a procurement recommendation framework. The system is configured to learn from past online browsing or transactional activities in a community and cause a display of multiple types of recommendations to a user, who has submitted a query, based on an inferred query context.

18 Claims, 41 Drawing Sheets

(56) References Cited

U.S. PATENT DOCUMENTS

2017/0169500 A1\* 6/2017 Merz .................. G06Q 30/0631
2019/0362278 A1\* 11/2019 Saraf ................ G06Q 10/06316

\* cited by examiner

| User | Department | Region | Query | Result Item | Feedback (T/F) | Action |
|---|---|---|---|---|---|---|
| Sam Harris | IT | UK | Wireless keyboard mouse combo | Huawei Mobile Keyboard BT | Sam Harris originally hid this item for the given query | |
| Sam Harris | IT | UK | Wireless keyboard mouse combo | Huawei Mobile Keyboard BT | 1 | Hide |
| Sam Harris | IT | UK | Tablet keyboard | Huawei Mobile Keyboard BT | 0.45 | Keep |
| Noel Germa | IT | UK | Wireless keyboard mouse combo | Huawei Mobile Keyboard BT | 1 | Hide |
| Britney Wheaton | IT | UK | Wireless mouse | Huawei Mobile Keyboard BT | 1 | Hide |
| John Cena | IT | UK | Mobile keyboard | Huawei Mobile Keyboard BT | 0.2 | Keep |
| Mary Webb | Marketing | UK | Wireless keyboard | Huawei Mobile Keyboard BT | 0.81 | Dampen Relevance |

FIG. 38

4002 Maintain a database containing buyer data and supplier data, the buyer data being related to buyer organization hierarchies and buyer online activities, the buyer online activities including browsing product pages, selecting product data for review, adding products to shopping lists or carts, providing product or supplier reviews, obtaining requisitions or purchase orders, and placing product orders, the supplier data being related to suppliers, products, and invoices 4004 Receive, by the processor, a query associated with a buyer account 4006 Compute a query context for the query that includes buyer items and additional items derived from the query based on the database, the buyer items including a level of an organizational hierarchy in which the buyer account fits 4008 Select a plurality of cognitive advisors from a group of cognitive advisors based on the query context, each of the group of cognitive advisors being a digital model having a distinct set of input parameters and output data, the output data being a recommendation of one or more products or supplier accounts 4010 Execute the plurality of cognitive advisors to generate a corresponding plurality of lists of results 4012 Cause displaying a summary of the plurality of lists of results and detail related to a specific list of results of the plurality of lists of results on one page

FIG. 40

MULTI-FRONT PROCUREMENT RECOMMENDATION BASED ON QUERY CONTEXT

BENEFIT CLAIMS

This application claims the benefit as a continuation under 35 U.S.C. § 120 of application Ser. No. 16/523,736, filed Jul. 26, 2019, which claims priority under 35 U.S.C. § 119 application 62/703,678, filed Jul. 26, 2018, application 62/765,167, filed Aug. 17, 2018, application 62/717,500, filed Aug. 10, 2018, and application 62/720,358, filed Aug. 21, 2018, the entire contents of which are hereby incorporated by reference as if fully set forth herein.

FIELD OF THE DISCLOSURE

One technical field of the present disclosure is digital data analysis, transmission, and display. Another technical field is procurement recommendation based on context data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventional electronic procurement systems allow purchaser procurement systems to interface directly with seller retail systems in order to provide streamlined interfaces for searching, selecting, and purchasing goods. However, many conventional procurement systems have limited features, interfaces, and access options. It would be helpful to have an improved system for electronic procurement.

BRIEF DESCRIPTION OF THE DRAWINGS

In the drawings:

The drawings and detailed description that follow are intended to be merely illustrative and are not intended to limit the scope of the invention as contemplated by the inventors.

FIG. 6 shows an example adaptive navigation interface.

FIG. 30 shows an example interface for providing cognitive recommendations.

FIG. 38 shows an example set of data produced with the relevance learning engine.

FIG. 40 illustrates an example process performed by a server of enabling multiple cognitive advisors in a cognitive advisor framework for processing user queries.

DETAILED DESCRIPTION

Figure 1:
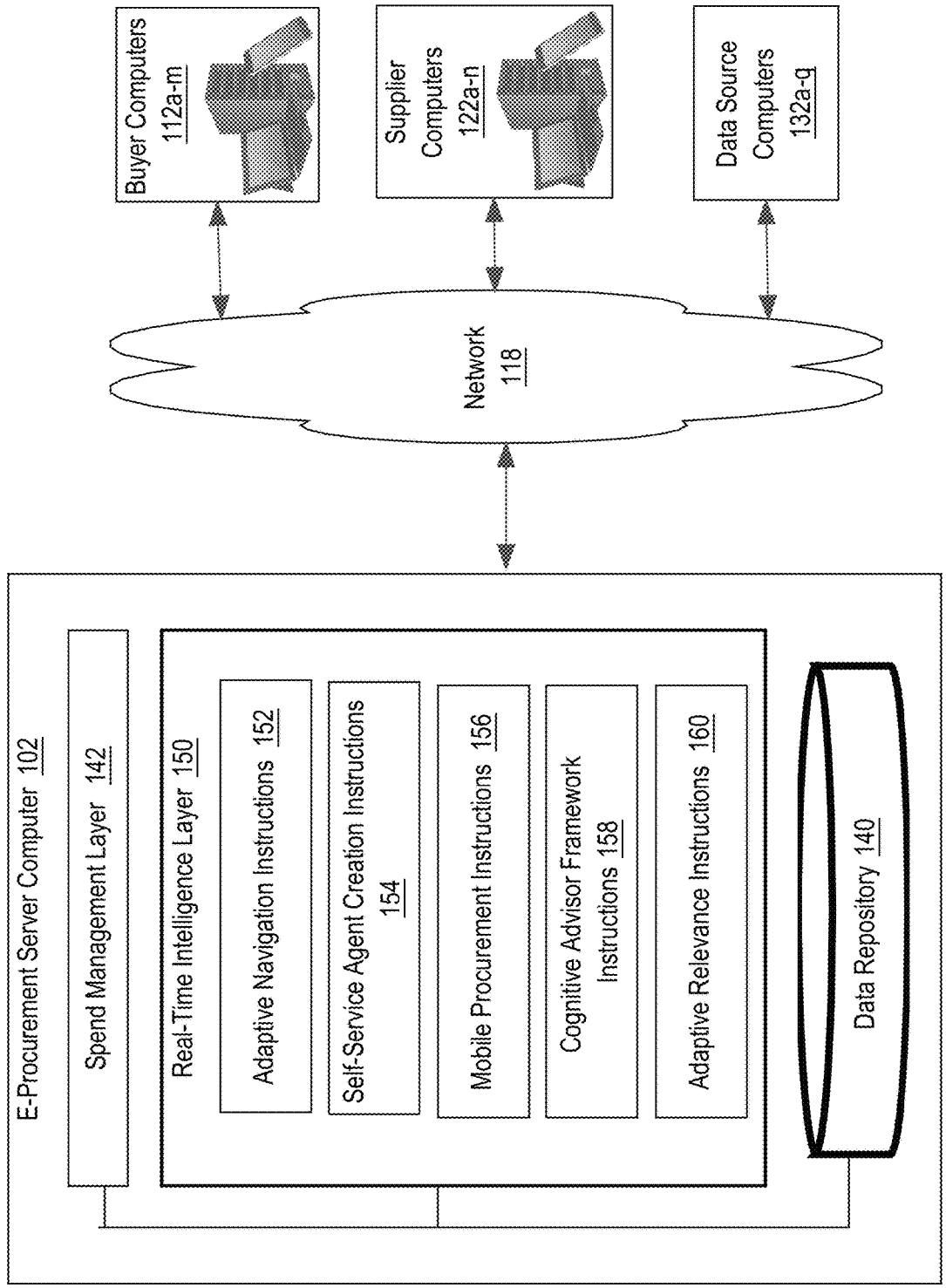
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS AND COMPUTER COMPONENTS
3. FUNCTIONAL DESCRIPTIONS
   3.1. REAL-TIME ADAPTIVE NAVIGATION FOR E-PROCUREMENT
   3.2. SELF-SERVICE AGENT CREATION FOR PROCUREMENT WITH REAL-TIME SELF-HEALING
   3.3. REAL-TIME MOBILE PROCUREMENT
   3.4. REAL-TIME COGNITIVE ADVISOR FRAMEWORK FOR PROCUREMENT
   3.5. REAL-TIME ADAPTIVE RELEVANCE FOR PROCUREMENT
4. EXAMPLE PROCESSES
5. IMPLEMENTATION EXAMPLE—HARDWARE OVERVIEW
6. EXTENSIONS AND ALTERNATIVES 1. General Overview An improved electronic procurement system is disclosed. The electronic procurement system ("system") implements a procurement recommendation framework. The system is configured to learn from past online browsing or transactional activities in a community and cause a display of multiple types of recommendations to a user, who has submitted a query, based on an inferred query context.

In some embodiments, the system is programmed to collect data related to supplier accounts and buyer accounts, including data related to suppliers, buyers, products, product searches, production approval chains or transactions, or supplier or product reviews. The system is programmed to further store at least some of the collected data in a database. The data can be available at various granularities. For example, for suppliers or buyers, the data can be related to industries, organizations, departments, or individuals; for products, the data can be related to industries, categories, makes, or models. The data can be collected directly from supplier accounts or buyer accounts or from external data sources. The data can be collected in response to processing user queries, as further discussed below, or during ordinary user online activities. The data can be collected from explicit user input through graphical user interfaces, such as a button that when pushed indicates a vote for a particular product as being a good match for another product or a comment box configured to accept supplier reviews, or from implicit user behavior that indicates an affinity for parties or items, such as putting a particular item in a shopping cart or paying invoices to a particular supplier within a specific period of time.

In some embodiments, the system is programmed to maintain a collection of "cognitive advisors" or recommendation models. Each recommendation model has certain required input parameters and produces a procurement recommendation. Each recommendation can also have various optional parameters to cover possible information can may be contained in the query context. A recommendation model can be pretrained based on representative data in the database with machine leaning techniques known to one of skilled in the art, in which case the recommendation model acts as a classifier. Alternatively, a recommendation model can directly evaluate individual products or suppliers against the data in the database in response to a user query. One example recommendation model is Best Bets, which may be configured to take a department identifier and a feature identifier and generate a list of product identifiers that identify products having the highest approval rate in terms of the feature identified by the feature identifier among users in the department identified by the department identifier. The Best Bets can work with products covered by the database or other external sources (e.g., punch-out catalogs) that have different values for the feature (e.g., $0$ or $1$) identified by the feature identifier and that are associated with different degrees of approval by buyer accounts of different departments, such as approved by a first department as evidenced from being voted for, selected, or put into a shopping cart, or disapproved by a second department as evidenced from being ignored, hidden, or voted against. The Best Bets can further assign different weights to different types of approval or disapproval actions and compute a recommendation score for each product based on the value for the feature and the degree of approval using the different weights. The different types of approval or disapproval actions can correspond to some of the optional or internal parameters. For example, the action of putting an item in the cart can correspond to an input parameter of the rate of putting this item in the cart over the last three month. The Best Bets or any other recommendation model can have an additional parameter used to control the activeness of the optional parameters and thus the extent of database review, as further discussed below.

Another example recommendation model is Bundles, which may be configured to take a department identifier and a product identifier and generate a list of product identifiers that identify products often purchased together with the product identified by the product identifier by users in the department identified by the department identifier. Yet another example recommendation model is Savings Max, which may be configured to take a region identifier, a product identifier, a desired quantity, and a current time, and generate a list of supplier identifiers that identify suppliers that may offer the best prices in the region identified by the region identifier for the product identified by the product identifier. The system can be configured to further organize the recommendation models, such as by an execution order. For example, when the user query does not refer to a specific product, the Bundles recommendation model can be executed only after the Best Bets recommendation model is executed to generate a list of candidate products.

In some embodiments, the system is programmed to receive a user query, generally associated with a buyer account and related to a procurement activity, such as ordering, approval, purchase, inventory, expense reporting, audit, or market analysis. The system is programmed to next identify a query context based on the collected data or other external data. The query context can include buyer data derived from the identity of the buyer account, or other data derived from the user query. For example, the query may refer to a broad product category or a specific product make and model. The query context can then include the corresponding supplier data. The query may also include general product descriptions, such as "on sale" or "four-star reviews", and the query context may include data retrieved from internal accounts or external sources in real time. The system is programmed to ultimately include a list of key-value pairs in the query context, where the key correspond to possible input parameters of the recommendation models and the values are included in the user query or derived from the database or external sources.

In some embodiments, the system is programmed to match the query context with the input parameters of each of the recommendation models and invoke the recommendation models with matching input parameters in a certain order. During the matching process, certain key-value pairs can also be derived. For example, when the Savings Max recommendation model has a specific input parameter for a minimum required savings amount, the value for the specific input parameter if not already included in the query context can be determined from past values provided by other users in the same department as the user submitting the query. Each recommendation model can have an additional parameter that controls the activeness of the optional parameters, as noted above. The value of this additional parameter can be determined by the complexity of the query or the preference of the buyer account. The query could be built word by word over an extended period of time, and the extent of database review can be continuously updated as the query is being built. In one approach, when the query is relatively short or simple, the value for the additional parameter may indicate a larger number of types of user actions associated with products or suppliers in the database are to be reviewed, and thus a larger number of key-value pairs are to be added to the query context and a larger number of the optional parameters are to be turned on. In this case, the optional parameters may cover actions implicitly showing approval or disapproval or all actions having weights in a recommendation model above a certain threshold. As the query becomes more specific, the system can be configured to automatically skip reviewing certain parts of the database, to focus on actions of explicit approval or disapproval, for example.

In some embodiments, the system is programmed to cause a display of the results outputted by the invoked recommendation models. All the results can be made available to the user through an accordion-style display, for example. Such a display includes a section for each recommendation model and the one section that is selected is expanded to show a list of results produced by the corresponding recommendation model. The list of results can be further expanded in a different portion of the same page. The sections can be ordered by the size of the list of results, a particular score based on how well the query context matches the input parameters or the list of results, or a particular weight based on past user recommendation selection patterns. Such a display allows the user submitting the query to have a clear overview and contrast of the types of recommendation provided by the system and effectively modify or narrow down the focus of the search. For example, the user may initially submit a user query that specifies a particular product hoping to get the product at a low price. After reviewing the recommendations of the products used for the same purpose but preferred by others in the same organization or the products which are most often approved for acquisition within the same department, the user may decide to order one of those recommended products instead, especially when that product also has a low price or is otherwise selected by multiple recommendation models.

The system is programmed to further allow the user submitting the query to cause a display of an explanation for each list of recommendations, which would be based on the list of input parameter values of the corresponding recommendation model. A review of the one or more explanations may prompt the user to override default or automatically inferred values of the input parameters or to update other values to obtain more focused or accurate results. The system is programmed to also record the user's selection and review of different sections and further selection or purchase of the items recommended in the sections to enhance the database and thus improve the recommendation models or the output thereof.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122a-n, one or more buyer computers 112a-m, and one or more data source computers 132, which are communicatively coupled directly or indirectly via one or more networks 118.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112a-m and supplier accounts associated with the one or more supplier computers 122a-n, and facilitating generation and maintenance of digital documents during procurement transactions between buyer accounts and supplier accounts, such as catalogs, purchase requisitions, purchase orders, or invoices. The server 102 also comprises a real-time intelligence layer 150 that is programmed or configured to host or execute functions including but not limited to providing real-time intelligence for electronic procurement.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the fraud detection layer 150 can comprise computer-executable instructions, including adaptive navigation instructions 152, self-service agent creation instructions 154, mobile procurement instructions 156, cognitive advisor framework instructions 158, and adaptive relevance instructions 160. In addition, the server 102 can comprise a database module 140.

In some embodiments, the adaptive navigation instructions 152 enable intelligent online navigation of product information based on data related to past online activities regarding the products, such as selections, requisitions, or purchases.

In some embodiments, the self-service agent creation instructions 154 enable efficient data extraction from various websites based on a user-friendly extraction tool.

In some embodiments, the mobile procurement instructions 156 enable efficient procurement activities via mobile phones which use integrated input devices to obtain procurement data for further processing by a procurement server.

In some embodiments, the cognitive advisor framework instructions 158 enable intelligent preparation and processing of product queries to enhance procurement experience for specific groups of users or procurement targets.

In some embodiments, the adaptive relevance instructions 160 enable filtering or ranking search results based on a combination of relevance scoring algorithms and context-sensitive user input.

In some embodiments, the database module 140 is programmed or configured to manage relevant data structures and store relevant data for functions performed by the server 102. In association with the real-time intelligence layer 150, the data may include web-browsing histories, input data to web agents, mobile phone data, procurement contexts, or relevance scores.

In some embodiments, each of the buyer computers 112*a-m* broadly represents one or more computers, virtual computing instances, and/or instances of an e-procurement application program that are associated with an institution or entity that is related as a buyer with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112*a* may be a personal computer or workstation that hosts or executes a browser and communicates via HTTP and HTML over the network 118 with a server-side e-procurement application hosted or executed at the server 102. In other cases, a buyer computer 112*a* may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122*a-n* broadly represents one or more computers, virtual computing instances, and/or instances of an e-procurement application program that are associated with an institution or entity that is related as a supplier with respect to a separate entity associated with one of the buyer computer 112*a-m*. A supplier computer 122*a* is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over the network 118 with a server-side e-procurement application hosted or executed at the server 102. In other cases, a supplier computer 122*a* may be a server-class computer and/or virtual computing instance that hosts or executes an instance of an e-procurement application that communicates programmatically via API calls, RPC or other programmatic messaging with the server 102.

In some embodiments, each of the data source computer 132*a-q* broadly represents one or more computers, virtual computing instances, and/or instances of a data management application program with a communication interface. A data source computer 132*a* is programmed to manage one or more data sources, receive a request for certain data in the one or more data sources from the server 102, and send a response to the request to the server 102. The data source computer 132*a* can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

3. Functional Descriptions

The inventors have conceived of novel technology that, for the purpose of illustration, is disclosed herein as applied in the context of electronic procurement systems. It should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

3.1. Real-Time Adaptive Navigation for E-Procurement

One advantageous improvement for an electronic procurement system is an intelligent, adaptive, real-time "Browse" experience in a federated universal search environment for e-procurement Marketplaces, using the Collective Wisdom of the Organization. Federated universal search is an information retrieval technology that allows the simultaneous search of multiple searchable resources. A user makes a single query request which is distributed to a plurality of search engines, databases or other query engines participating in the federation. The technology underlying those search engines, databases, or other query engines, however, may be constructed in a variety of formats, programming languages, hierarchies, organizational structures, and more. Even the amount of data provided for specific items may vary greatly between different participants in the federation. This creates a problem unique in the federated e-procurement space which does not exist in traditional e-procurement. Traditional e-procurement does not procure data in real-time nor is the data contextualized or tailored to a specific entity's history. Additionally, even in a federated space consisting of specifically contracted suppliers, those suppliers may still try to upsell or cross-sell additional items that are not relevant to the end-user's specific query. Thus, improvements disclosed and variations thereof, provide real-time, dynamic, adaptive navigation of a more relevant result set to a specific query, in a federated search environment. Additional improvements disclosed herein further enhance the user experience.

Two common capabilities found in business-to-consumer (B2C) or business-to-business (B2B) eCommerce sites are Search and Browse. However, in the context of an e-procurement system which uses a Federated Universal Search environment that combines hosted catalogs with punchouts to create a real-time universal search experience, a Browse interface may be challenging to implement since the organization hosting or maintaining the platform may not be aware of the contents of the punchout sites a priori.

That said, a Browse experience in a federated real-time marketplace for e-procurement may be a desirable feature for a variety of reasons. For example, Universal Search or even supplier-specific search may not be the right access paradigm for all procurement needs, such as in the purchasing of chemicals, biotech cellular samples, and other complex products. Due to the syntax and naming structure involved in such chemical and biological substances, they can be difficult to spell and may require advanced keyboard functions beyond standard keystrokes to accurately type. As a result, such items may be complicated to find using keywords. Since keyword search is the most common querying approach for universal search when users are trying to discover products that might fit their need, followed perhaps by part-number searches when user desires to purchase a specific well-known part or product for which the manufacturer part number or supplier part number is already known, difficulty in accurately typing the name of a product can negatively impact search results.

As another example, products such as nuts, bolts, washers, and other hardware have many dimensions and attributes that describe them, which may make it difficult to find the correct products using keyword queries inside universal search. As yet another example, products such as printer ink, desktop computers, laptop computers, and others which require detailed configuration may have special configuration tools on the given supplier websites and the need is to get the user directly to the page on that supplier website for that tool, something that search is not well suited for, and for which browsing capability may be advantageous.

Many traditional B2B eCommerce sites, and even traditional e-procurement solutions support a familiar browsing interface that uses a taxonomy of categories that the user can use to click and discover subcategories or products available at any level of the taxonomy. This is possible because traditional e-procurement solutions and B2B eCommerce sites both have complete knowledge of all products statically stored and available in advance. In traditional e-procurement systems, these products may be from multiple suppliers, but are provided in advance to the e-procurement system via electronic catalogs of products by suppliers. In conventional B2B eCommerce sites, these products are already known in advance from what the eCommerce provider wants to offer to customers.

These traditional approaches taken to providing the user with a browsing interface are typically not sufficient in a federated real-time e-procurement system for a variety of reasons. For example, in a federated real-time e-procurement system, may not be possible to know about all the products from all the suppliers in advance with total accuracy up to the moment and in real-time. This is because many of the supplier connections may be made in real-time to the supplier's punchout-enabled B2B eCommerce website, and any such website may have a dynamically changing product base and availability.

As another example, each supplier integrated into a federated real-time e-procurement system may be using a different product taxonomy. So, for example, even if the user is searching a set of suppliers, all of whom are "Office Supplies" suppliers, the taxonomy of subcategories in which the products are listed for "Office Supplies" can dramatically vary across the suppliers. As yet another example, the category information may be missing or invisible for any given item found from any given supplier.

As a result, an intelligent browsing experience for the user in a federated real-time e-procurement system could advantageously be constructed differently than what is found in traditional e-procurement systems. Disclosed herein is an implementation that provides an intelligence browsing experience based on an Adaptive Navigation engine that is suitable for a federated universal search environment in e-procurement.

In some embodiments, organization-specific collective product wisdom dataset may be further funneled (with suitable anonymization of data as needed) to a global Product Item Master 210 database. This may also include all the chat collaboration and question box collaboration, to enhance the Product Item Master with both behavioral item data (e.g., selections, purchases), and explicit collective wisdom (e.g., text analysis of chats and question box).

When such a global Product Item Master database is linked to the real-time marketplace, the Adaptive Navigation user experience also enables tapping into the global (beyond the user's organization) collective wisdom on product item selections and purchases, to enable faster and more reliable decisions on product selection.

Figure 2:
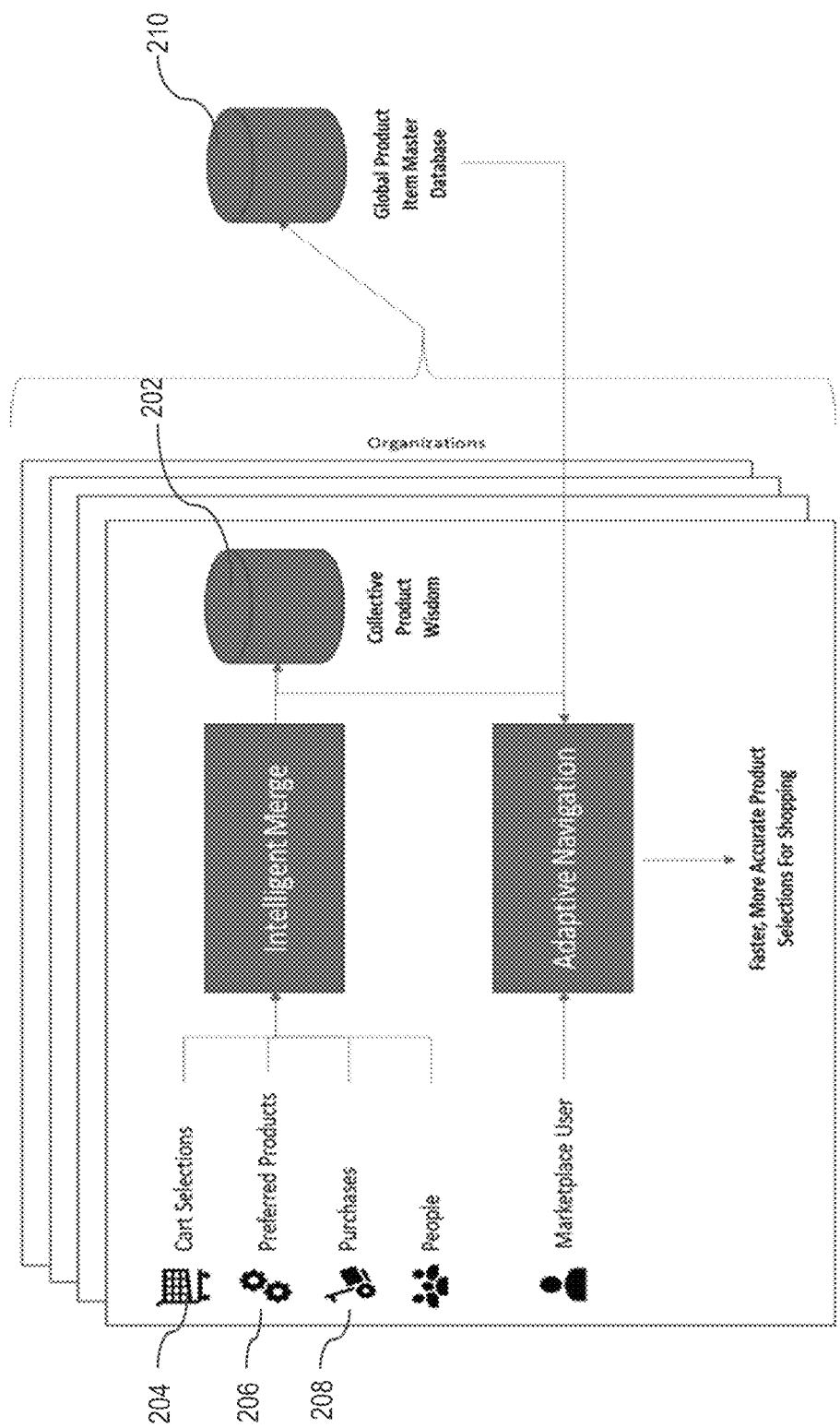
FIG. 2 shows an example adaptive navigation system.

FIG. 2 shows an innovative approach to build an Adaptive Navigation (Intelligent Browse) interface that is suitable for a federated universal search environment in e-procurement. Instead of relying on a conventional Browse/Navigation experience for the entire universe of data out there, some embodiments may include an intelligent and adaptive Browse/Navigation experience that is entirely tuned to the buyer organization which will be using the tailored federated universal search environment in their e-procurement Marketplace.

Such an Adaptive Navigation feature may tap into the collective wisdom 202 of the organization, in terms of the slice of products from the entire universe of available products, that the organization's users have selected, shown a preference for, or purchased before in one or more categories. That is, in some embodiments, an Adaptive Navigation feature may tap into information about item selections 204, item preferences 206, and item purchases 208 by the aggregate of users within the buyer organization, versus all the product data in the entire universe of available products in their real-time marketplace.

In some embodiments, an Adaptive Navigation feature may enable a user to browse through a taxonomy of products that have been selected or purchased before, and may include features such as: the taxonomy of product categories used may be configured by the buyer organization in the e-procurement system, the user can find any product, in any product category that has been selected or purchased before, by browsing through the taxonomy, the user can browse through the entire organization's data, or filter that by their region/division/department/personal as needed, the categories themselves, and the subcategories within those categories, and the items within any given category/subcategory are all listed in order of selection/preference over "all time" OR in "recent time" (which could be in the last month or quarter), and the default sort-order of items listed within a given category or subcategory is based on the frequency of selection or purchase of the items within it.

Figure 3:
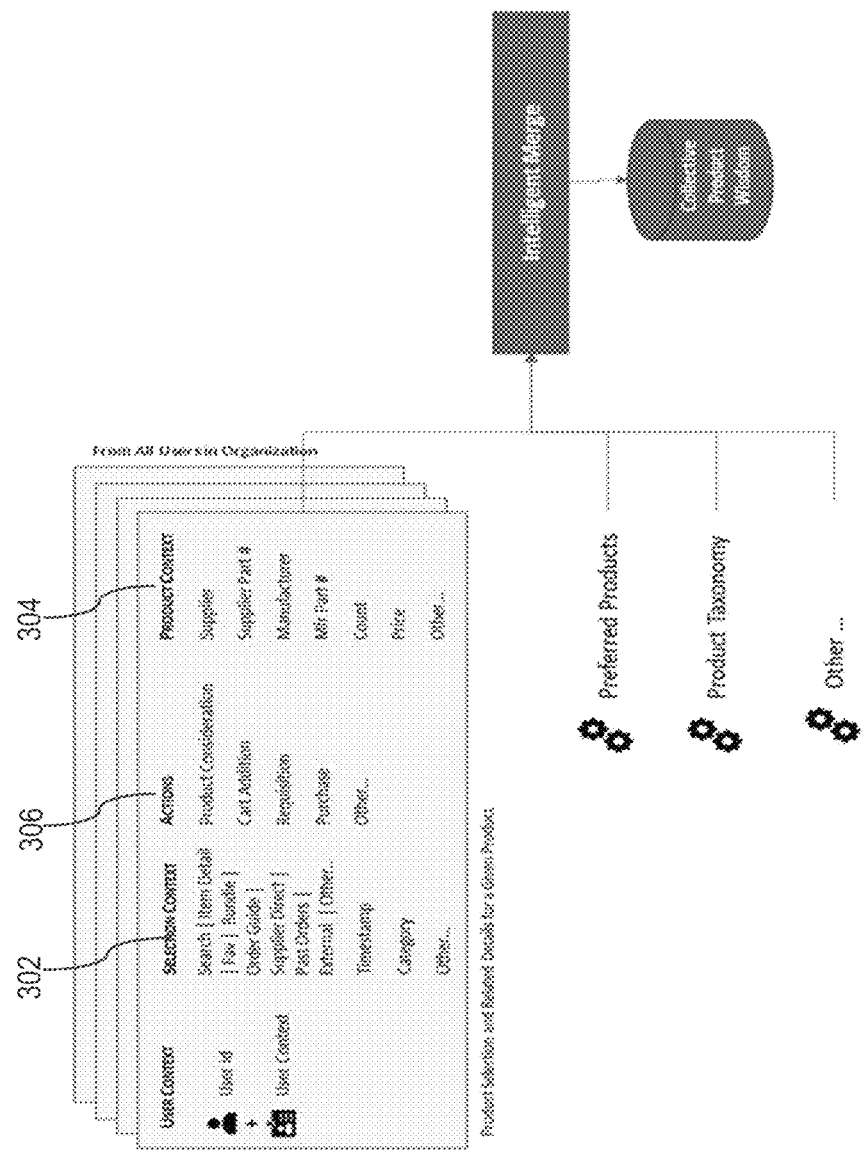
FIG. 3 shows an example method for preparing a collective product wisdom dataset.

In order to implement an example Adaptive Navigation feature, in some embodiments a new dataset may be created through the intelligent merging of search additions to the cart, punchout additions to cart, and order data that may have happened outside of the marketplace. Such a dataset may represent the collective wisdom of the organization as it pertains to product knowledge as it is reflected in product item selections and in product purchases. FIG. 3 shows an example system and method for preparing a collective product wisdom dataset.

This collective wisdom dataset may be built based upon a variety of user actions 306. For example, a user may select a product in a variety of ways, for example, through searching and the search results page, reviewing an item detail page, reviewing their favorites, reviewing organization-created bundles or order guides, visiting a supplier punchout website and finding and adding the item directly to the cart, reviewing a past order, knowing and selecting a product from an external system, or some other method. Such information is collected referred to as the "Selection Context" 302.

Regardless of the Selection Context, in some embodiments a user may perform one or more actions with a given product selected, for example, a user may consider the product by viewing its details, add the product to the cart, submit the cart with the given product in it as part of a requisition to get approval for purchase, purchase an approved product, or other actions ("Actions" overall).

For any given product that was interacted with in any Selection Context, and upon which any of the Actions were performed, a rich Product Context 304 may be captured including information such as: an originating supplier and the supplier part number of the item, the manufacturer and the manufacturer part number of the item, the product category of the item in the product taxonomy, an item quantity, an item price, a clickable link to the target item page on a given supplier site, or to the item detail page of a hosted catalog item on a procurement site or platform, and a user-context including anything that ties the product back to a user, their organization context, or other information.

In addition to this individual product selection information across all products selected by all users in the organization, Preferred Products, the Product taxonomy and other such relevant configuration settings may also be intelligently merged to create the Collective Product Wisdom dataset. Other potential data points that can be integrated include, for example, Product ratings in the form of likes/dislikes and/or product star ratings, Product recommendations in the form of explicit Best Bets, Savings gains from any given product through previous purchases (e.g., potentially via an analytical dataset that is derived for spend and savings analytics).

In some embodiments, a collective product wisdom dataset may be updated continuously in real-time to reflect the up-to-the-moment selection/purchase activity. The Adaptive Navigation user experience may be built on top of this dynamically changing dataset about the continuously evolving nature of product knowledge and product preferences in the organization. In some embodiments, this may be used to provide a user experience of browsing through a marketplace that is very dynamic and adapts in real-time. Compared to the conventional approach of using all marketplace product data to build a static, and generic product browsing experience, an Adaptive Navigation user experience may be naturally tailored to the company's own product preference and product purchasing behaviors.

While it may be useful to build an Adaptive Navigation experience from the entire organization's collective wisdom on product knowledge and product preferences and product purchases, in some embodiments, such a system may also enable the user to narrow down the browsing to just their region (say, they work in US, but organization is global), their division/department (say, they work in the Labs, versus say, the IT department or the Sales department), and even down to their own individual selections and purchases to date. In an embodiment that supports this functionality, the same browsing experience may elegantly present in real-time the slices of collective wisdom that could influence their product choices. For instance, the user may be working in the Labs in the US within the global organization and wish to purchase a new laptop suitable for running their compute-intensive analytical applications. Finding, through browsing (using Adaptive Navigation), the collective wisdom of their own department in their region would provide the most confident pointer to their own product selection in this regard.

Figure 4:
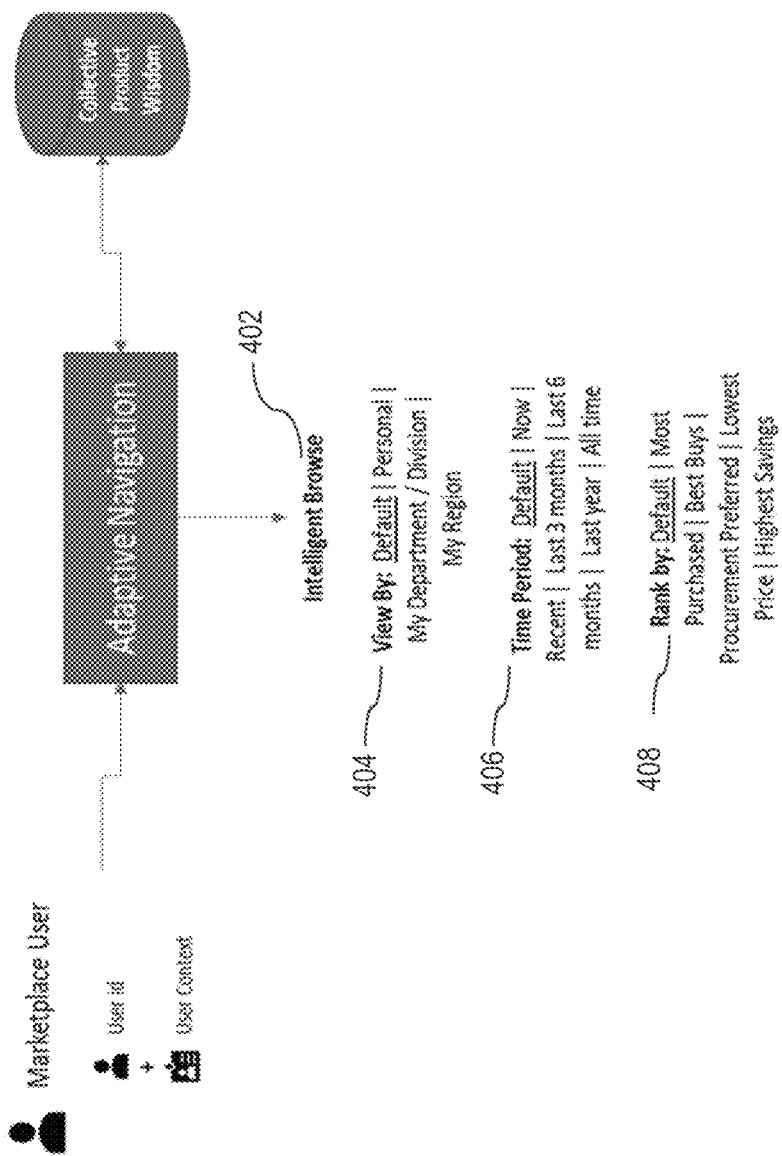
FIG. 4 shows an example method for providing intelligent browsing with an adaptive navigation engine.

FIG. 4 shows an example system and method for providing intelligent browsing 402 with an adaptive navigation engine. The "Default" options for View By 404, Time Period 406, and Rank By 408, for intelligent browsing may be computed based on a variety of factors, for example: the user's current needs as found by current search and browsing patterns, which provides signals of the user's need/motivation at this point in time; the user's selections and purchases in the given category area, which may indicate familiarity or non-familiarity with products in this area; the user's context, including their department/division/working region, and other information; the volume of signals of product selections or purchases in the current category area the user is browsing in; the recency of signals of product selections or purchases in the current category area the user is browsing in; the purchase frequency of products in the given category; the signals of direct recommendations ("Best Buys") made by other users for products in the given category; the configuration settings around preference for suppliers and products in the given category; the historical information of prices for products in the given category; the calculated information of savings for products purchased in the past in the given category; and other similar information that will be apparent to one of ordinary skill in the art in light of this disclosure.

In some embodiments, a series of weights may then be assigned to each of the above criteria and combined with importance of each criteria to calculate internal scores that dynamically drive the "Default" behaviors for the View By, Time Period, and Rank By settings that govern an intelligent browsing experience. In some implementations, the weights and importance of these criteria may also be provided as advanced settings that an organization can control about their Adaptive Navigation experience.

Figure 5:
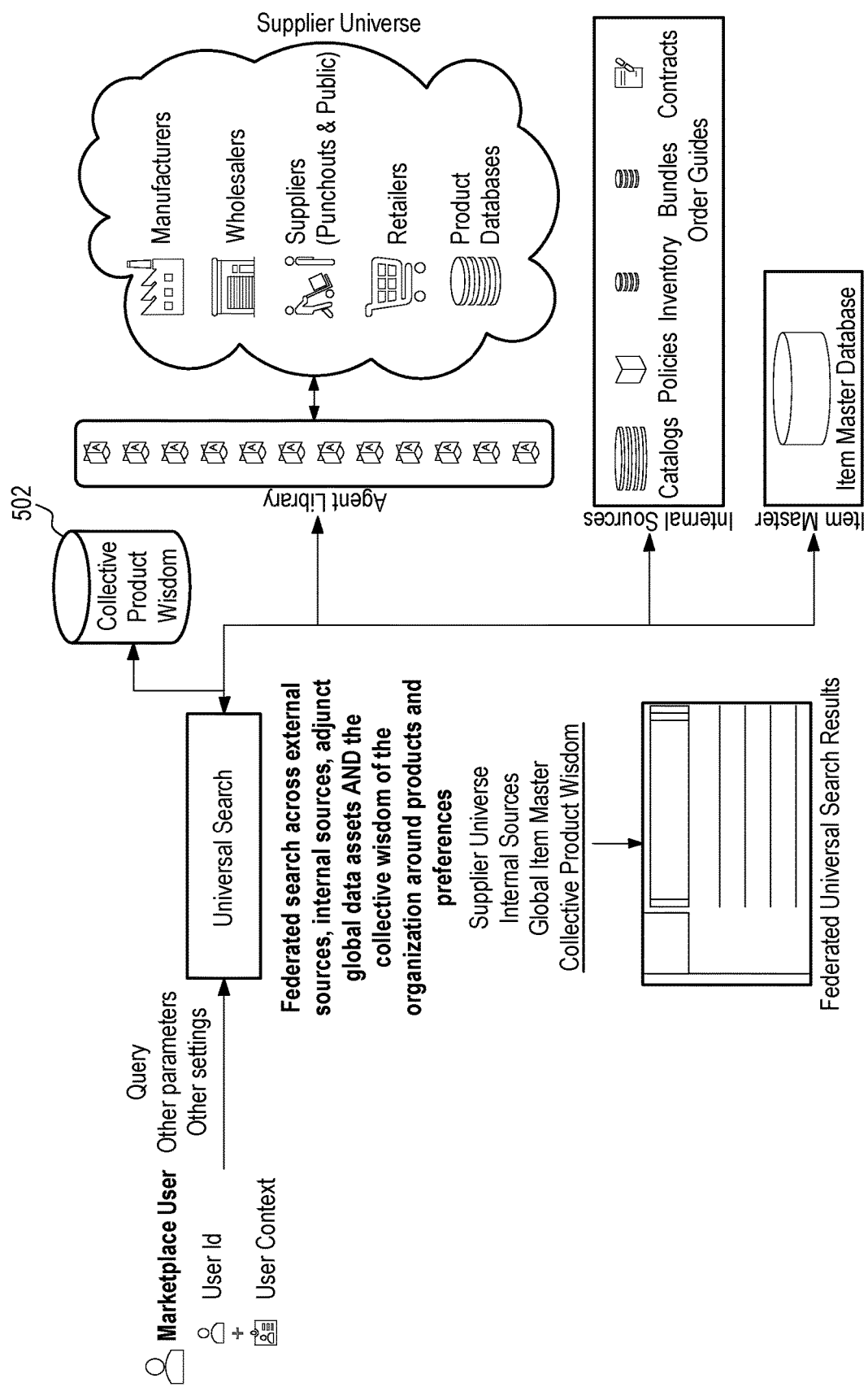
FIG. 5 shows an example method for federated universal search including collective product wisdom.

A federated universal search experience in the marketplace may also be enhanced by enabling this collective product wisdom dataset to be transformed into becoming a searchable source of product wisdom. FIG. 5 shows an example system and method for a federated universal search including collective product wisdom.

As an example, a real-time updating search index can be created with the Collective Product Wisdom 502 database. This search index of Collective Product Wisdom can be incorporated along with other federated search sources in real-time, to enhance the user's experience of Universal Search. Effectively, the user can benefit not only from supplier data that is integrated into the system in real-time, but also the Collective Product Wisdom of how the organization prefers, selects and purchases products up to the moment.

Figure 6:
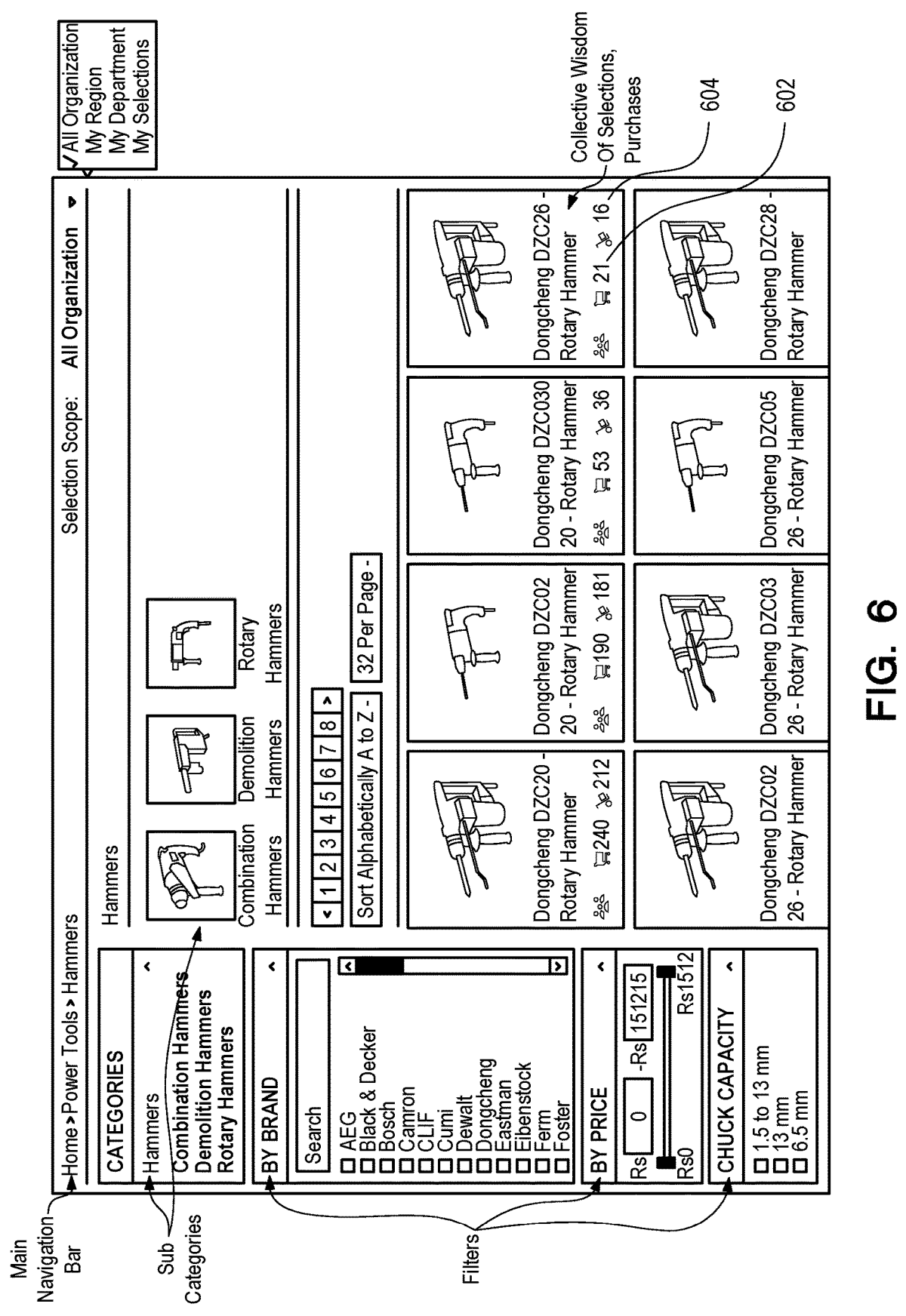

FIG. 6 shows an example Adaptive Navigation Interface. The Adaptive Navigation Interface may have one or more of the following unique enhancements not found in conventional navigation interfaces within marketplaces: each item listed in the browsing interface reveals clearly the number of times the item has been selected 602/purchased 604 and its trend over time, each item listed in the browsing interface also reveals the insight around the trend of selection/purchase across regions/divisions/departments, each item listed in the browsing interface also reveals the most recent individual selectors/purchasers of the given item.

Figure 7:
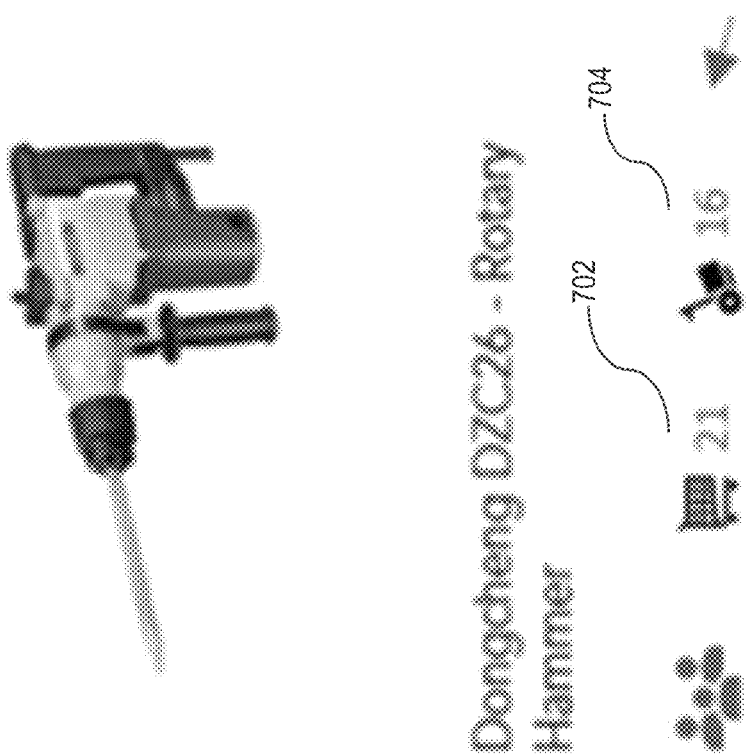
FIG. 7 shows an example collective wisdom interface.
Figure 8:
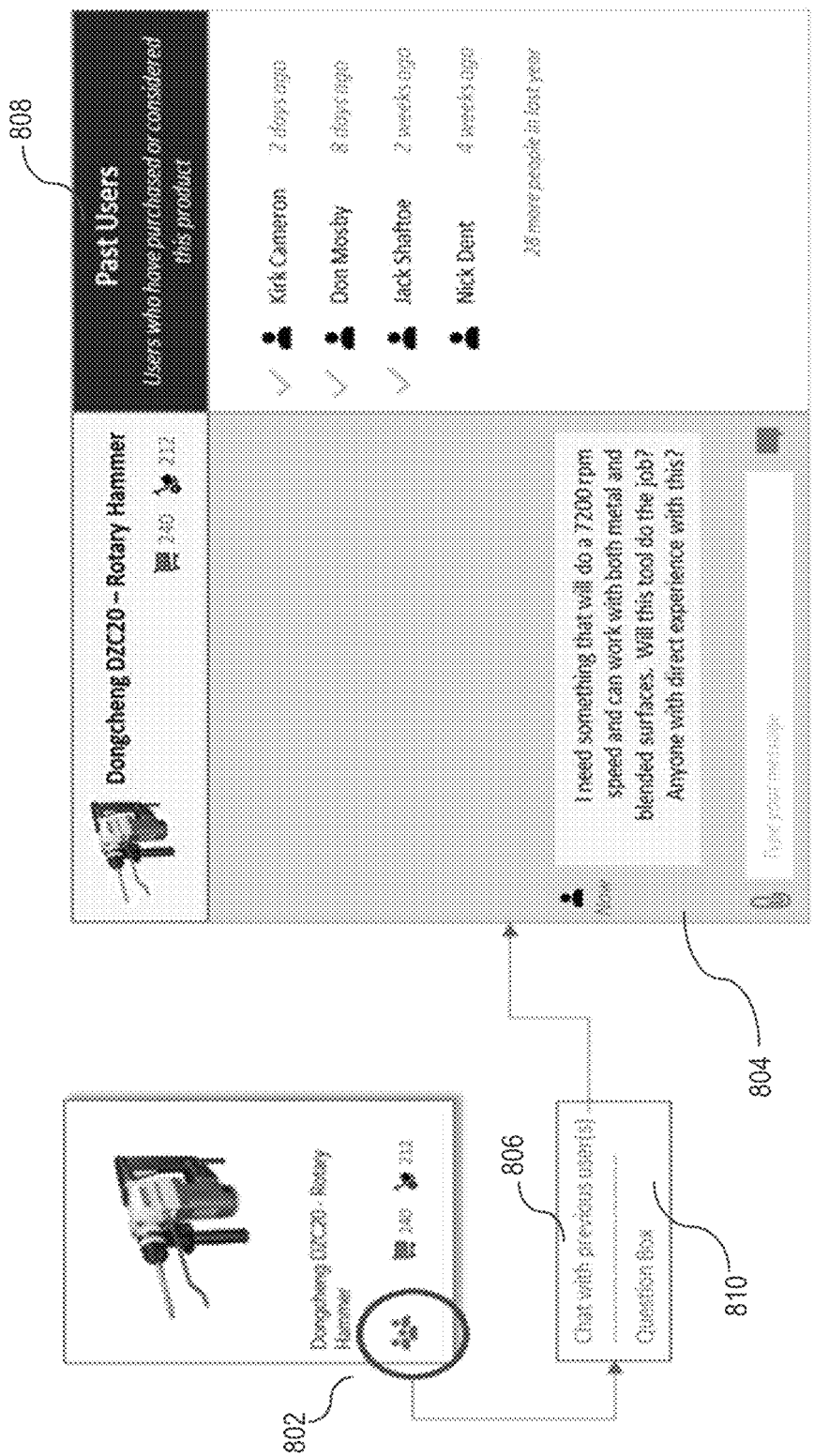
FIG. 8 shows an example collective wisdom chat interface.

FIG. 7 shows collective wisdom associated with product viewable on the Adaptive Navigation Interface, including cart selections 702, purchases 704, and people involved. As shown in FIG. 7, Adaptive Navigation may also facilitate internal organization collaboration to tap into the collective wisdom of the past individual selectors/purchasers of the given item through one or more of the following integrated tools: a real-time chat interface with a selected user (past selector/purchaser of the product), a real-time chat interface with more than one selected user or the entire group of selected users (who have selected or purchased this product before), all real-time chats are saved and preserved within the item detail page for the given item, and are searchable sources of information on product details, a question box that automatically enables collaboration between buying user and previous selected users, the content within which is available to all users, and a searchable source of information on more collective wisdom within the organization about the product FIG. 8 shows an example collective wisdom interface with chat features 802. This chat experience may be advantageous for a variety of reasons, for example: the chat may be purposeful, not casual, and specifically around helping with purchasing a product for a given need in an e-procurement system; the chat may be centered around the specific product in question, that the browsing user is considering; the chat members may be dynamically assembled from the "Past Users" 806, (i.e. users within the organization who have experience in selecting the product for consideration or purchasing the product in the past); the potential chat members 808 may be automatically sorted to indicate those with the most recent selection/purchasing history with the specific product in question, the most experience with product purchases in this category, the most experience with working in the organization with product purchase experience in this category and such, or other criteria; the chat interface 804 itself may operate synchronously (e.g., pulling selected chat members into a real-time chat experience), or asynchronously (e.g., informing selected chat members of the chat history of the chat while they weren't online), and archives itself as a relevant dataset that provides signals of the organization's knowledge around the topic of the specific product in question, a dataset that, when mined, can bring additional signals of wisdom to include in the Collective Product Wisdom database Additionally, in some embodiments, a Question Box 810 may present a specialized interface for users within the organization to ask questions and get answers and view and review answers and rate the answers around a specific product. In some embodiments, Question Box data may be gathered and structured to enable the system to mine and distill additional signals of knowledge and preference within the organization, around the given product, and continually update the Collective Product Wisdom dataset to reflect this.

Adaptive Navigation is a building block that enables new capabilities for e-procurement. For example, a new real-time merchandizing framework that will let supplier partners place special offers in any given category level; provide entire sponsored products segment; and other advantages. These may be particularly useful capabilities when an e-procurement system is used in the context of powering specialized marketplaces. As another example, the proposed Cognitive Advisor framework could be integrated into the Browse interface, and with that in place, a "Related Products" cognitive advisor could recommend related products to browse from any given page, based on an analysis of products frequently selected/purchased together (or some other suitable algorithm).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

3.2. Self-Service Agent Creation for Procurement with Real-Time Self-Healing

Unlike many traditional e-procurement systems, real-time procurement systems utilizing federated search may require instant access to supplier websites. With dynamic and constantly changing content relied upon by real-time procurement systems, it may be advantageous to apply certain innovations disclosed herein which interact with a variety of websites in a variety of formats in near instantaneous ways so that data can be gathered and presented to the user.

Federated search systems bring numerous advantages by allowing a user to search across live data from a variety of data sources. However, to implement federated search, each data source may require that it implement a standardized interface, or an agent may be required be created to translate the custom data source to a standardized interface which the federator can accept. Many current systems for creating these agents can be time consuming. Furthermore, it can require expert staff to build agents. In turn, it is advantageous to have a simple system for creation of agents that non-expert users can utilize.

Another challenge with agents is in maintaining them to be in sync with changes in structure and format and content at the target data sources that they connect to. Without such routine maintenance, agents can fall out of sync with the target data sources and degrade the federated search experience for the users, which in turn may result in a poor user experience, lower user satisfaction and declining user confidence in the system. Just like with agent creation, it can require expert staff to maintain agents as well. Even with expert staff, the maintenance activity may delay the point in time when an agent is detected to have fallen out of synch with its target data source. And in this time window, there may be a degradation in the federated search experience.

Figure 9:
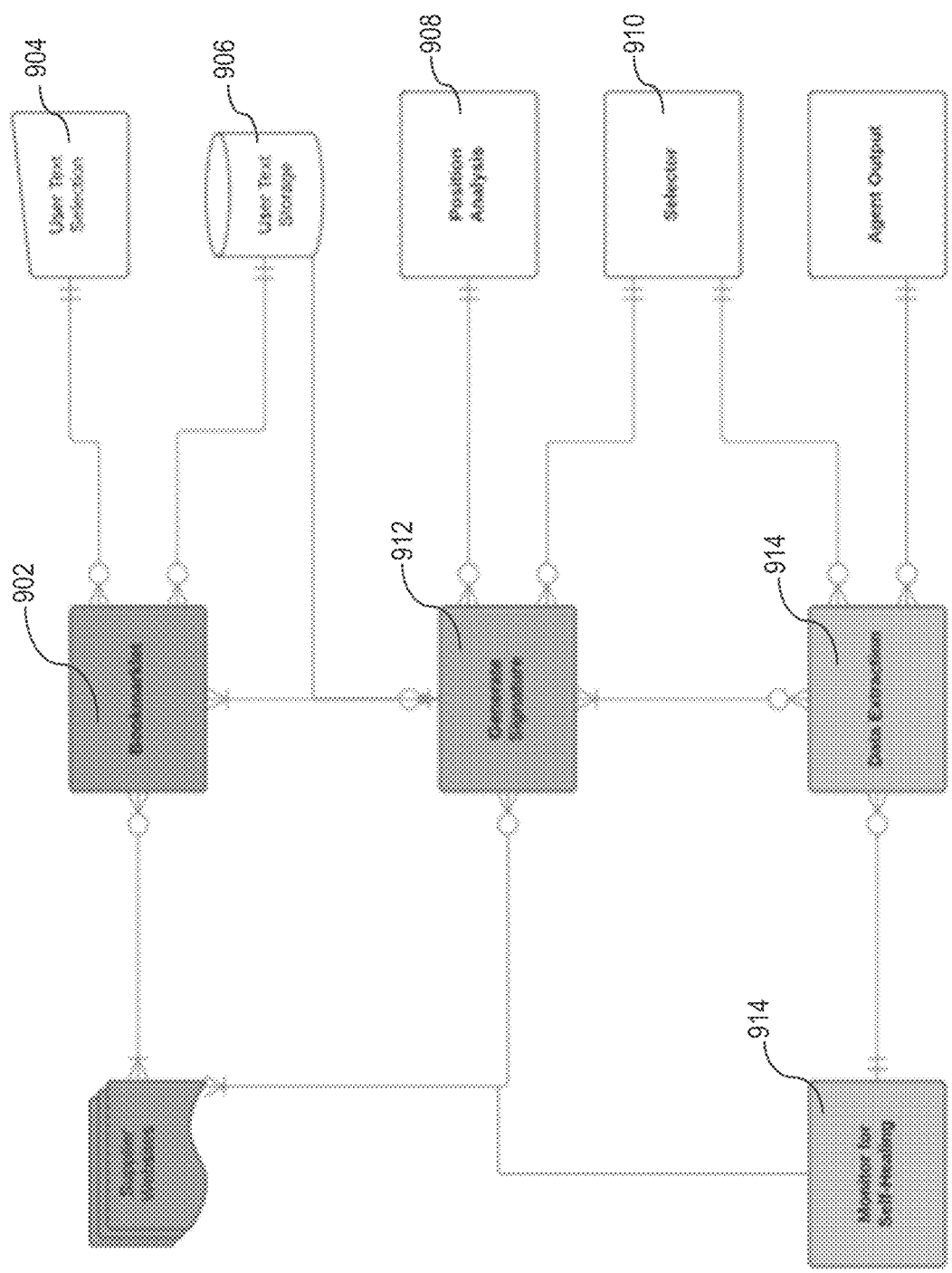
FIG. 9 shows a schematic diagram of a system and process for self service agent creation and self-healing.

Using aspects of the technology disclosed herein, a system such as that shown in FIG. 9 could be implemented that would allow non-expert users to create agents that are simple to create, robust, and incorporate real-time self-healing. Such a system could be both for owners and operators or data sources and for third party service providers to provide agents for those data sources.

In some example federated systems, the first step may be source selection. This may be used to determine the type of data available and the technology to be applied to gather it. In modern ecommerce, this data exists in live websites in custom formats. These might include large vendors selling broad commodity goods such as office suppliers, maintenance repair & operations (MRO), and IT hardware and accessories. Active suppliers may change inventory and prices rapidly and are typically selected as federated search sources.

Figure 10:
FIG. 10 shows an example bookmarklet agent.

One aspect that may be included in this type of system is self-service agent creation. Most data sources of interest have a website, so a primary use case for agents is to connect a federator to a website. In turn, the initial selection of technology could be browser focused. This implementation could include a web-based workflow engine and a bookmarklet 902, as further illustrated in FIG. 10. The workflow engine would list the page types it needs to understand and whether they have been completed. It would also provide a bookmarklet ready for dragging to the browser.

Agent creation may be required to connect a website to the federator. A goal of agent creation may be to create custom configuration data and logic to navigate and retrieve data from a selected data source. This is otherwise known as "user modeling" to capture user behavior and the data presented to the user. This user modeling allows the agent to navigate and retrieve data from the web site.

One novel aspect of the disclosed technology is the creation process and the use of the information gathered in that process for agent creation and maintenance. Unlike traditional methods that either rely on pure visual selection or HTML based selection, some embodiments of the disclosed technology may interact with the user at the text level and automatically build the appropriate configuration and logic for navigation and extraction. This may provide improvements over conventional methods in the way an embodiment interacts with the user and may also reflect innovations in the way certain embodiments may gather, store, process, and/or update that configuration data and logic.

Some embodiments of the disclosed technology may provide a bookmarklet that a user interacts with. A bookmarklet is a small installable module for a browser that can enhance the functionality available in a browser. It is cross browser compatible so can be used on a wide variety of Web browsers. In some embodiments of the disclosed technology, a bookmarklet may be used to interact with a user at the text level, and may be specialized and loaded with code for this purpose. One primary use case for this type of system would be for procurement software which would focus on various page types, including Search pages, Detail pages, and Checkout pages.

Initially, in some embodiments where bookmarklets are present a bookmarklet may be used to make a page selection from a target website. The user could then go to the target website and go to a page they wanted to capture and launch the bookmarklet. The bookmarklet would bring up a form where the user could select the page type 1002 (e.g., Search, Detail, Checkout). Once a page type was selected, it would show the fields 1004 expected for that page type, which would be familiar to the user. For example, an eCommerce website typically has an item title and a price. However, the user would not need to understand website technology like HTML, and could instead recognize item title and price.

At a next step, a user may identify the text of interest for a field in a user text selection process 904. For example, the user might choose to gather the manufacturer of the item. This could be performed by, for example, using a visual browser to identify the HTML element of interest or enter some specification based on the HTML spec (e.g., HTML XPATH or a CSS class).

The user could identify the text of interest in multiple ways. In some embodiments, the user could use the mouse to drag text to the bookmarklet. In some embodiments, the user could enter the text of interest manually.

For items that appear multiple times, the user would identify the first and last item using these methods. In some embodiments, once the text has been identified with the bookmarklet, the page could be searched for that text to identify all elements matching that text as well as the raw structural data such as the HTML XPATH or CSS classes. In some embodiments of this type, as the user marks text, this information may be saved to a database in a user text storage process 906 to create a dataset of text snippets and HTML signatures tied to that URL for testing and self-healing.

When the user identifies an element, it copies the text, but it also determines a signature in a signature generation process 912, the signature being a string that represents that selection on the page along with all the HTML details about position in a position analysis process 908. The code that builds the selector 910 takes two signatures and generates an optimized rule that captures the data but is largely immune to unrelated page changes to keep it from being as brittle. A stored signature could also be used to validate the page. It would also allow this marking to be done on multiple pages (i.e., some sites have various ways they show search results) and then "compile" that info into a set of rules, which could work across different page types across complex web sites.

In some embodiments, the underlying code builds a normalized string representation of the path. This not only includes a CSS selector, but position information within the entire document (e.g., the 5th H3 element) and within the localized area (e.g., the 3rd sibling H3). This gives richer position information for pattern matching. Pattern matching algorithms can then be applied to the normalized string representation to allow a minimal rule to be built which means all the positional requirements with the minimal amount of specificity. This makes the rule robust and immune to unrelated change on the page, something that traditional pure HTML path-based methods do not accomplish. Table 1 shows an example set of software code that could be executed to implement positional information for the signature as described above. With the signature information available, table 2 shows an example set of software code that could be executed to build a selector automatically using the global and sibling path parts inside the signature.

TABLE 1

Example software code for building positional information for a signature

```
function addPositions(pathpartdetail,node,selector) {
    var allnodes = aqjQuery(selector);
    pathpartdetail.globalPos=allnodes.index(node)+1;
    pathpartdetail.globalCount=allnodes.length;
    var siblingnodes = aqjQuery(node).parent( ).children(selector);
    pathpartdetail.siblingPos=siblingnodes.index(node)+1;
    pathpartdetail.siblingCount=siblingnodes.length;
}
function getSelectedPathParts(selection) {
    var pathparts=[];
    var targetNode;
    if (selection.anchorNode==selection.focusNode)
        targetNode=aqjQuery(selection.anchorNode).parents( );
    else
        targetNode=aqjQuery(selection.anchorNode).parents( ).has(selection.focusNode);
    targetNode.each(function( ) {
        var pathpart = new Object( );
        pathpart.node=new Object( );
        pathpart.node.name=this.nodeName;
        addPositions(pathpart.node,this,this.nodeName);
        if (this.id!='') {
```

TABLE 1-continued

Example software code for building positional information for a signature

```
            pathpartid=new Object( );
            pathpart.id.name=this.id;
            addPositions(pathpart.id,this,"#"+this.id);
        }
        if (this.className!='') {
            pathpart.classes=[];
            var classes = this.className.split(" ");
            for (var i = 0; i < classes.length; i++) {
                if (classes[i]!='') {
                    var classpart=new Object( );
                    classpart.name=classes[i];
                    addPositions(classpart,this,"."+classes[i]);
                    pathpart.classes.push(classpart);
                }
            }
        }
        pathparts.unshift(pathpart);
    });
    return pathparts;
}
```

TABLE 2

Example software code for building a selector from a signature

```
function findKeySelector(firstpathparts,lastpathparts) {
    var selector="!NONE";
    var firstpos=firstpathparts.length-1;
    var lastpos=lastpathparts.length-1;
    while(firstpos>=0 && lastpos>=0) {
        var firstpathpart=firstpathparts[firstpos];
        var lastpathpart=lastpathparts[lastpos];
        if (firstpathpart.node.name!=lastpathpart.node.name)
            return "!MISMATCH";
        if (firstpathpart.node.globalPos==1 &&
lastpathpart.node.globalPos==lastpathpart.node.globalCount) {
            selector=firstpathpart.node.name;
            break;
        }
        if (firstpathpart.hasOwnProperty("id") && lastpathpart.hasOwnProperty("id")) {
            if (firstpathpart.id.name==lastpathpart.id.name) {
                if (firstpathpart.id.globalPos==1 &&
lastpathpart.id.globalPos==lastpathpart.id.globalCount) {
                    selector="#"+firstpathpart.id.name;
                    break;
                }
            }
        }
        if (firstpathpart.hasOwnProperty("classes") && lastpathpart.hasOwnProperty("classes")) {
            var match=false;
            for (var i=0; i<firstpathpart.classeslength; i++) {
                for (var j=0; j<lastpathpart.classes.length; j++) {
                    if (firstpathpart.classes[i].name==lastpathpart.classes[j].name) {
                        if (firstpathpart.classes[i].globalPos==1 &&
lastpathpart.classes[j].globalPos==lastpathpart.classes[j].globalCount) {
                            selector="."+firstpathpart.classes[i].name;
                            match=true;
                            break;
                        }
                    }
                }
                if (match)
                    break;
            }
        }
        firstpos--;
        lastpos--;
    }
    if (selector!="!NONE") {
        firstpos++;
        lastpos++;
        while(firstpos<firstpathparts.length && lastpos<lastpathparts.length) {
            var firstpathpart=firstpathparts[firstpos];
```

TABLE 2-continued

Example software code for building a selector from a signature

```
            var lastpathpart=lastpathparts [lastpos];
            if (firstpathpart.node.name!=lastpathpart.node.name)
                return selector+"!MISMATCH";
            var append='';
            if (firstpathpart.node.siblingPos==1 &&
lastpathpart.node.siblingPos==lastpathpart.node.siblingCount) {
                selector+=">"+firstpathpart.node.name;
            }
            else if (firstpathpart.node.siblingPos==lastpathpart.node.siblingPos) {
                selector+=">"+firstpathpart.node.name;
                if (firstpathpart.node.siblingCount>1)
                    selector+=":nth-of-type("+firstpathpart.node.siblingPos+")";
            }
            else if (firstpathparthas.OwnProperty("id") && lastpathpart.hasOwnProperty("id") &&
firstpathpart.id.siblingPos==1 && lastpathpart.id.siblingPos==lastpathpart.id.siblingCount) {
                selector+=">#"+firstpathpart.id.name;
            }
            else if (firstpathpart.hasOwnProperty("id") && lastpathpart.hasOwnProperty("id") &&
firstpathpart.id.siblingPos==lastpathpart.id.siblingPos) {
                selector+=">#"+firstpathpart.id.name;
                if (firstpathpart.id.siblingCount>1)
                    selector+=":nth-of-type("+firstpathpart.id.siblingPos+")";
            }
            else if (firstpathpart.hasOwnProperty("classes") &&
lastpathpart.hasOwnProperty("classes")) {
                var match=false;
                for (var i=0; i<firstpathpart.classes.length; i++) {
                    for (var j=0; j<lastpathpart.classes.length; j++) {
                        if (firstpathpart.classes[i].name==lastpathpart.classes[j].name) {
                            if (firstpathpart.classes[i].siblingPos==1 &&
lastpathpart.classes[i].siblingPos==lastpathpart.classes[i].siblingCount) {
                                selector+=">."+firstpathpart.classes[i].name;
                                match=true;
                                break;
                            } else if (firstpathpart.classes[i].siblingPos==lastpathpart.classes[i].siblingPos) {
                                selector+=">."+firstpathpart.classes[i].name;
                                if (firstpathpart.classes[i].siblingCount>1)
                                    selector+=":nth-of-type("+firstpathpart.classes[i].siblingPos+")";
                                match=true;
                                break;
                            }
                        }
                    }
                }
                if (!match)
                    return selector+"!CHILDMISMATCH-"+firstpathpart.node.name;
            }
            else
                return selector+"!CHILDMISMATCH-"+firstpathpart.node.name;
            firstpos++;
            lastpos++;
        }
    }
    return selector;
}
```

Once the bookmarklet has the structural element (or the first and last element for collections of elements), it may automatically determine a CSS selector rule and then immediately test it on the same page showing the count and the items captured. In this manner, the process is simplified for some embodiments so that the user only has to highlight text or an item and press a button, then briefly check the results. The user may not need to understand CSS selectors (or other relevant elements, depending on the embodiment) of the underlying technology, though in some embodiments such views could be provided in an expert panel for those expert users that wish to see it.

As an example of the described process, a user might identify the first and last item on the page. The automated bookmarklet would identify the CSS class of that item. For example, the class might be item. It would then list all items for verification by the user.

The user would then repeat for each page type and the workflow would show the agent was complete. All associated information may be stored in a database for later use. In some embodiments, this may include the URL off each page, original text, the signature, the automatically created selector, and the data gathered by the selector. Unlike traditional systems, in some embodiments of the disclosed technology, original pieces of information associated with the text may be saved for later use. This may be advantageous for and enable later maintainability because it captures the user interaction in gathering text separate from the algorithm to determine position. This can be used to allow automated tasks to regenerate the later steps automatically without requiring user interaction which supports self-healing.

Further improvements would focus on workflow within the data source. There is a fair amount of the complexity around handling all the workflow in an agent (e.g., clicking to expand sections so that it can view expanded data). In turn, the bookmarklet may advantageously have capabilities in that area.

One other advantage of this approach is that it is standards based around HTML/CSS/JS. They do not require special plugins or development tools. Every modern browser has what we need built in. Furthermore, for expert users, the rules would be understandable and could be viewed and edited using standard test frameworks (e.g. a jsfiddle type interface to customize and test the code).

For "standard" data sources (e.g., magenta or shopify), the bookmarklet could be preloaded with rules and automatically retrieve information for verification. The end user would just need to verify the results to create an agent and edit anything they wanted to change.

The disclosed system is also capable of real-time self-healing. This is possible through use of the data the bookmarklet captures for rebuilding a rule from text enabling the system for self-monitoring. Since an embodiment may know the text that is desired, it can continuously monitor the results of the selector in a self-healing monitoring process 914 to ensure it continues to gather the proper text. The system can use the saved text to find that text in a data extraction process 916 and generate the signature and then automatically create a CSS rule that allows for self-healing. It then has the tools to automatically identify the text, as if the user entered it, and build an updated rule. By storing text snippets, the agent creation process can be recreated as if a user was doing it, but without user action and generate a new update agent matching the updated data source.

For self-healing, the URL, the expected text, and the previous results from the selector are retrieved from the database. The URL can then be retrieved to gather the data in the current website structure, which might have changed since original creation. The self-healing agent feature can then regenerate signatures and selectors based on text. If it generates the same data as the stored data from the previous results, the agent can be updated with the updated selector and no user interaction is required.

In some embodiments, if there are deviations in results, the differences can be presented to a user in a custom UI showing the previous text and new text. In some implementations this may be accomplished by color coding the presented text similarities in difference. This may be used to support quick validation by the user, and avoid the time and cost of new agent creation.

In turn, an agent deployed in a production federated search environment can use automated error checking in working with a target web site, and trigger the self-healing step as needed, and recover from such errors gracefully in real-time. This approach may dramatically reduce manual maintenance on the part of experts to maintain agents, and may dramatically increase the uptime of a satisfying federated search experience for users.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

3.3. Real-Time Mobile Procurement

With the rise of smart phones and devices with personal assistants (like Alexa, Google, Siri etc.), people are increasingly exposed to faster and novel ways of getting things done. Touch, tap, speak, gesture and get things done no matter where you are. With the rise in success of AI technologies, have a personal assistant remind you, do things for you. This is a world far removed from the more complex, confusing world of e-procurement.

The Case for Real-Time Mobile Procurement

Mobile smart phones and device use is dramatically increasing and is already becoming ubiquitous in a personal setting. In the workplace, which always seems to lag the personal/consumer experience, security, access, and other rules tend to clamp down on the freedom and ease of access that the mobile-armed person desires today.

In a Procurement context, vendors have made efforts to extend traditional e-procurement systems to a mobile environment to streamline steps of the procure-to-pay (P2P) process, like receiving notifications, reviewing and approving requisitions and the like.

Vendors have also brought a shopping experience to the mobile to enable a professional to make purchases on the go. However, these attempts are limited to exposing only the product content available via hosted catalogs.

Furthermore, as new interaction methods are taking root in a person's personal experience with mobile and smart devices, there is the opportunity to rethink their application to procurement functions.

Furthermore, there are notable reasons why this sort of mobile experience of real-time universal search for e-procurement is not feasible with traditional approaches today. Supplier websites are not uniformly mobile enabled. Not all suppliers have a mobile enabled website, and as a result are nearly unusable by users in a mobile environment. Within the subset of suppliers with good mobile enabled websites, not all of them support a punchout capability, which is a basic building block for being able to connect them into a e-procurement system in a mobile environment. Due to network security issues, a user may not even be able to get to the enterprise resource planning (ERP) from the mobile device to start with, especially if the user is traveling and are not there on their organization's network. Yet, the value of a mobile e-procurement experience for a user is to let them access it regardless of where they are located at a given point in time, and search and buy what they need from anywhere. Additionally, the user's e-procurement experience typically starts by punching out from an ERP application to the e-procurement system. ERP mobile access, like supplier web site mobile access, is not uniformly available across the ERP systems in the market today.

A system is disclosed for real-time mobile e-procurement with the ability to deliver a real-time universal search experience and other real-time capabilities to the user via a mobile app, while fitting into the security architecture of the organization, the connection needed with the ERP, and the connection needed with myriad, diverse, supplier punchout websites.

Figure 11:
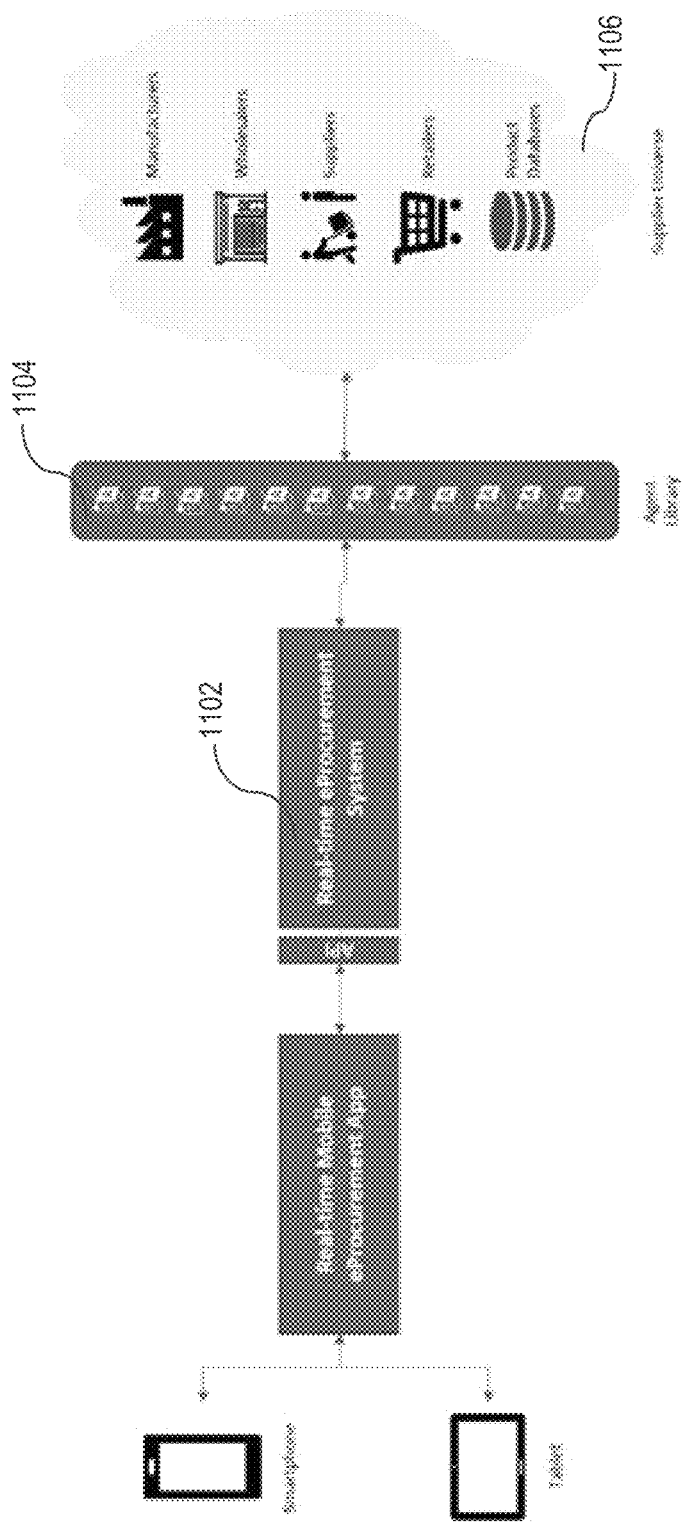
FIG. 11 shows an example real-time mobile procurement system.

FIG. 11 illustrates an environment in which embodiments of the system can be implemented. In some embodiments, the system 1102 manages an agent library 1104 with respect to a supplier universe 1106 to improve mobile procurement.

Mobile Real-Time Punchout Supplier Search

Punchout technology was originally created to enable an ERP system or a Procurement system to securely access a tailored supplier website which has been suitably customized to reflect the contract between that supplier and the buying organization. Supplier websites are either not mobile enabled in the first place, and if they are, they may not be mobile punchout enabled. For these reasons, it is difficult to get to and search an individual supplier's punchout website.

Figure 12:
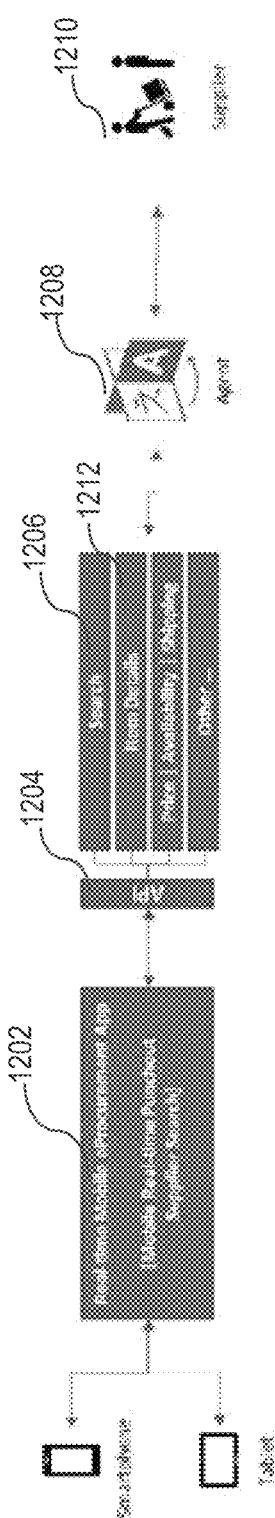
FIG. 12 shows an example mobile real-time punchout supplier search.

FIG. 12 shows an example mobile real-time punchout supplier search. In some embodiments, the system is configured to let the mobile user be able to search or browse a given supplier's punchout site within the mobile experience. The user of the mobile app is authenticated with the ERP via a server-side process. An authenticated user is able to access an interface on the mobile app 1202 to search a given supplier's punchout website. In the mobile search interface of a given supplier's punchout website, the user is able to do a query like they would be able to via the e-procurement system's website. The query is relayed to a server-side process via an API 1204 that is tuned to perform a search 1206 the given supplier's punchout website. The server-side process initiates the "agent" 1208 configured to search the given supplier punchout website 1210. The configured agent for the given supplier punchout website logs into the supplier punchout website and interacts with it in real-time and streams results and status back to the calling server-side process. The real-time results and status are streamed by the server-side process back to the mobile device. The mobile device implements a real-time streaming user experience that streams the found results from the supplier's punchout website so that the user is able to see results as they arrive.

In some embodiments, the user is further able to view the item detail page of a given search result from the supplier's punchout website. When the user taps on the item within the search results in the mobile interface, the mobile app relays the action via an API that is tuned to fetch item details 1212 for the given item from the given supplier's punchout website. The server-side process initiates an "agent" request to the agent that is configured to interact with the given supplier website. The configured agent, in turn, initiates an interaction with the supplier punchout website to walk into the item detail page, interact with the item detail page to discern the specific item details on the page, including item description, item attributes and item specifications if any, item images and videos if any, and transform that into a structured form, and send it back to the calling server-side process. The item details in structured form are streamed by the server-side process back to the mobile device. The mobile device implements a suitable rendering of item details including any interactions possible from the item details page like item comparison, item checkout etc.

Mobile Real-Time Universal Search

The foundation for real-time mobile procurement is the ability to access the entirety of available product assets and information assets via a real-time universal search. This would include all product catalogs, contracts, policies, bundles, order guides, supplier punchout sites, inventory and more, all made accessible via a single mobile real-time universal search. This would enable a person to avoid dependence on their desktop-based access to the procurement marketplace, and be able to do their purchasing on the mobile, compliant with procurement strategies.

Figure 13:
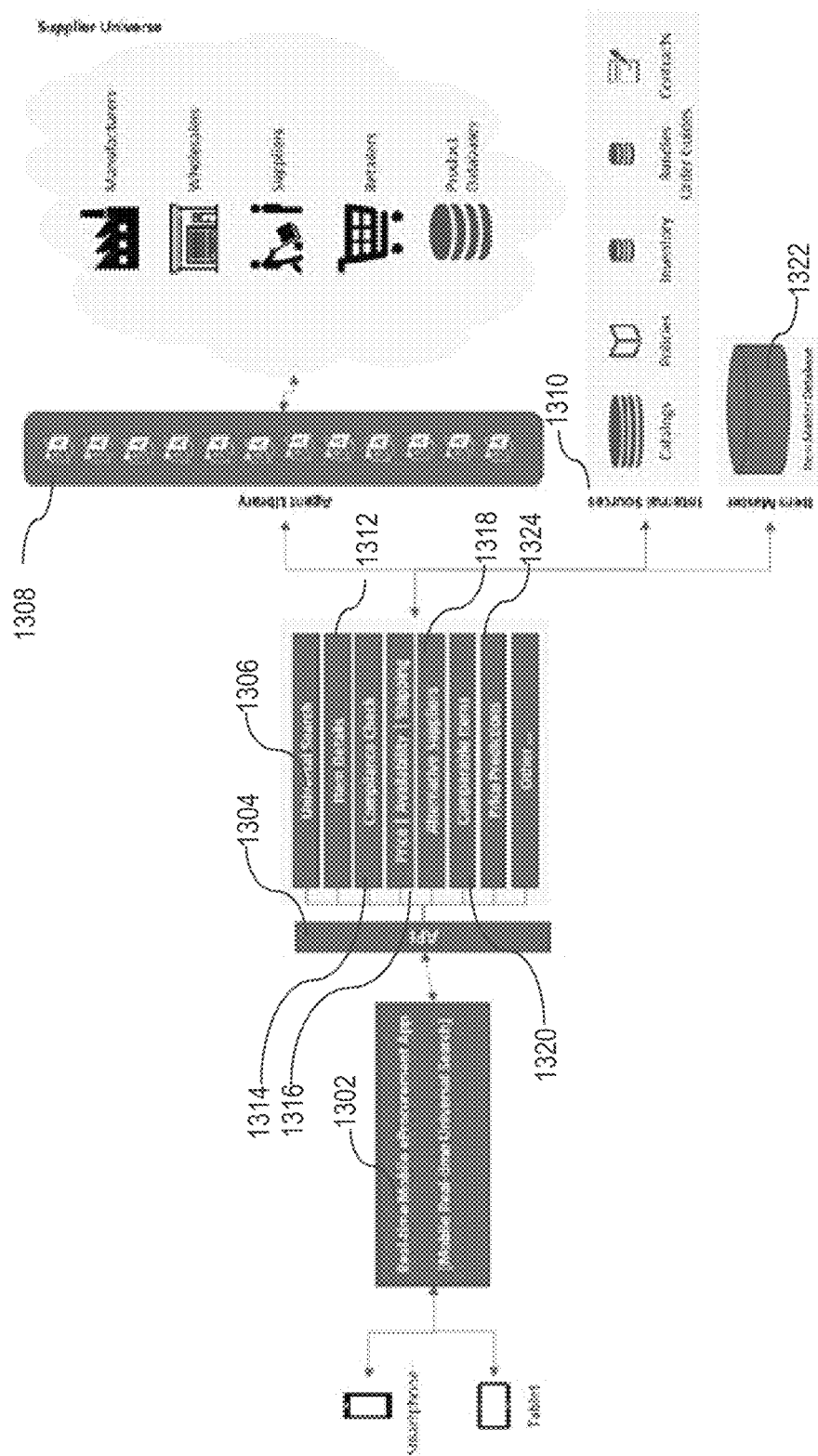
FIG. 13 shows an example mobile real-time universal search.

FIG. 13 shows an example mobile real-time universal search. In some embodiments, a system is disclosed for enabling to the user to benefit from the entire real-time universal search experience from the mobile device. The user of the mobile app is authenticated with the ERP via a server-side process. An authenticated user is able to access an interface on the mobile app 1302 to search a given supplier's punchout website. In the mobile search interface for universal search, the user is able to do a query like they would be able to via the e-procurement system's website. The query is relayed to a server-side process via an API 1304 that is tuned to perform a search 1306 the given supplier's punchout website. The server-side performs the guided buying process which selects the best suppliers suitable for the given query based on machine learning and supplier configurations. The server-side process initiates the "agents" 1308 configured to search the selected supplier punchout websites, and also initiates searches of hosted internet sources 1310 including catalogs, bundles, order guides, contracts, policies, inventory data sources in parallel. In the event of searching a given supplier punchout website, the "agent" for that supplier punchout website logs into the supplier punchout website and interacts with it in real-time and streams results and status back to the calling server-side process. The real-time results from all selected sources in universal search, as well as status updates are streamed by the server-side process back to the mobile device. The mobile device implements a real-time streaming user experience that streams the found results from the universal search so that the user is able to see results as they arrive. Relevance ranking and organization preference of supplier and items as the case might be are applied to get the final relevance ranked list for the user on the mobile device.

In some embodiments, the user is further able to view the item detail page of a given search result from the supplier's punchout website. When the user taps on the item within the search results in the mobile interface, the mobile app relays the action via an API that is tuned to fetch item details 1312 for the given item from the given supplier's punchout website. The server-side process initiates an "agent" request to the agent that is configured to interact with the given supplier website. The configured agent, in turn, initiates an interaction with the supplier punchout website to walk into the item detail page, interact with the item detail page to discern the specific item details on the page, including item description, item attributes and item specifications if any, item images and videos if any, and transform that into a structured form, and send it back to the calling server-side process. The item details in structured form are streamed by the server-side process back to the mobile device. The mobile device implements a suitable rendering of item details including any interactions possible from the item details page like item comparison, item checkout etc.

In some embodiments, when user adds an item to the mobile cart, a compliance check is performed on the item to ensure it matches with the sourced contract for that supplier. A server-side process receives a compliance check request, and dispatches the "agent" configured for that supplier punchout website, as applicable, and fetches the price of the specific chosen item, and checks that against the contract for that supplier in the system in a compliance check 1314. The server-side process streams the results of the compliance check back to the mobile device.

In some embodiments, real-time information on pricing, availability, shipping options are not always visible via traditional e-procurement systems. Within an item detail page or in the mobile cart interface, the pricing/availability/shipping and other details can be gathered from the given supplier's punchout website in real-time. A server-side process receives the user's request to get real-time pricing/availability/shipping information 1316 and uses the "agent" configured for the given supplier's punchout website and interacts with the given item's page(s) on the given supplier punchout website and brings back the needed information as present. The mobile app presents the streamed information from the server-side as needed for the user to consume this information.

In some embodiments, in a private marketplace that is configured to have competitive suppliers in purchasing categories, a real-time check for alternative suppliers can be made, for the items selected by the user in the mobile cart. From the mobile cart, when the user initiates a mobile checkout action, the app initiates a request to find if there are alternative suppliers providing the items selected in the cart along with considerations for preferred items, lower priced items, items with different delivery windows and lower shipping cost or faster shipping etc. A server-side process kicks of a specialized search for alternative suppliers 1308 for each one of the selected items in the mobile cart in parallel, and as matches appear, and verified for relevance, the items are streamed back to the mobile device. The mobile interface, in turn, presents potential alternative supplier choices with the relevant information surrounding the same, and lets the user pick and replace the mobile cart item in question with better alternatives that may be provided.

In some embodiments, often, for a given product selection made by the user, there may be other comparable brands or models or packaging variants, that may be better selections from a pricing, availability or other considerations. The mobile interface may present to the user the option to consider broadly comparable items to the one they are considering adding to the mobile cart. In this event, the mobile interface requests the server for comparable items for the selected item in question. The server-side initiates a lookup for comparable items 1320 using the Global Item Master Database 1322 for items that are similar to the given item being selected, and as candidate results are found, they are streamed back to the mobile app with the relevant details to enable the user to make wiser choices on their item selections. The mobile interface presents the comparable items with the choice for the user to swap the item currently selected with an item from the comparable items set.

In some embodiments, the system is configured to determine whether this is a good time to purchase a given product. Based on historical pricing information and a price prediction algorithm that models pricing trends, a price trend and price prediction can be made. This can be based on individual product pricing trends or can be based on market baskets for selected categories. The mobile interface initiates a request for pricing predictions and a server-side process performs a price trend and prediction lookup, which in turn, uses the pricing history data from the Global Item Master database 1322 as needed to provide pricing trend and prediction information 1324 back to the user. The pricing trend and prediction information can be suitably presented, potentially with a chart on the pricing trend, and potentially with a price prediction and purchasing recommendation.

Figure 14:
FIG. 14 shows an example mobile interface home screen.
Figure 15:
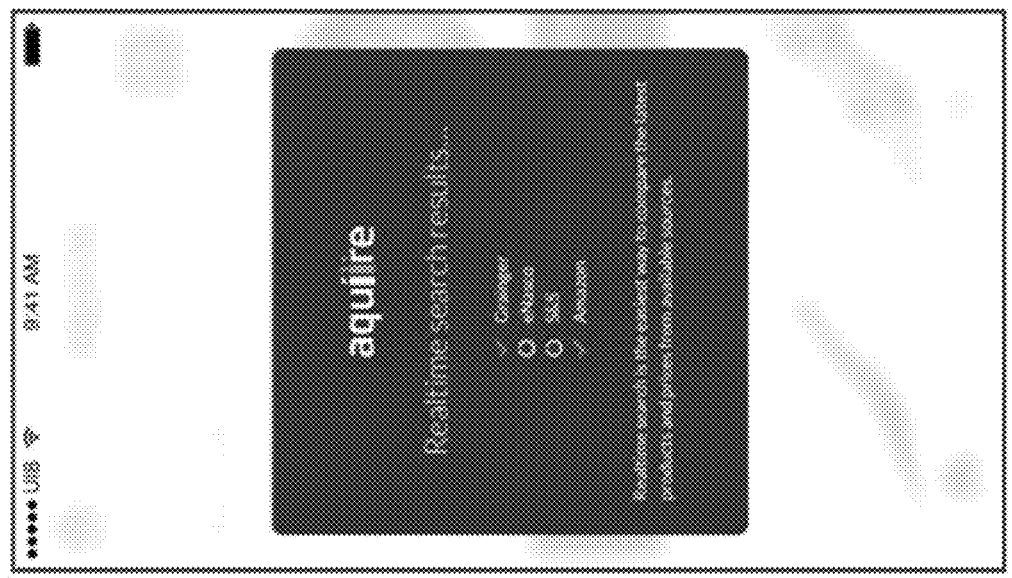
FIG. 15 shows an example mobile real-time universal search that is in progress.
Figure 16:
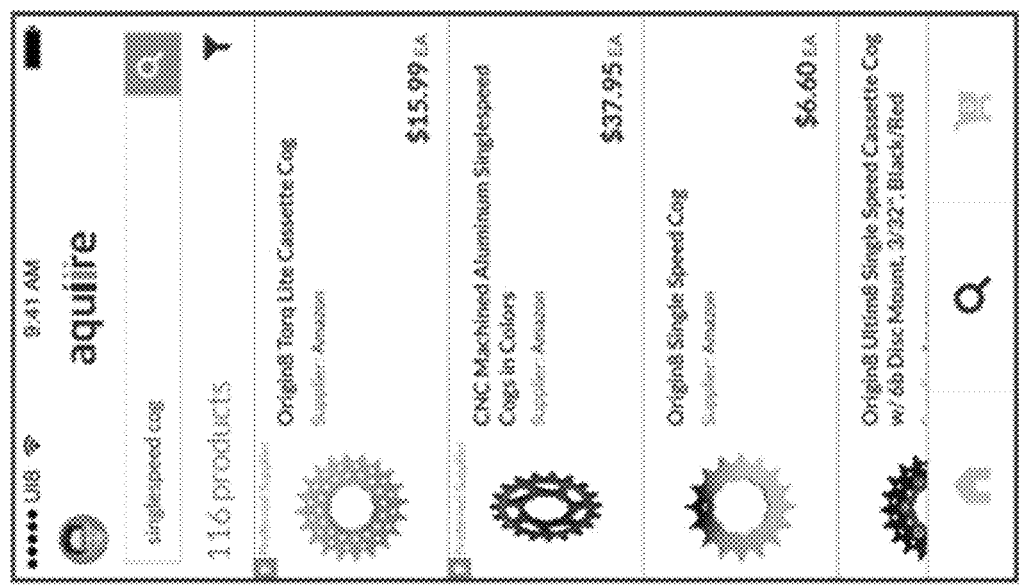
FIG. 16 shows an example mobile real-time universal search that is streaming results.
Figure 17:
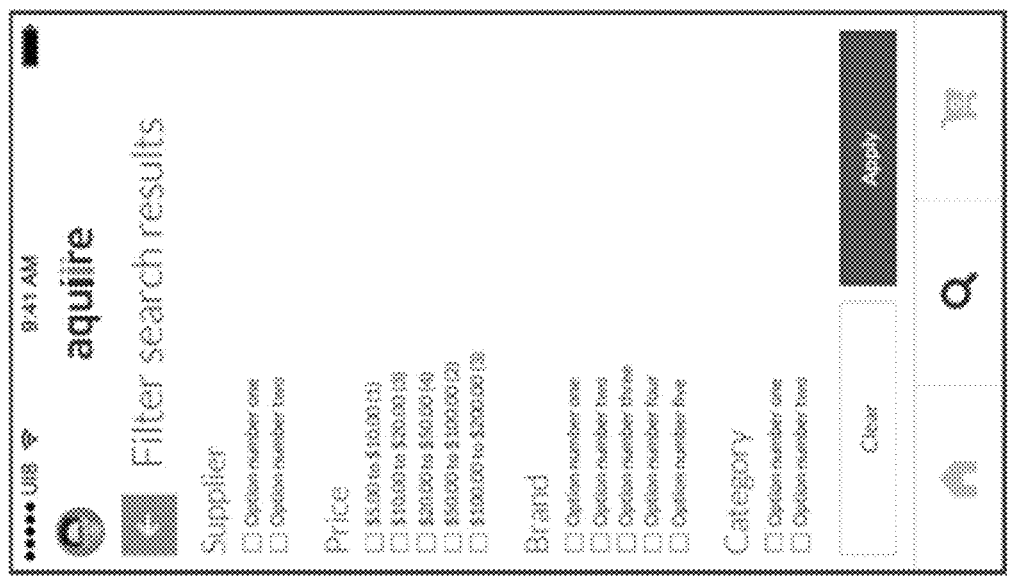
FIG. 17 shows an example mobile real-time universal search in terms of filters.
Figure 18:
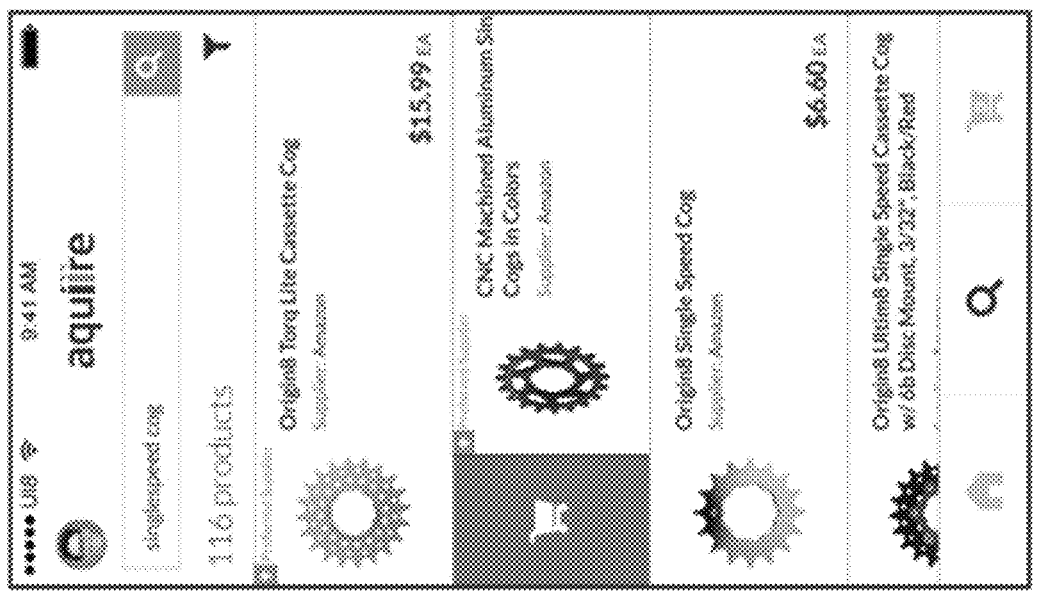
FIG. 18 shows an example mobile real-time universal search in terms of cart additions.
Figure 19:
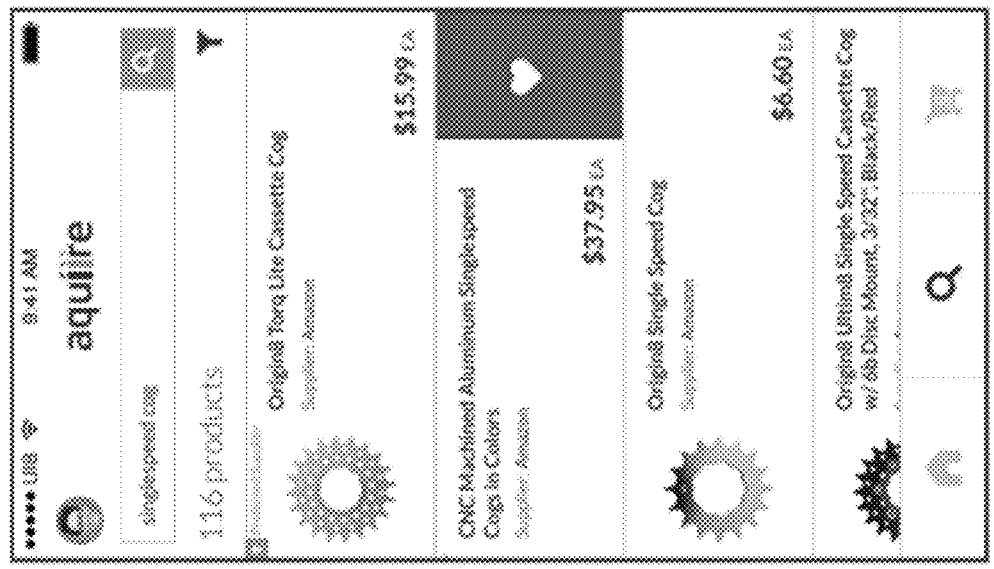
FIG. 19 shows an example mobile real-time universal search in terms of favorites.
Figure 20:
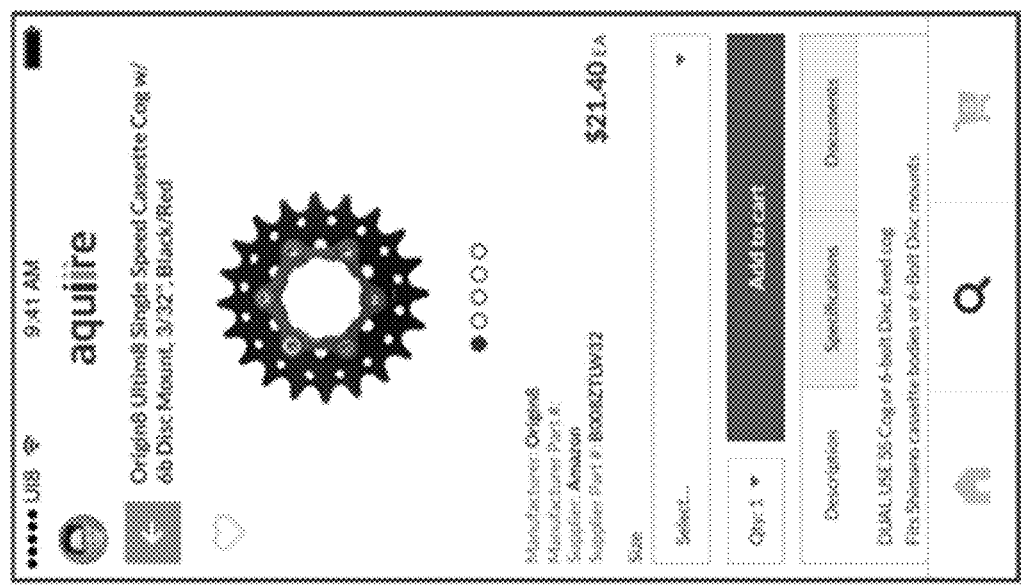
FIG. 20 shows an example mobile real-time universal search in terms of product details.
Figure 21:
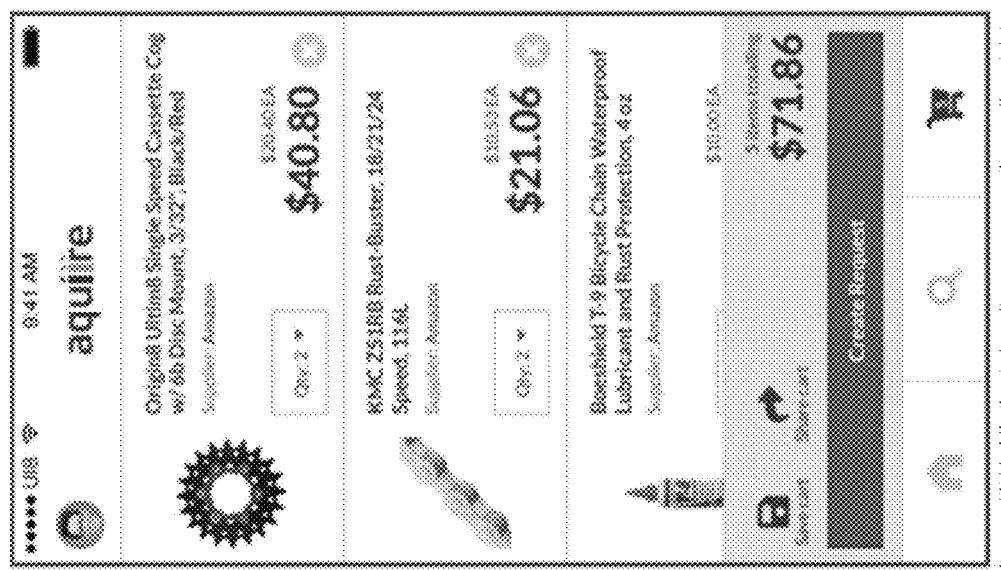
FIG. 21 shows an example mobile real-time procurement in terms of creating requisition.

FIGS. 14-21 show example screens of a user's mobile phone that interacts with the system in universal search activities. FIG. 14 shows an example mobile interface home screen. FIG. 15 shows an example mobile real-time universal search that is in progress. FIG. 16 shows an example mobile real-time universal search that is streaming results. FIG. 17 shows an example mobile real-time universal search in terms of filters. FIG. 18 shows an example mobile real-time procurement in terms of creating requisition. FIG. 19 shows an example data flow for mobile personal expense reporting. FIG. 20 shows an example mobile real-time universal search in terms of filters. FIG. 21 shows an example mobile real-time universal search in terms of cart additions.

Mobile Cognitive Advisor Experience

The smaller device footprint and the desire for immediacy in a mobile environment dictate the need for tuning the user experience of presenting and interacting with Cognitive Advisors, as further discussed in Section 3.4.

Figure 22:
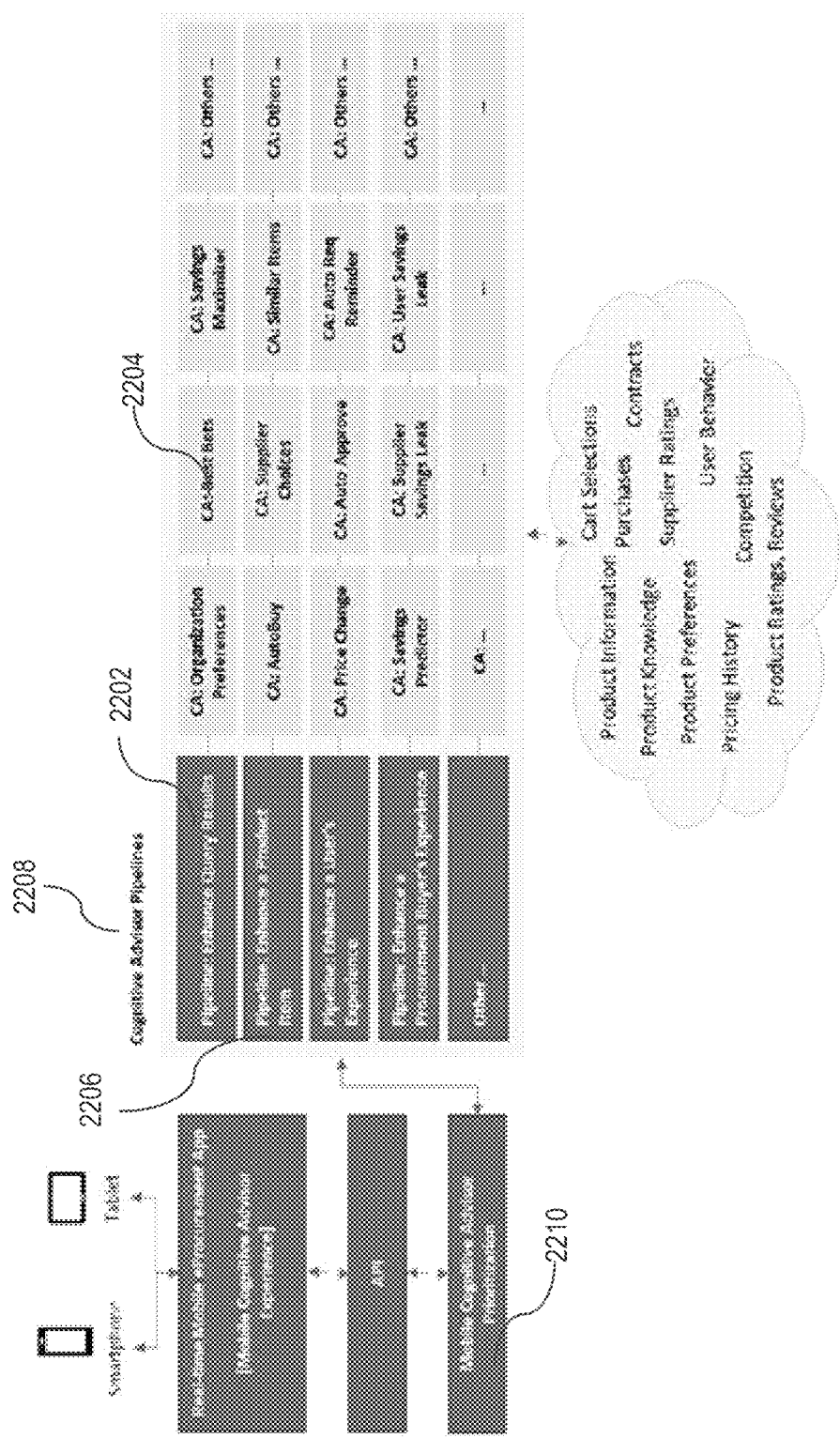
FIG. 22 shows an example mobile cognitive advisor experience.

FIG. 22 shows an example mobile real-time universal search in terms of favorites. In some embodiments, Cognitive Advisors for Enhancing Query Results 2202 would be accompanied by a mobile recommendation priority configuration would be applied on top of Cognitive Advisor recommendations in the context of searching. For instance, Best Bets and Bundles 2204 Cognitive Advisor recommendations would supersede other recommendations and the user experience will guide the user to these first, as these represent the highest signals of relevance. Recommendations from Cognitive Advisors for Enhancing Product Item Data 2206 would be layered into a progressive revealing item detail page on the mobile experience.

In some embodiments, the system is configured to prioritize the Cognitive Advisors and their recommendations to fit the mobile user experience in a prioritization module 2210. Special Cognitive Advisor settings enable configuration of Cognitive Advisor Pipelines 2208 specifically for mobile device access. i.e. specific Cognitive Advisor Pipelines may be turned on or off for access from a mobile device. Within these mobile Cognitive Advisor Pipeline settings, specific cognitive advisors can be turned on or off within a given pipeline, when accessed from a mobile device. Furthermore, the specific cognitive advisors within a pipeline may be prioritized with a Cognitive Advisor Priority setting as 1|2|3 priority order, 1 being highest and most important. The Cognitive Advisor Priority setting causes the cognitive advisors to be prioritized in their execution in the backend processing pipeline—higher priority cognitive advisors are executed first. The Cognitive Advisor Priority setting further causes the recommendation stream coming from the backend processing pipeline to be tagged with the same priority setting. The mobile app interface adapts the display of recommendations coming from the Cognitive Advisor Pipelines based on the priority setting tagged with each recommendation. Highest priority recommendations are provided first, since these are the ones most likely to meet the user expectations. The screen display is managed to present priority level 1 recommendations first, with a progressive scrolling/swiping interface mechanism to reveal further recommendations within the available screen real estate on the mobile device.

Mobile Adaptive Navigation

An intelligent browse experience can be tuned for mobile access. The user's context, past browsing, past product selections and past purchases are further used to tune the intelligent product browsing experience for higher relevance in the mobile environment.

Figure 23:
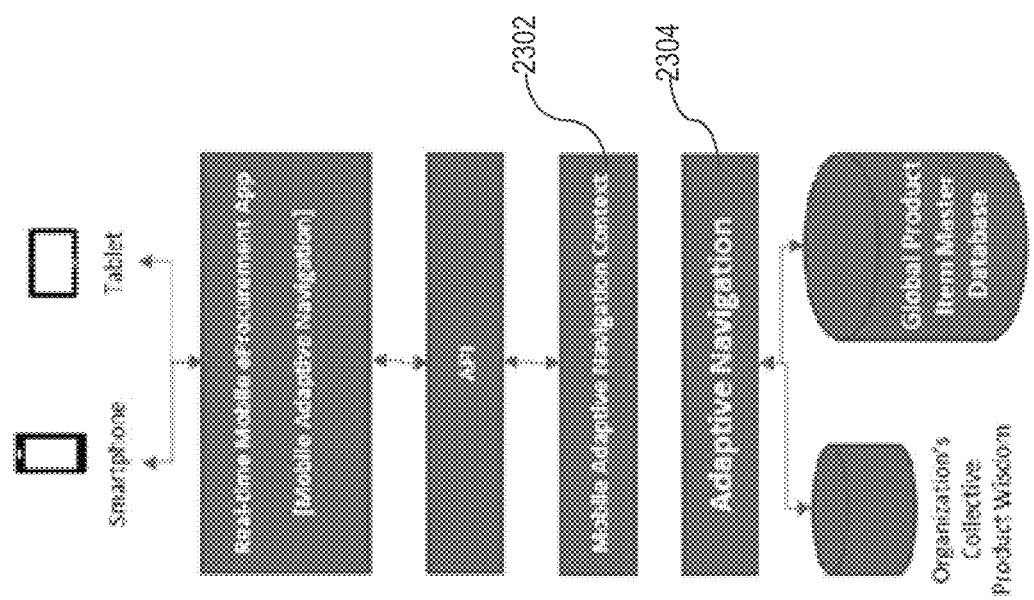
FIG. 23 shows an example mobile adaptive navigation.

FIG. 23 shows an example mobile adaptive navigation. In some embodiments, the following parameters are additionally taken into account to augment the user's context (which already includes their department/division, their geographic region of their business location, their individual role, their purchasing permissions etc.): the user's past browsing patterns with an emphasis on recent browsing patterns; the user's past product selections with an emphasis on recent product selections; the user's past cart additions with an emphasis on recent cart additions; the user's past requisitions with an emphasis on recent requisitions; the user's past purchases with an emphasis on recent purchases; the user's current geographical location. These parameters go towards establishing the Adaptive Navigation Mobile Context 2302 or the user. An intelligent browsing interface is provided in the mobile app based on the Adaptive Navigation 2304 backend service, as discussed in Section 3.1. The Adaptive Navigation Mobile Context is layered on top of the adaptive navigation structure provided by the Adaptive Navigation backend service. The result of the layering of the Adaptive Navigation Mobile Context is that the category/subcategory ordering is further ranked/prioritized using these parameters. The individual products shown at any given category/subcategory node in the Adaptive Navigation taxonomy structure are further ranked/prioritized using these parameters.

Mobile Requisitions and Orders

In a conventional Web-based Procurement interface, when the product selections are ready in the cart, a requisition can be made from it directly in the system and sent for approval (assuming those requisition and approval steps are turned on), or the cart is transferred to the originating ERP system where the requisition and approval flows happen, and orders are suitably generated.

Figure 24:
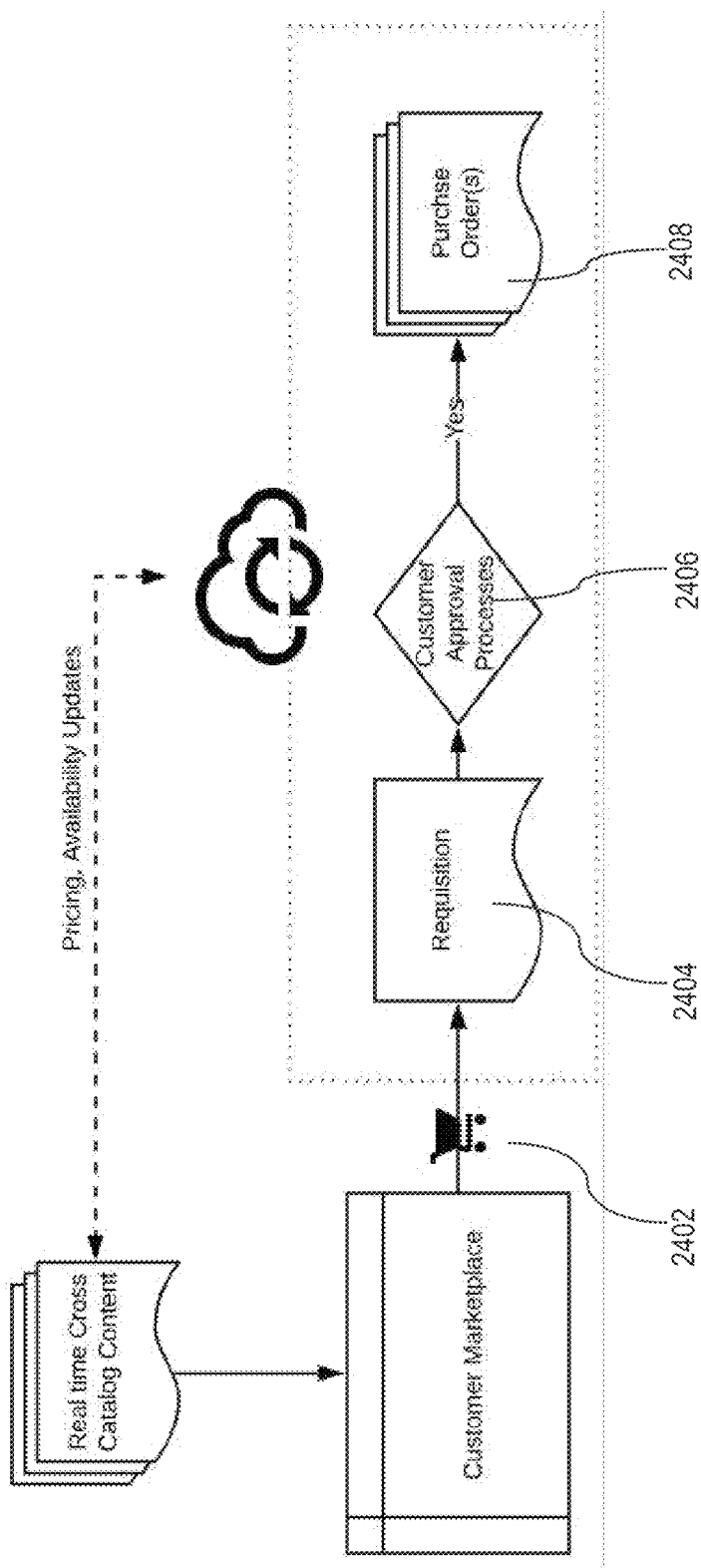
FIG. 24 shows an example data flow for mobile requisitions and orders.

FIG. 24 shows an example data flow for mobile requisitions and orders. In some embodiments, in a mobile environment, after product selections are made in the mobile device, and the cart is ready, a few potential end points for the cart would be as follows. The first end point is "save for later": the direct log-in user credentials are linked to the ERP credentials, so a user could direct log-in through the mobile web page and then log-in and view the same items in their cart through their e-procurement user. The second end point is "assign cart": the user can assign their cart to an e-procurement user for ordering. The third end point is "PCard": the user can check out their cart for Suppliers that are PCard enabled.

The system is configured to know based on how the user has authenticated and how the supplier is configured to do business, or which potential cart outputs are available. A unification of account credentials will allow for a direct log-in user to manage their account. This allows for portable shopping that is still configured to integrate with the customer's ERP system at a later date.

In addition, a workflow of cart 2402/order 2404 assignment can be performed for cart and procurement rule validation 2406 before passing to a central buyer user for ordering through the ERP procurement system.

Further order tracking history and updates are gathered from API calls to the ERP system and gathered from Purchase Order 2408 update documents to keep the mobile user fully informed throughout the process in real-time.

Real-time items can be purchased from a mobile application and stay 'in sync'

Real-time items can be validated to be price accurate at the time of order—not just at the time of shopping. With a fair number of items taking upwards of a full business week to be approved through the existing Requisition Approval process, stale data causes PO/Invoice mismatches that cost companies a great deal of lost profit in the form of (1) making poor buying decisions on stale data, (2) change order management as items fall to backorder while waiting approval (3) added resource cost from AP to confirm and correct the mismatch and (4) missed opportunities for invoicing discounting for prompt payment caused by approval delays.

Mobile Compliant Purchasing in External Stores

Figure 25:
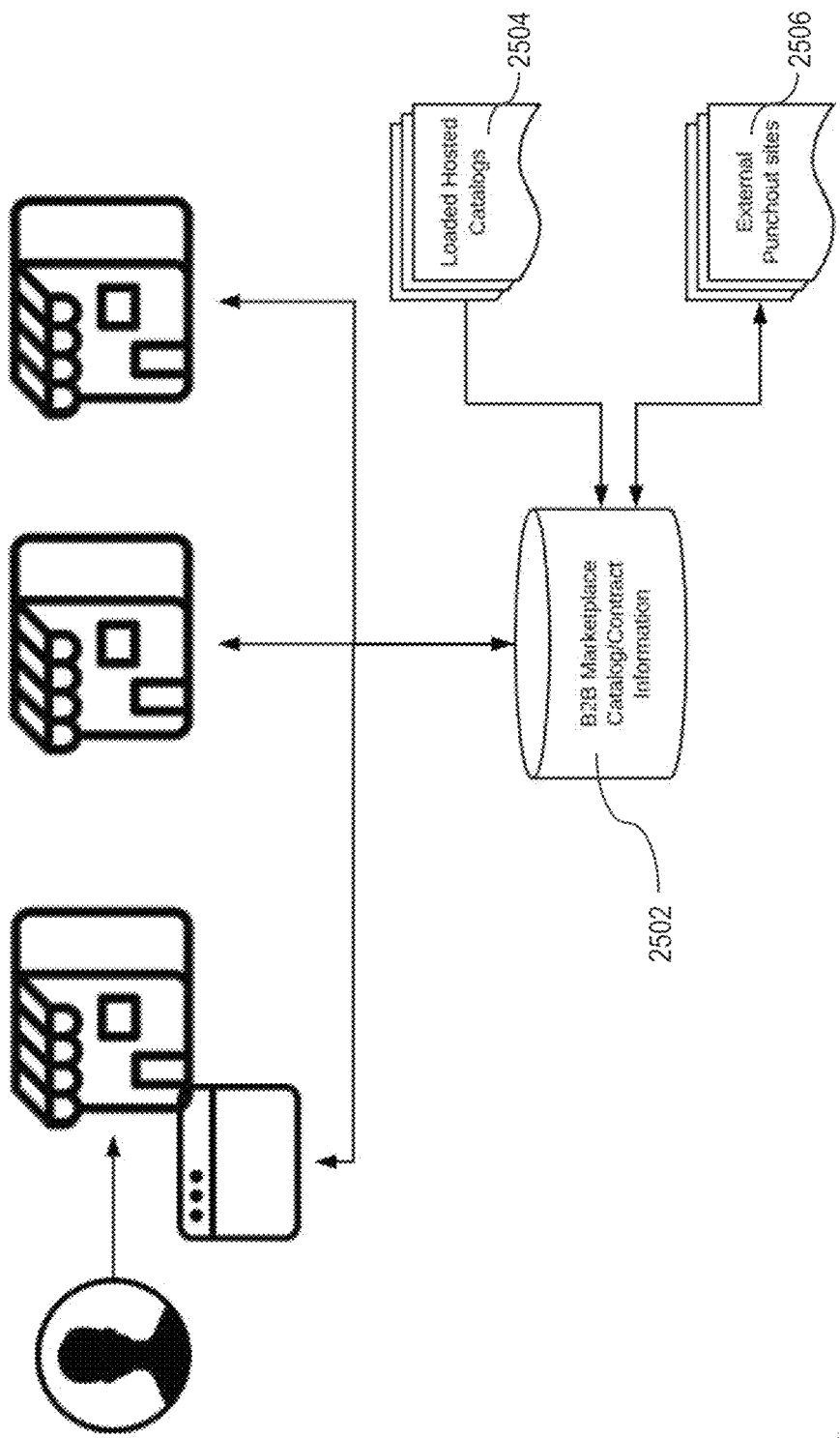
FIG. 25 shows an example data flow for mobile compliant purchasing in external stores.
Figure 26:
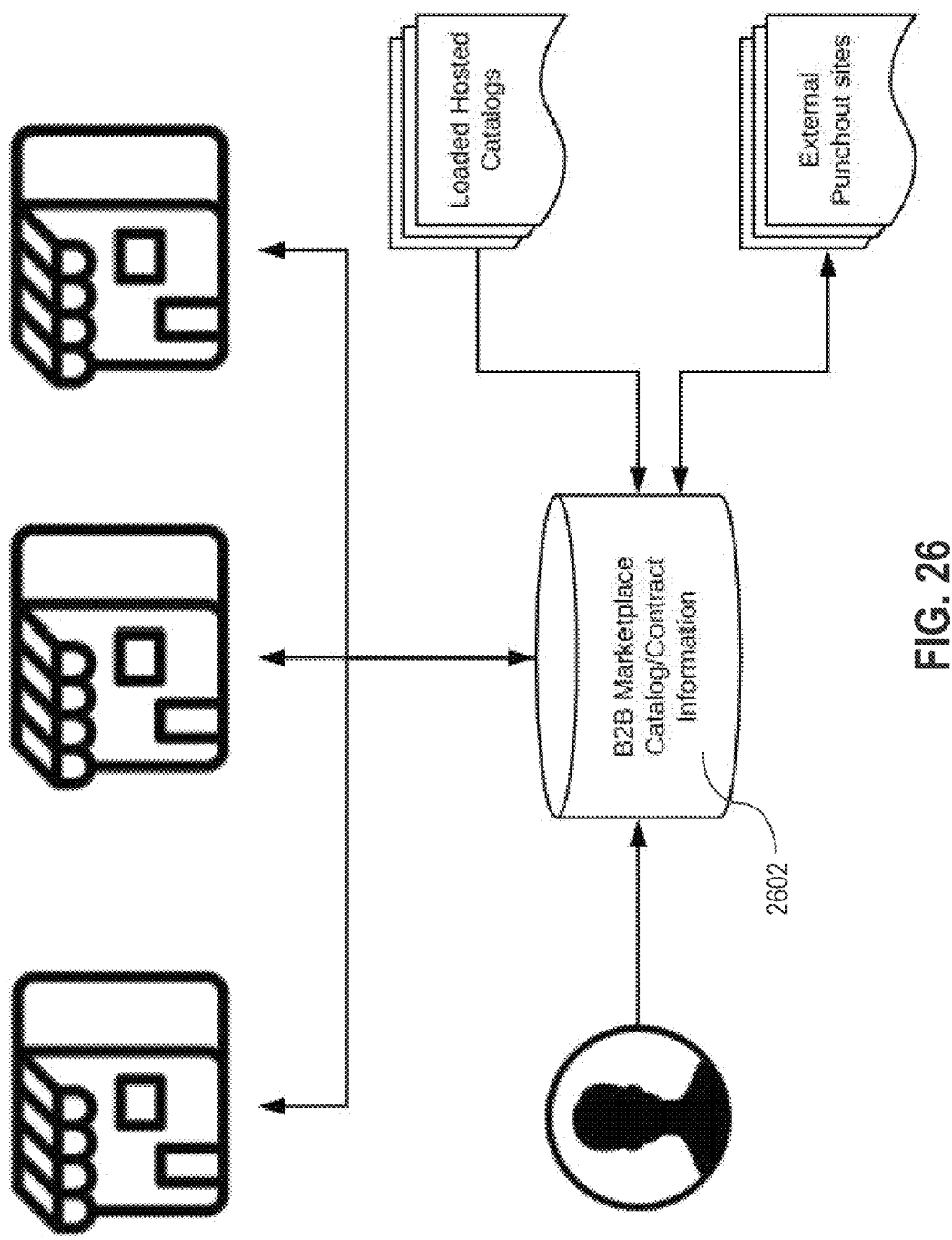
FIG. 26 shows another example data flow for mobile compliant purchasing in external stores.

FIG. 25 shows an example data flow for mobile compliant purchasing in external stores. FIG. 26 shows another example data flow for mobile compliant purchasing in external stores. In some embodiments, when a user visits brick and mortar stores, to fulfill their purchasing needs, today, such product selections and purchases made in store, could represent non-compliant spend from a procurement perspective, and in turn, could be a contributor for savings leaks. This mobile procurement system is configured to enable compliant purchasing in external stores as follows. The user can scan a given product's bar code using the mobile procurement tool, and have the system automatically convert that into a universal search in the marketplace for the exact product if available, and/or similar products that are contracted by procurement. The user can take a photo of a given product and have the system do an image match on known contracted products to present the exact product from a contracted supplier. In the event there is not a product match from the provided photo, the system will proceed to create a smart query based on the product type and attributes gleaned from the photo and run a universal search across contracted suppliers to find similar products.

In a first option, the client be given access to a myriad of retail ecommerce sites that integration into the B2B mobile platform 2502. These items can be searched for or used for comparison purposes in real-time against existing contracts. More specifically, a user shops on the public web for an item of their choosing. With an app enabled on their mobile or desktop browser, the user will be notified in real-time of alternatives from other retail providers as well as the company's contracted suppliers providing hosted catalogs 2504 or punchout catalogs 2506. Alternatively, users logging into their company's B2B Marketplace 2602 can tap into the competitive knowledge of all of their company's strategically sourced supplier content and compare it for shopping and analytics purposes to various retail ecommerce sites in real-time to ensure the user is always aware of the best price and availability to them at their decision point.

In a second option, the client user can shop as they wish and install a marketplace bookmarklet to track in real-time similar items and cheaper pricing from their unique, contracted pricing library of millions of items.

In a third option, in the real world, the user can use their camera in a brick-and-mortar and search the mobile marketplace for a similar image or product key (part number). The mobile procurement system is configured to utilize an existing image web comprising of stock images and consumer-uploaded images to find exact and similar contracted images and item master of enriched product attributes, providing users a real-time comparison for purchasing.

Mobile Personal Expense Reporting

Figure 27:
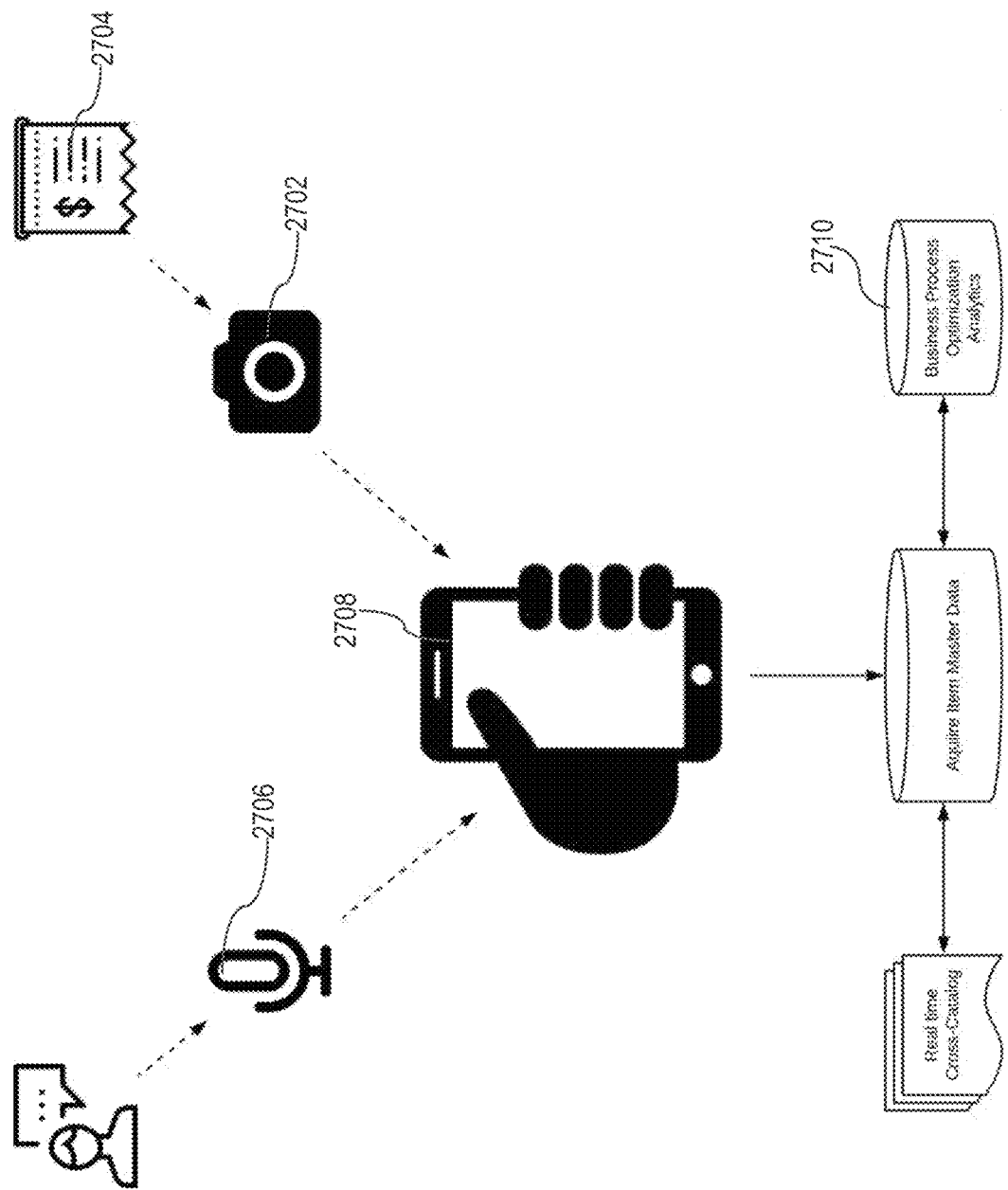
FIG. 27 shows an example data flow for mobile personal expense reporting.

FIG. 27 shows an example data flow for mobile personal expense reporting. In some embodiments, when a user visits brick and mortar stores or even online stores for purchasing products they need, this spend may be considered non-compliant by procurement, but still cannot be controlled. In turn, as a first step, procurement organizations want, at a minimum, to know what spend is occurring in what category and context. To this end, users do have to provide detailed expense reports. The mobile procurement tool simplifies this process by letting a user do the following. A user can paste an electronic receipt received from an external store, and the system is configured to intelligently extract the details needed. The user can also scan using a camera 2702 of a cellphone 2708 a printed receipt 2704 received from an external store, and the system is configured to work from the digitized receipt image to extract the details needed. In addition, the user can talk via a microphone 2706 of the cellphone 2708 to provide the receipt information in natural voice, and the system is configured to extract the details needed. The system is then configured to create an expense report for submission, and file the same into the procurement system as an artifact of external spend.

In some embodiments, in the background, the system can be configured to utilize the mobile camera to translate receipts into expense report items. The system is configured to also utilize the expense report to retroactively inform the procurement system/team of missed opportunities for savings of items 2710 that did not leverage contracts but could have.

The system can also be configured to take voice commands in natural language to allow for quick, hands-free entry of their expense item for unreadable items from the camera. The system can be configured to utilize Natural Language Processing skills and algorithms to interpret, categorize, and compare the purchase to potential available alternatives for analytics and future gamification applications 2710 to entice beneficial behaviors in future endeavors. For goods, In some embodiments, for goods, the analytics can include identifying the item(s) by part number and comparing the price purchased vs. contracted items, and identifying the item(s) purchased and grouping them for future negotiations for improved bulk pricing if there is a noticeable amount of spend without contract. For services, the analytics can include identifying the location and types of services expensed for optimization of spending and prior-purchase intelligence for negotiation.

Mobile Voice Skills for Procurement

The following are examples of the kinds of voice skills that would be supported by the mobile procurement tool to work with personal voice assistants like Alexa, Google, Cortana and Siri: reorder a product (that has been ordered before by this user, using part # or product name and details); order a new product (using part #, or specific product name and details)—this would use past purchases made by this users and others in the organization to increase the precision of the response; check on the status of a requisition; check on the status of an order; approve requisitions received; check on spend levels; check on savings actualized; check on availability of a product.

Many more voice skills of this kind will support a modern voice-based interaction with purchasing and other procurement needs using devices based on personal voice assistants. For example, the system can be programmed to utilize existing Alexa skill formulations, tapping into patented real-time framework through this new utilization method of delivery of real-time content to clients. The system can also be programmed to utilize push notifications from the real-time system to the various enabled devices will allow for notifications of updates to pricing, shipment, and availability to the appropriate users in real-time.

Mobile Conversational Chatbot for Procurement

In some embodiments, the system is programmed to provide a conversational chatbot for use on an electronic procurement system. Example conversations configured for such a chatbot are shown in the tables below.

First Example a) User: Hey Computer. Find me a wireless keyboard and mouse combo.
b) Computer: There are five products from preferred suppliers, and hundreds from the open market. And your peers have purchased two products in the last month. How would you like to choose?
c) User: What are the two products purchased by my peers?
d) Computer: First, there is the Logitech Wireless Keyboard and Mouse combo for $49 and this has been purchased 4 times in the last month. Second, there is the Bionics Wireless Keyboard and Mouse combo with free laser pointer bundle for $59 and this has been purchased 6 times in the last month.
e) User: Ok. Order the Bionics one, as I could use a laser pointer as well.
f) Computer: Got it. I've added the Bionics Wireless Keyboard and Mouse combo with free laser pointer bundle for $59 to your cart. Is there anything else you want to buy now?
g) User: No. This is it.
h) Computer: Got it. I've created a requisition for this and dispatched it for approval. I'll keep you updated when your order is placed and when it becomes available.
i) User: Thanks!

Second Example a) User: Hey Computer. How many units of EX456732B are available?
b) Computer: There are 3 units available from Macon and 2 units available from Directus.
c) User: I will need 10 units by end of next week.
d) Computer: Got it. Shall I order these five units available now?
e) User: Yes. And place a quote with these two suppliers for five more to be available in time.
f) Computer: I've placed an order for 3 units of EX456732B from Macon and 2 from Directus. And I've sent a quote for 5 more from them. I'll keep a watch on follow up from them and notify you.
g) User: Thanks. Maybe it will help if you can look outside our marketplace for other suppliers who may have this in stock!
h) Computer: Yes, I'm checking now . . . [pause] . . . I've found that MicroUnlimited has 7 units and Temporum has 3 units. We haven't sourced from either of these suppliers before.
i) User: What are their ratings?
j) Computer: I'm checking D&B, BBB and SupplierCentral now . . . [pause] . . . MicroUnlimited has a top BBB rating, no complaints on D&B, and rated 9.2 out of 10 on SupplierCentral. Temporum has a top BBB rating, 1 complaint on D&B for a code violation, and rated 7.6 on SupplierCentral.
k) User: Go ahead and send a vendor invitation notice with a quote for five units to MicroUnlimited and ask them for an expedited response.
l) Computer: Ok. I've sent out the vendor invitation with the quote and request for expedited response by Monday next week. Is there anything else?
m) User: No, that's it for now!

Third Example a) User: What is the status of my order on the desktop oscilloscope?
b) Computer: The order was dispatched to ScienceDepot five days ago. We received an order confirmation from ScienceDepot yesterday.
c) User: What is the contract turnaround time with them for this category?
d) Computer: Their contract says that they should deliver this category of standard, non-customized Lab Equipment within five days.
e) User: Is there a penalty clause in their contract for late delivery? By the way, how have they been performing in the past on delivery times?
f) Computer: No, there is no penalty clause in their contract for late delivery. They have been trending down on delivery times, and have been consistently late between 10% and 45% on their last 10 orders from us.
g) User: This is not good. Any idea if they are having operational trouble?
h) Computer: I'm checking on this now . . . . [pause] . . . The Baltimore Sun reports that they are having a major organizational shake up with the CEO and CFO leaving the company, after fraud complaints were made by their customers. Justia lists two lawsuits against them.
i) User: What is their contract termination clause?
j) Computer: We need to give them 7-day notice for cause.
k) User: Who are other suppliers in this category that we could source from?
l) Computer: We already have five competitive suppliers in our system in this category.
m) User: In that case, go ahead and remove them from our configuration, and send them a termination notice with their delivery performance as the cause.
n) Computer: I have removed them from our configuration. And I will send them a termination notice and let you know when that is dispatched. What should I do about the current order open for the desktop centrifuge?
o) User: Wait for the order to come through in the next three days, and if it doesn't come through, cancel the order, and order it from one of the other suppliers.
p) Computer: Ok. I will keep the order open for three days. And if that isn't fulfilled, I'll place the order with Measurement Equipment Central.
q) User: Sounds good.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

3.4. Real-Time Cognitive Advisor Framework for Procurement

Disclosed herein is an Extensible Framework for Enhancing Marketplace Experience and Procurement Efficiency and Effectiveness in Real-time using AI, Predictive Modeling, Behavioral Intelligence, Big Data and Collective Intelligence.

Private marketplaces typically used in Procurement systems function with paradigms that are a decade or older and leave much to be desired in terms of user experience, efficiencies, effectiveness, purchasing compliance and savings. A system is disclosed that enables organizations to deploy private marketplaces with real-time universal search across all content including content from punchout websites and forms a foundation for driving greater user satisfaction and higher purchasing compliance. By identifying the right sourced suppliers and open suppliers, the organization can use the system to derive more savings from their purchases. Collective intelligence comes in the form of the organization's product knowledge as expressed in reviews and ratings on suppliers, reviews and ratings on products, collaborative discussions including in question boxes associated with a given product, product selections in cart and in purchases made. This wealth of knowledge can be tapped to drive better purchasing and sourcing decisions.

Behavioral intelligence comes in the form of being able to follow users' searching patterns and tracks and choices to better model what they are trying to achieve and lends itself to innovations that can lead users to what they are looking for faster. Big data comes in the form of the massively increasing collection of inter-related data between suppliers, products, selections, purchases, buyer users and more. Anonymized for safe consolidation across organization boundaries, this is a growing source of intelligence that can help drive context, analytics and benchmarking to drive better decisions. Predictive modeling applied to the dynamic elements of the marketplace such as pricing trends, purchasing trends, supplier reliability and competitiveness and more, can bring another dimension of value to improving purchasing decisions.

The use of AI to create and deliver intelligent insights in the right context in real-time, enabled a wide range of innovations to augment the procurement experience overall. A Cognitive Advisor Framework, as detailed in this document, has substantial impact on procurement, from the quality of the search experience, to the efficiency gains in product selection, to the reliability of product and supplier selection for purchase, to streamlining repeated purchases, to maximizing savings by considering the myriad factors involved. The open, extensible framework presented here may be used to permit the continuous creation and use of many different targeted cognitive advisors over time that enrich the entire procurement experience and value to the organization.

Figure 28:
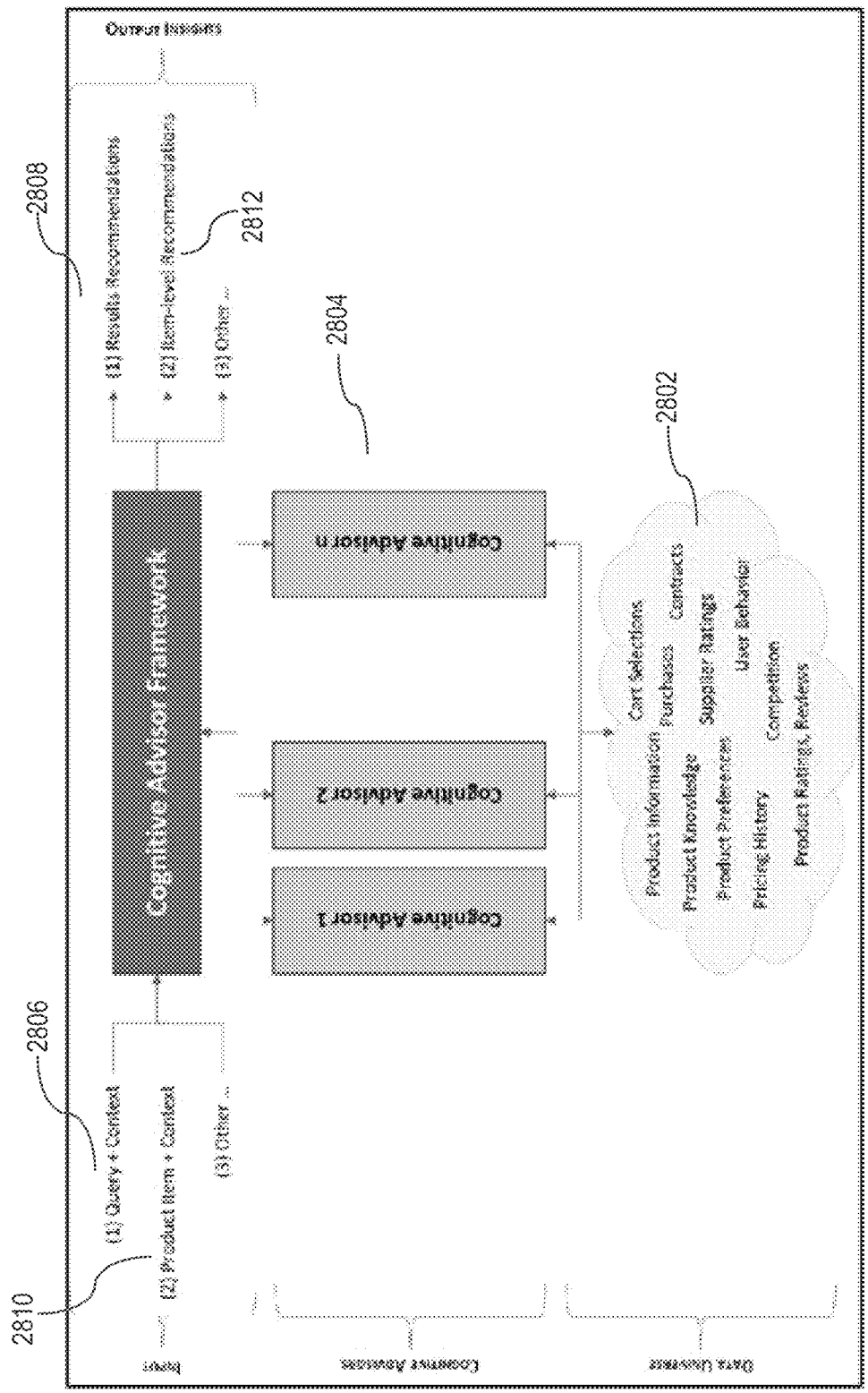
FIG. 28 shows an example cognitive advisor framework.

An example Cognitive Advisor Framework, shown in FIG. 28, brings intelligent insights into purchasing decisions. The framework can take inputs from different contexts and provide recommendations suitable for the context. A wide range of data assets 2802 ranging from product information, product knowledge, product preferences, pricing history, product ratings and reviews, to cart selections, purchases, contracts, supplier ratings, user behavior, competition and more are available for the Cognitive Advisors to tap into to bring intelligence and insights to purchasing and sourcing decisions.

In some embodiments, Specific Cognitive Advisors 2804 (e.g., independent modules) can be plugged into the Framework via configuration in a procurement setting for a given organization. The Framework may be responsible for real-time orchestration and execution of a pipeline of Cognitive Advisors in parallel, or in specific sequence as needed. The Framework may stream real-time updates and recommendations as available.

A Cognitive Advisor may be implemented as a focused component that derives intelligence and insights using AI/machine learning/predictive models or similar approaches, from specific slices of data from the data universe, to deliver specific insights or recommendations or intelligence to improve purchasing or sourcing or other decisions. A Cognitive Advisor may identify itself as service for a specific context/purpose. These include, for example: a specific Cognitive Advisor may work on a given query and context as input and provide recommendations 2808 on certain specific products to be presented above the fold, a different specific Cognitive Advisor may work on a single product item 2810 and give specific recommendations 2812 to be presented alongside that product item, another specific Cognitive Advisor may be provided with a single user context as input and provide auto-order reminders, or watched products which become available, or a list of specific recommendations to attend to in their personal dashboard, and a different Cognitive Advisor may be tuned to work on behalf of the procurement buyer in helping them get predictive insights into savings actualization, savings leaks and more, in their personal dashboard.

In turn, specific chains of Cognitive Advisors could be activated and executed in real-time depending on the actual usage of the procurement system and marketplace by the buying users and suppliers.

The data assets available are organization specific as well as an overall big data set consisting of suitably anonymized data assets intelligently merged across organizations. In some embodiments, this may be used to allow Cognitive Advisors to not only provide organization-specific insights in specific granularities, but also provide benchmarking/comparisons and related insights from across the entire set of organizations served by the system.

Figure 29:
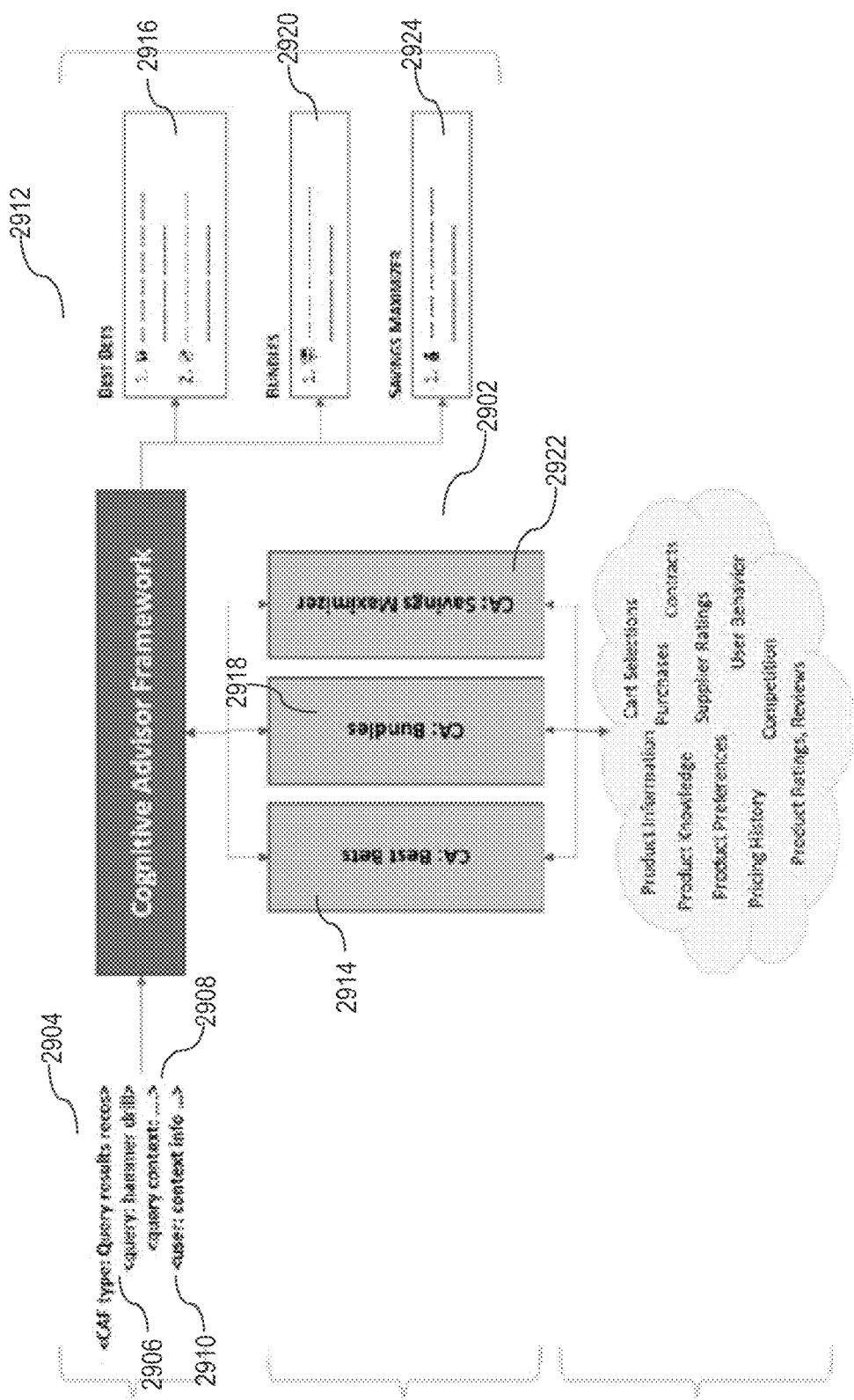
FIG. 29 shows an example cognitive advisor framework with three cognitive advisors.
Figure 30:
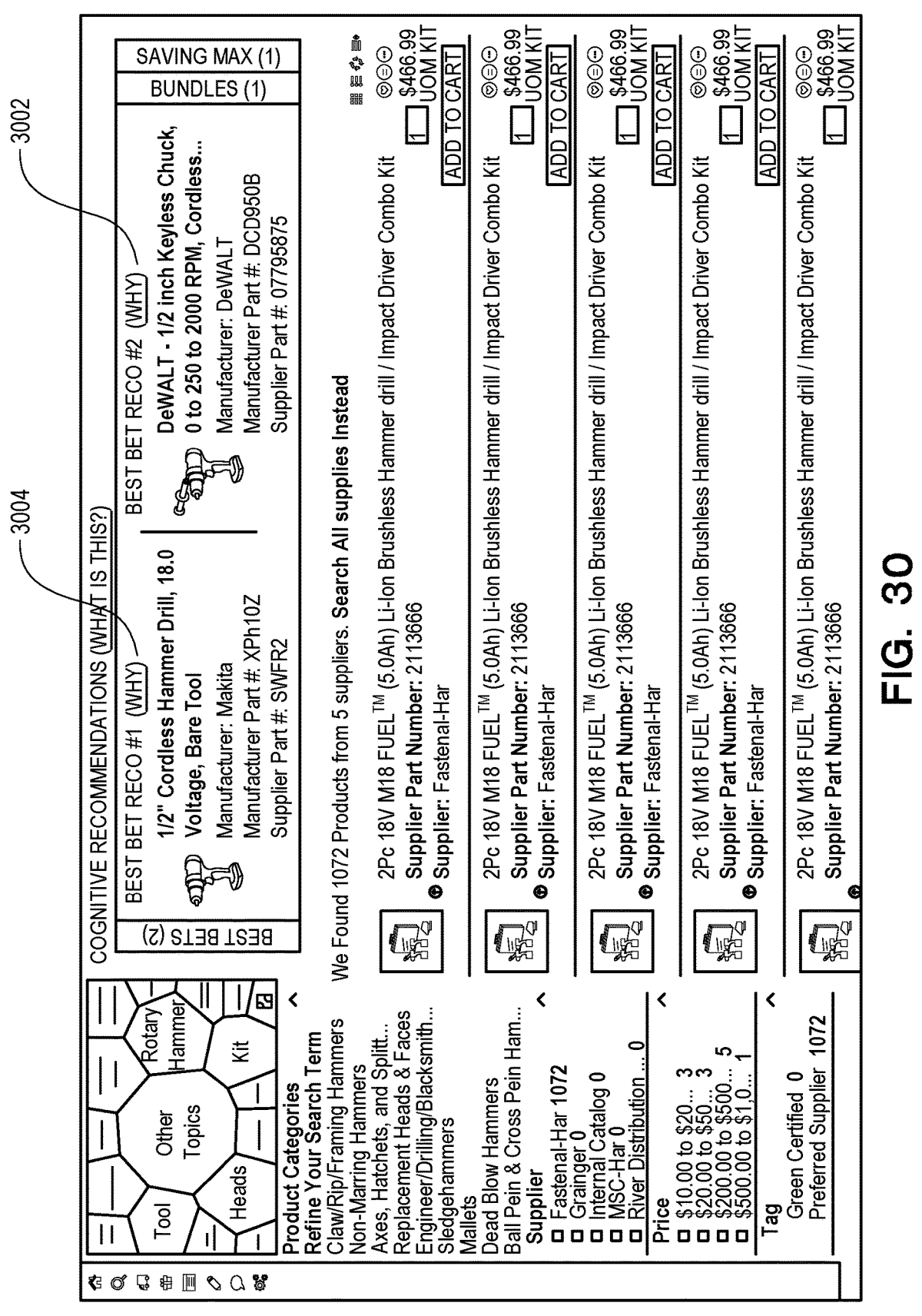

Query results in procurement marketplaces can be significantly enhanced using specific Cognitive Advisors that provide result recommendations for a given query and user context. FIG. 29 illustrates the use of the Cognitive Advisor Framework with three configured Cognitive Advisors 2902. It is activated with the Cognitive Advisor Framework Type of "Query result recos" 2904. The input provided is a user's query 2906 on <hammer drill> and their entire query context 2908 including supplier mix, supplier preferences etc., as well as the entire user context 2910 including their id, their division/department/region, etc. The configured Cognitive Advisors return a stream of result recommendations 2912 pertaining to this input context as their output. The user interface can provide "cognitive recommendations" as shown in FIG. 30.

This approach provides a number of advantages. For example, of the configured Cognitive Advisors, for a given query, zero or more of them might return recommendations. In turn, the user interface for the display of Cognitive Recommendations may not be present (if zero recommendations were made for a given query), OR, as illustrated in FIG. 30, many Cognitive Advisors may present recommendations. In this chosen example, we can see that "Best Bets" Cognitive Advisor 2914 returned 2 recommendations 2916, the "Bundles" Cognitive Advisor 2918 returned 1 recommendation 2920, and the "Savings Max" (the Savings Maximizer) Cognitive Advisor 2922 returned 1 recommendation 2924. The illustration in FIG. 30 employs a horizontal "accordion" type user interface gadget 3002 which displays the three Cognitive Advisors in tabs that expand, and contract left to right, occupying the available display space for recommendations one at a time. The Cognitive Recommendations would stream back into the user interface handler in real-time, so the interface can dynamically present the highest quality recommendations to the user as soon as they are available. Any number of available Cognitive Advisors may be configured into the Cognitive Advisor Framework. Here are some specific examples in this innovation.

An example "Organization Preferences" Cognitive Advisor may mine one or more of the following: all product items placed into the cart, and the contexts in which they were made, by one or more users, across one or more departments/divisions/regions within the organization ("Cart Selections"), all product items placed into actual orders sent to one or more suppliers ("Purchases"), the users and their contexts from which these Cart Selections or Purchases were made, the price, the timestamp, the category and other relevant product information, product knowledge, product preferences, product ratings and reviews, supplier history, contracts, supplier ratings and user behavior.

Starting with the input context (query, query context, user context etc.), this Cognitive Advisor does intelligent matching to find up to three high quality product item recommendations that match the intent of the user's query. In the example illustrated in FIGS. 29 and 30, the "Organization Preferences" Cognitive Advisor, if configured, may have spotlighted up to 3 hammer drills preferred by the organization, that are relevant to the user and the user context. The following are several noteworthy elements of the matching algorithm: purchases are a stronger signal than Cart Selections for the organization's preference of a certain product item for a certain family of queries whose intent is to find such item, frequency of Purchases and Cart Selections are some important criteria for determining the rank ordering of potential recommendations, leading to up to three qualified recommendations for the user, and the user context is an important element in the matching algorithm. For example: A user in Marketing department wanting to find a digital tablet for creating digital illustrations is more likely to find peer selections (i.e. selections by others in Marketing) to be more reliable than, say, that of an incidental selection by some others elsewhere in the organization.

This example Cognitive Advisor will be returning a Recommendation Score for each item, presented on a scale of 0-1. The user interface may choose to display such Recommendation Score for an item via a bar display, OR may choose to map the Recommendation Score to a discrete range of Low Relevance to Medium Relevance to High Relevance, OR may choose to not display that while still using such Recommendation Score to rank order the Cognitive Recommendations. For example, FIG. 30 does not display the internally available Recommendation Score for each recommendation.

For each item recommended, this Cognitive Advisor also provides an evidence stream, that can be used to answer user questions such as: "Why am I being shown this recommendation?" In turn, this enables transparency to the recommendation, and will engender user trust in the recommendation.

For example, FIG. 30 illustrates this by including a "Why" link 3004 with each recommendation.

In some embodiments, an Organization Preferences Cognitive Advisor may also have a learning engine inside. This learning engine learns user behavior from actions taken by users to whom recommendations from this Cognitive Advisor have been delivered. These actions may include, for example, that a user clicks on an Organization Preference recommendation, a user selects an Organization Preference recommendation for adding to cart, or a user selects an Organization Preference recommendation for adding to cart followed by an actual purchase. The entire query context and user context are taken into account, along with the signals above of user actions from Organization Preferences recommendations, for learning and improving the quality of the recommendations made to all users overall within the organization. The Organization Preferences Cognitive Advisor taps into the Collective Intelligence of the organization on product selections and purchases, to provide high quality, reliable recommendations for the user doing the queries.

The disclosed system may implement a "Best Bets" Cognitive Advisor 2914. Private Procurement Marketplaces that are configured to work with a rich selection of suppliers or even the long tail of suppliers end up with a glut of products to pick from, to make a purchase. A buyer user can be presented with large numbers of products for specific queries. Multiple strategies are deployed to help users navigate this, including faceted filters, real-time clustering and visual navigation for product search results, categorization, and more.

The innovation presented here is the inclusion of a "Recommend as Best Bet" (or simply "Recommend this", or similar variation), link/button to each product listed in the universal search result set. A buying user can click on this link/button to suggest that this item be recommended as a Best Bet for this query and similar queries (similar queries are built out using a similarity measure on the queries done so far).

When a user clicks on "Recommend as Best Bet", their recommendation is captured along with the complete query and buyer context and related settings, as an input for a Best Bets learning engine. In an example implementation, the "Best Bets" Cognitive Advisor 2914 recommends a given previously recommended item for any user in the same department, in the same region as the recommending user. Additional signals of the strength of the recommendation can come from, for example: item choice frequency in cart selections, item choice frequency in purchases, and purchase frequency will be weighted more than Cart frequency.

The Best Bets learning engine learns user behavior from actions taken by users to whom the Best Bets recommendations have been delivered. These actions may include, for example, that a user clicks on a Best Bet recommendation, a user selects a Best Bet recommendation for adding to cart, or a user selects a Best Bet recommendation for adding to cart followed by an actual purchase. The entire query context and user context are taken into account, along with the signals above of user actions from Best Bets recommendations, for learning and improving the quality of the recommendations made to all users overall within the organization A Best Bets Cognitive Advisor 2914 may be a superset of the Organization Preferences Cognitive Advisor. In some embodiments, either one can be turned on within the Cognitive Advisor Framework, depending on the buying organization's choice. In addition, the ranked placement of items in Best Bets for a given query in a given category in a given region, can be additional data for the Global Item Master, potentially driving recommendations like this or other features across company selections.

The disclosed system may implement a "Bundles" Cognitive Advisor 2918. Buyer organizations can configure a bundle of products to make it easy for making purchasing decisions in specific use cases. For example, a "New Employee Bundle", might include a specific swivel chair, a specific laptop, docking station, two desktop flat panel monitors, a laptop bag, extended life battery, wireless keyboard and wireless mouse.

An electronic procurement platform may search across configured bundles in the context of universal search across hosted catalogs, punchout supplier websites, bundles, order guides, inventory and more. The "Bundles" Cognitive Advisor 2918 may take this type of bundle searching to another level of value by taking into account the user context and the query context to create a more sophisticated matching algorithm to generate Bundles Recommendations.

The learning engine underneath the Bundles Cognitive Advisor 2918 also learns user behavior from actions taken by users to whom the Bundles recommendations have been delivered. These actions may include, for example, that a user clicks on a Bundle recommendation, a user selects a Bundle recommendation for adding to cart, or a user selects a Bundle recommendation for adding to cart followed by an actual purchase. The entire query context and user context are taken into account, along with the signals above of user actions from Bundles recommendations, for learning and improving the quality of the recommendations made to all users overall within the organization. In addition, the highly active bundles for a given query in a given category in a given region, can be additional data for the Global Item Master, potentially driving recommendations for new Bundle creation or Bundle enhancement for this organization or other organizations overall.

A system implemented based on this disclosure also implements a "Savings Maximizer" Cognitive Advisor 2922. Procurement organizations tend to have various ways for generating Savings from sourcing different suppliers. Some may get a flat x¾ off list price discount. Some may get a discount range from x¾ to y¾ depending on tiers of volume of purchasing with the given supplier. Some may get cashback from suppliers based on the volume of purchasing done with them.

In turn, this creates a peculiar situation where sometimes, the lowest price product listing from a given supplier, or even a given Best Bets Cognitive Advisor 2914 or other Cognitive Advisor recommendation(s) may not be the right choice for the user to make, if the organization's strategy is to maximize overall savings (versus maximize savings on a per-transaction basis), or to optimize supplier mix. What is needed is a greater sophistication in the Procurement system to gather information on the organization's procurement strategy. With structured knowledge of the procurement strategy (overall or on a per-category basis, depending on how the organization has configured the strategy), and a structured understanding of the contract details (including discount structure and tiers), an intelligent capability would make recommendations that maximize savings overall.

The "Savings Maximizer" Cognitive Advisor 2922 takes a strategic view of overall savings, based on the procurement strategy, supplier contracts, current search query and recommendations and items displayed, savings targets, savings to date, current spend down to a given category and given supplier, and makes recommendations on product selection from a given supplier that would maximize overall savings.

For example, a buying organization has a contract with TechCentral for IT Supplies. The savings are based on tiers of buying volume. Tier 1 Savings: 3% off contracted price for volume up to $100 k; Tier 2 Savings: 3.5% off contracted price for volume from $101 k-$250 k; Tier 3 Savings: 4% off contracted price for volume from $251 k-$500 k; Tier 4 Savings: 5% off contracted price for volume from $501 k-$1 M; Tier 5 Savings: 6% off contracted price for volume over $1 M+.

When a given user is performing a search in the IT Supplies category, and is adding, say, a color laser printer from TechDepot, another supplier in IT Supplies, for $4500, which is the best listed price among all available choices at that time. The same color laser printer from TechCentral may be $4750, clearly not attractive for the user at that time. However, the Savings Maximizer Cognitive Advisor 2922 tracks and computes the fact that buying this item from TechCentral (for a seemingly higher item price) would bump the spend from Tier 4 Savings to Tier 5 Savings. This in turn, would drive the overall savings higher for the organization. Based on this the Savings Maximizer Cognitive Advisor 2922 would send along a recommendation to the buy the color laser printer from TechCentral.

Additional benefits delivered from the Savings Maximizer subsystem is capability to power personal spend and personal savings targets, department/division/region spend and savings targets in an information interface, updated in real-time. Further benefits delivered build on these analytics and constructs a gamification interface which enables socializing savings objectives and engage users in achieving higher levels of savings overall.

Other Cognitive Advisors can be implemented. For example, a "Query Rewriter" Cognitive Advisor may be implemented. Users can sometimes find it difficult to formulate query terms that express the purchase need. The Query Rewriter Cognitive Advisor mines past queries from all users and the corresponding cart selections and purchases, to create a semantic model of the product universe of interest to the organization and uses the same to provide a better query to consider using.

A "Smart Guide" Cognitive Advisor may also be implemented. In addition to a Universal Search based Marketplace, there could be other tools enabled for the users to use. For instance, one or more tools for customizable products may be configured, a tool for creating quotes may be configured, one or more specialized tools may exist only on certain supplier punchout sites, and more. In this setting, it may be beneficial to guide the user to the right tool based on their query and context. The Smart Guide Cognitive Advisor can look at available configuration information on tools, past paths taken by users from the point of expressing a need to the point of getting something added to the cart, and auto-recommend the use of one or more tools suitable to the current user's need. For complex buying needs, this Cognitive Advisor might connect the user with a Procurement Buyer in real-time to help meet their needs. Such a Cognitive Advisor may dramatically improve the overall user experience with the system by guiding them to the right tool or person for their need.

A "Result Template" Cognitive Advisor may also be implemented. Sometimes, the user's query is very specific like a part number, or reasonably specific like a particular brand, model and attribute set. At other times, the user's query is very general like <gloves> or <printer>. At still other times, the query can be for non-product information like just a supplier name, example, <msc>. A wide variation exists in the query diversity seen in Procurement contexts. Depending on the type of query, the user experience can be dramatically enhanced by organizing the right type of content into the right type of information layout. For instance, for general queries like <printer> or <gloves> it is very likely that the user might need broader information, organization selections, and other products from suppliers. In turn, a Result Template Cognitive Advisor might analyze the user's query and context and suggest a suitable result template along with other parameters such as the sources of information and their layout within the template. The user interface can use this information to create tailored information layouts to best communicate the right information for the intent of the user's query.

A "Real-time Path Optimizer" Cognitive Advisor may also be implemented. Users may sometimes take multiple steps from the start of their query before they find what they are looking for, or sometimes they may be trying to pull together multiple product items into a cart, or sometimes they try a given path through searching and abandon it to visit the punchout site of a given supplier. The Real-time Path Optimizer Cognitive Advisor watches the activity of the user in atomic, granular steps, in real-time, and provides optimized path recommendations that could be rendered into the user interface in the form of real-time guided navigation steps for the user. For example: As the user begins adding more than one item to the cart, this Cognitive Advisor can recommend, based on its learning, the set of items that could of relevance for the user to consider adding to the cart.

Figure 31:
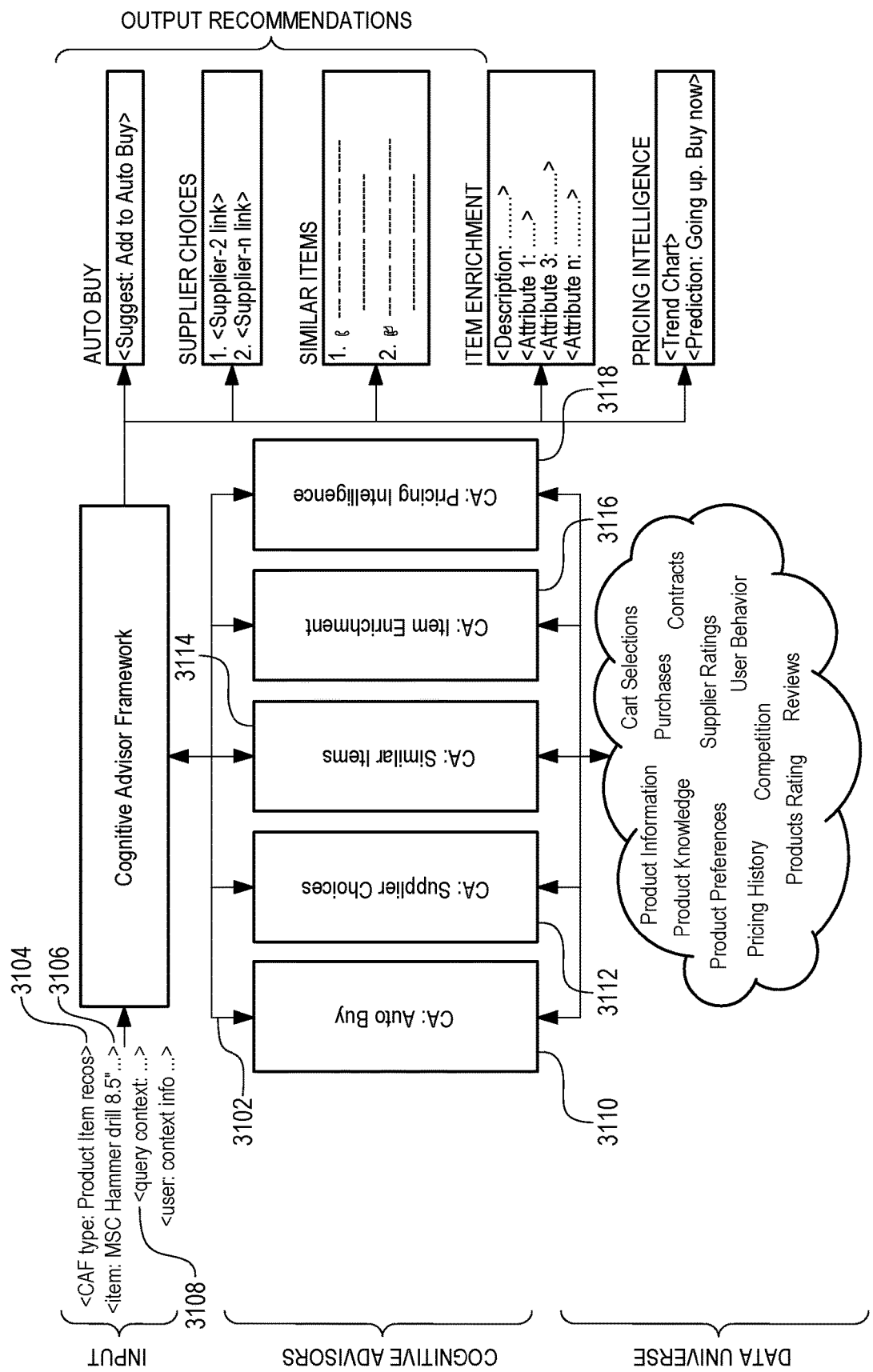
FIG. 31 shows an example cognitive advisor framework for enhancing product items, with five unique cognitive advisors.

One or more of the disclosed Cognitive Advisors may be implemented and may provide features for enhancing a product item and associated information. Product items displayed in procurement marketplaces can be significantly enhanced using specific Cognitive Advisors that provide result recommendations for a given item, category, supplier and user contexts. FIG. 31 shows an example configuration of the Cognitive Advisor Framework for enhancing product items, using five unique Cognitive Advisors 3102.

Figure 32:
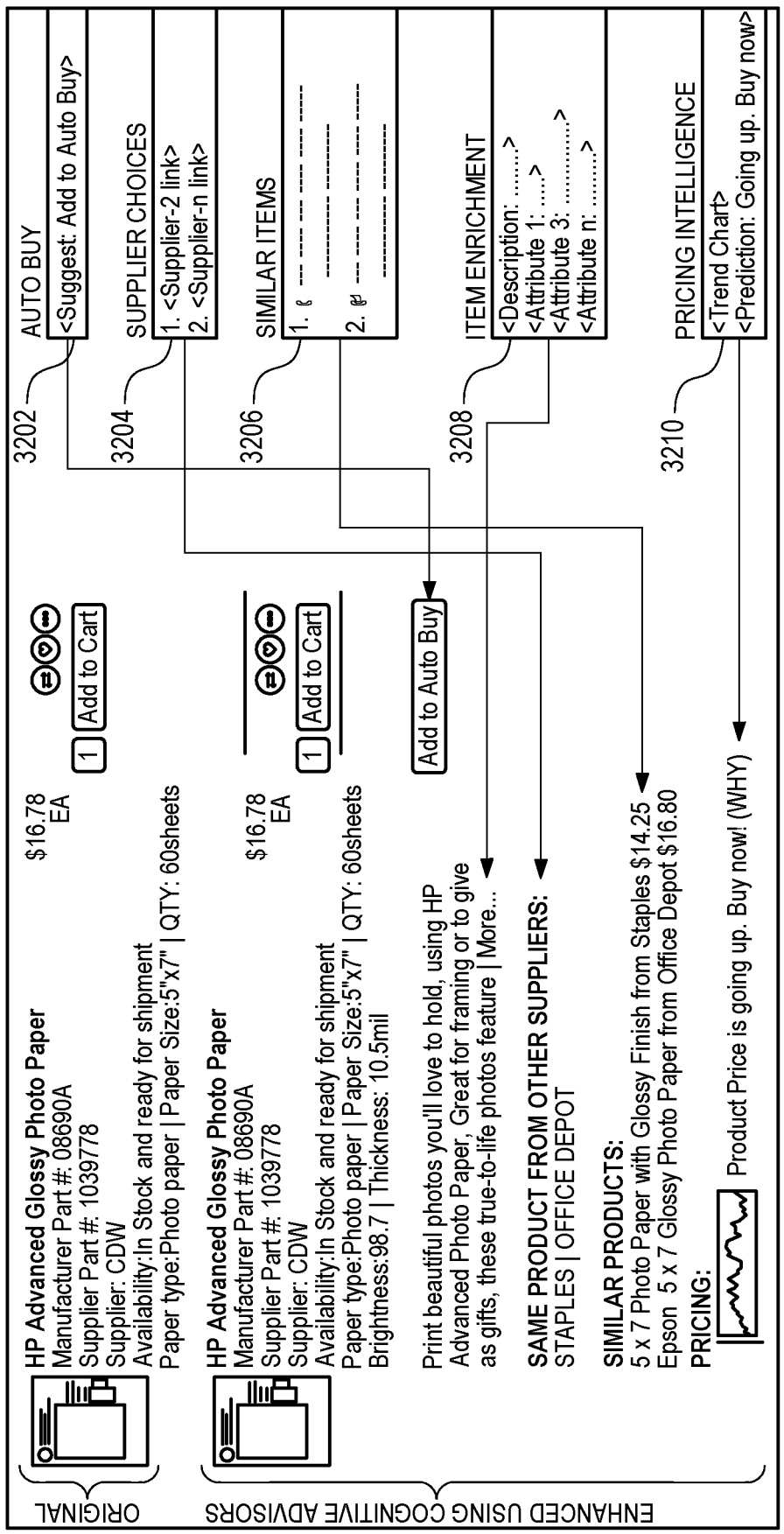
FIG. 32 shows an example configuration of five cognitive advisors for enhancing product item information.

These Cognitive Advisors may be triggered with a type "Product item recos" 3104. The input context provided may include one or more of: an individual product item 3106 (i.e., an item in search results, but also in any other desired context where a product item is in focus), query context 3108 which may have originated the product item, and user context. Each Cognitive Advisor that can enhance an individual product item may produce different information nuggets and/or actions for a user to take. FIG. 32 shows the example of five configured Cognitive Advisors for enhancing product item information, and how the five configured Cognitive Advisors specifically lead to enhanced item details and actions 3202, 3204, 3206, 3208, and 3210 shown to the user.

An "Auto Buy" Cognitive Advisor 3110 may also be implemented in the disclosed system. Users often buy some products with a certain regularity. Example: Paper, Printer Ink Cartridges, Consumable Office Supplies etc. The Auto Buy Cognitive Advisor 3110 mines the patterns of a given user's purchases to predict the typical frequency of repeat purchase of certain products. An Auto Buy facility will enable a given product to be automatically ordered at given frequency. The Auto Buy Cognitive Advisor 3110 can recommend that the user should consider adding the given product (seen presumably in a query result set) to the Auto Buy list.

A "Supplier Choices" Cognitive Advisor 3112 may also be implemented in the disclosed system. Within a given query result set, it is possible that the very same product item may be available from different suppliers (perhaps at different terms or prices or with different options). The Supplier Choices Cognitive Advisor 3112 mines the search result set and cart selection data from all users in the organization to present a short list of Suppliers (with links to the very same product item at those supplier sites or catalogs) to the user.

A "Similar Items" Cognitive Advisor may also be implemented in the disclosed system. There may be a set of similar product items available from the same or different suppliers, that are truly comparable. The Similar Items Cognitive Advisor extracts the brand, model, attributes and also mines the result set, the cart selections, past purchases and the global item master (if available) and presents a recommendation of up to three top items similar to the given product.

An "Item Enrichment" Cognitive Advisor 3116 may also be implemented in the disclosed system. Product item data quality varies widely across different suppliers, often missing key attribute information or even description, images, videos, specifications and the like. The Item Enrichment Cognitive Advisor 3116 mines the result set, the cart selections and past purchases, and the global item master (if available) and presents a recommendation of the specific aspects of the product item data that should be enriched. The benefit of doing so is to enable a user to work with the richest product item data available, to make better purchasing decisions.

A "Pricing Intelligence" Cognitive Advisor 3118 may also be implemented in the disclosed system. The phenomenon of price variation over time and across suppliers presents the real possibility that lower prices may exist for products being considered by a user during their search. In turn, several different approaches exist to monitor price trends and create price predictions. The Pricing Intelligence Cognitive Advisor 3118 taps into historical prices across products in different categories and recommends whether the user should buy now, or wait a given period, along with the confidence measure in its prediction.

Other Cognitive Advisors may be implemented in the disclosed system to Enhance Product Item Information. These may include, for example, a "Product Reviews" Cognitive Advisor. This Content Advisor taps into organizational, cross-organizational and public reviews around a product and provides a distilled summary of the top positive and top negative reviews on the product, as a recommendation to be presented with the product item.

Another example is a "Product Risk" Cognitive Advisor. Products may have quality issues, performance issues, or may have product claims not actually delivered by the product. Typically, this sort of feedback on product can be found in product reviews and product ratings within the organization, across organization boundaries, as well as online on many product complaint/feedback sites, online stores and even social media. While the data around product risks is out there, it is near impossible for a regular user to find it in a timely and consumable manner. The Product Risk Cognitive Advisor taps into organizational and cross-organizational sources of product feedback, and also product return patterns evidenced through the procurement system, and creates a simple, visual, consumable risk profile and risk rating, and returns that as a recommendation on a given product item.

Another example is a "Supplier Reviews" Cognitive Advisor. Taps into organizational, cross-organizations and public reviews around a supplier (or manufacturer) and provides a distilled summary of the top positive and top Another example is a "Supplier Risk" Cognitive Advisor. For select, high value products such as high-end devices, important or critical lab supplies, customized products, and overall non-commodity products, there is a risk profile around the supplier (and manufacturer) concerning viability, reliability, reputation and more. And in general, in a global setting, awareness of environmental factors, social-governmental factors, legal factors become increasingly important. There are vast pools of disparate information sources out on the public Internet and across specialized databases (blacklists from governmental sources, legal databases etc.), but it is nearly impossible to find information about risk on a given supplier (or manufacturer) in a timely and consumable manner. The Supplier Risk Cognitive Advisor taps into organizational and cross-organizations sources of product feedback and also collaboration and information exchanges with a given supplier including support request trails, and creates a simple, visual, consumable risk profile and risk rating, and returns that as a recommendation on a given product item.

One or more Cognitive Advisors may also be implemented for Enhancing a User's Experience. In addition to enhancing query results, or product item data, Cognitive Advisors can help enhance the overall user experience within a Procurement Marketplace and system. These could enhance a user's experience through their personal dashboard, the user's cart as they manage them, the user's compare tool and more. This may include, for example, an "Auto Order Reminder" Cognitive Advisor. When Auto Orders are used by a given user, this Cognitive Advisor creates the right requisition and places timely reminders to have the user confirm the repeat purchase.

Another example is a "Watched Products" Cognitive Advisor. The user can place products on a watchlist to get info on availability of one or more units, from one or more suppliers. This Cognitive Advisor places actionable notifications of the availability of the watched products when they are available from a given supplier.

Another example is a "Price Change" Cognitive Advisor. The user can place products on a price watchlist to get info on price shifts, based on threshold and rules specified, from one or more suppliers. This Cognitive Advisor places actionable notifications when the specified rules are met, along with broader Pricing Intelligence on the given product(s).

Another example is an "Auto Approve" Cognitive Advisor. If approval functionality is turned on in the Procurement Marketplace, where the user is responsible for approving purchase requisitions from others, the approval rules can be automated based on provided rules, as well as past approval patterns learned by a learning engine. When turned on in configuration, the Auto Approve Cognitive Advisor, will automatically conduct approval steps as appropriate and notify the user.

Another example is an "Auto Requisition Reminder" Cognitive Advisor. When a user makes requisitions, and approval functionality is turned on in the Procurement Marketplace, a workflow may be initiated where the user's requisition takes time to get approval. Procurement rules, workflow chains, holidays and general busy-ness can affect the efficiencies involved in this and can cause requisitions to get stuck beyond reasonable timeframes. The Auto Requisition Reminder Cognitive Advisor learns about approval patterns and times based on user, product category, cart size, historical approval chain times, urgency and such, and automatically manages pushing reminders and escalations to work on behalf of the user to get their requisition through to purchasing.

Another example is a "Requisition Rejection Prediction" Cognitive Advisor. When Procurement rules are complex and purchase policies are complex, confusing or simply not known to the buying user, requisitions can be made by users that may get rejected, wasting time and effort on part of all involved, and further creating a bad experience for users. The Requisition Rejection Prediction Cognitive Advisor learns from rejected requisitions, the conditions and contexts in which requisitions may be rejected, and provides warning with backing details to the user proactively even before a requisition is submitted, thereby arming the user with insights that could save a costly and painful process from even beginning up front.

Cognitive Advisors may also be implemented for Enhancing a Procurement Buyer's Experience. Procurement Buyers are specialists in one or more product categories and are usually responsible for sourcing efforts and creating supplier contracts with the promise of great savings, and further deploying such sourced contracts and suppliers into the Procurement Marketplace and guiding users to buy from said contracts to actualize the potential savings promised through those contracts.

Often what occurs is that users' shopping patterns don't match with the strategy and contracts set up by Procurement Buyers in different categories; i.e. the user shopping behavior can be said to be non-compliant, and this does not help to tap into procurement rules and expectations, and in turn, the savings are not actualized. A few specific situations would need to be addressed in this regard. For example, procurement buyers would have to provide actual contract information to the system so that the information contained in it can be used in real-time by the system. Systems implemented based on this disclosure may provide the means for the procurement buyers to do so. As another example, Suppliers would need to be carefully organized into categories, and tagged appropriately for their specific attributes (e.g. minority supplier, woman-owned supplier, veteran supplier etc.), so that the guided buying capability of an e-procurement system can operate as expected, suitably rank ordering product selections in the universal search experience. A system implemented based on this disclosure may provide the tools for this to be setup correctly.

On the other end of the spectrum, procurement buyers believe that their suppliers are providing them with the best prices, when the ground reality as witnessed in real-time may not be like this at all. Several specific situations emerge that it may be beneficial to solve. For example, suppliers promise a price in the contract, but the prices provided in the product listings in real-time are not matching what is provided in the contract. Real-time price audit checks, such as could be incorporated into a system implemented based on this disclosure, may provide a way to address this potential discrepancy that would contribute to savings leaks. As another example, the contracted price from suppliers may not be the best, or may not even be somewhat competitive, when compared with what other suppliers may provide in real-time for the same products being considered by users. In some systems implemented based on this disclosure, real-time price dispersion analytics may be provided as a way to address this potential discrepancy by providing the users with real-time alternative supplier and product choices, and by providing procurement buyers with real-time analytics on the same These capabilities cited enable the Procurement buyers to get suitable analytics to renegotiate with suppliers or choose to continue to business with them or drop them from their sourcing mix. Beyond these, Cognitive Advisors can bring another generational leap in enhancing the procurement buyer's experience. For example, one implemented Content Advisor may be a "Savings Predictor" Cognitive Advisor. For the categories under management by the procurement buyer, the Savings Predictor Cognitive Advisor analyzes savings actualized through the Procurement Marketplace to-date and learning from current buying and savings patterns within the category, creates a prediction about the likelihood of hitting the savings target set for the year in that category. Such savings prediction may be included in the category section of the procurement buyer's personal dashboard. This would enable the procurement buyer to examine the savings strategies and current implementation, and make suitable modification to strategies, configuration and other aspects to ensure that predicted savings can in fact be actualized.

Another example may include a "Supplier Savings Leak" Cognitive Advisor. By analyzing the spending patterns within a given supplier, in real-time, in the categories that a procurement buyer is responsible for, and learning from the transactional level as well as from the strategic level, the savings lost to date, due to the supplier's pricing not being competitive, this Cognitive Advisor prepares a prediction of the scale of the savings leak occurring with this supplier continuing to remain in the buying mix through the remainder period of the year. This would enable the procurement buyer to proactively modify the supplier mix or do midstream renegotiation with the suppliers in question to remedy the savings leaks.

Another example may include a "User Savings Leak" Cognitive Advisor. By analyzing the spending patterns across users, in real-time, in the categories that a procurement buyer is responsible for, and learning from the transactional details and contexts, the savings lost to date, due to the users' buying patterns and supplier choices, this Cognitive Advisor prepares a prediction of the scale of the savings leak occurring with each user and across users, and their root causes, and presents that to the procurement buyer. This would enable the procurement buyer to take suitable troubleshooting and specific steps to remedy the buying patterns of the users-at-risk who are contributing to the highest levels of savings leaks.

Another example may include a "Strategy Recommender" Cognitive Advisor. Using a mix of relevant savings strategies, and real-time learning of actual user spend behavior, savings leaks, supplier price competitiveness, supplier satisfaction and more, the Strategy Recommender Cognitive Advisor proposes strategies and configurations that are more likely to hit strategic objectives around spend and savings.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

3.5 Real-Time Adaptive Relevance for Procurement

[0212]

Figure 33:
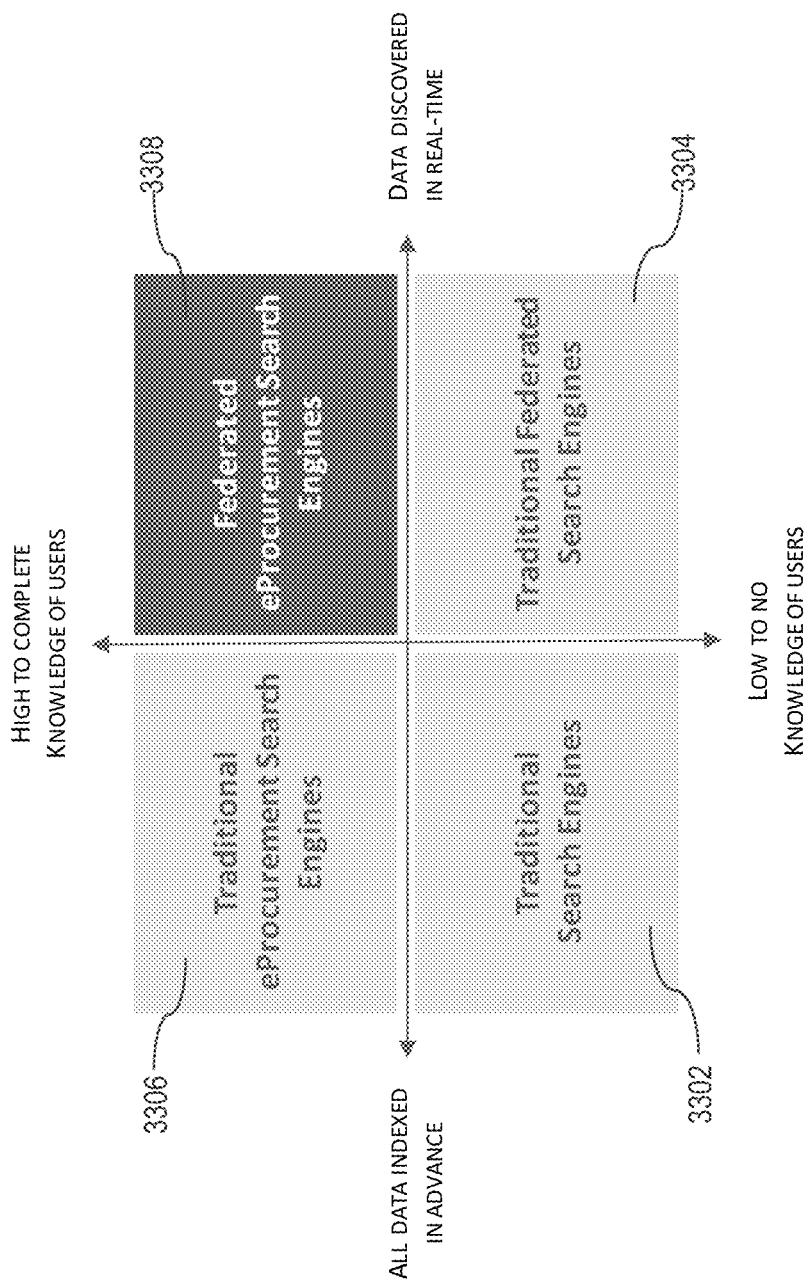
FIG. 33 shows a diagram comparing data availability and user knowledge in search scenarios.

Federated e-procurement systems provide both significant complexity in delivering relevant results as well as unique ways to address the problem of relevance within real-time universal search results from distributed disparate sources. Search engine behavior in a Federated e-procurement system can be compared and contrasted with the behaviors in traditional search systems, traditional federated search systems, and traditional e-procurement systems. An illustration of one way of performing this comparison that may apply to some embodiments is provided in FIG. 33.

For example, traditional search systems 3302 typically do not know a lot about the user or the organization context in detail such as user relationships to departments and purchasing permissions etc. but do have access to all the data a priori (i.e. they can search across only those data sources from which the data has been gathered and indexed for searching in advance). Many traditional federated search systems 3304 have neither the deep knowledge about users, nor have all the data a priori (i.e. they only find the data needed during federated searching of multiple distributed searchable sources). Many traditional e-procurement systems 3306 which do know a lot about the user AND have all the data a priori suffer from having to treat remote (e.g., punchout) sources as separate islands that the user cannot search across and would have to visit one at a time to conduct their searches for purchasing. In contrast, federated e-procurement systems 3308 may know a lot about the user, but little about all the data, often discovering the data needed in real-time during federated universal search contexts.

There are a variety of challenges in establishing relevance ranking in one or more of these systems. For example, traditional search engines 3302 typically have access to all the content that they make available for searching, and in turn, can use traditional relevance ranking factors including term frequency, inverse document frequency, document citation score and so forth.

Traditional federated search engines 3304 often cannot apply the approaches taken by traditional search engines to computing relevance scores for documents. In turn, federated search engines often use different approaches to relevance scoring, depending on the context in which they are deployed. An airline shopping engine, which might search across multiple airline websites, databases and booking sites, may establish relevance based on the price of the itineraries in the results or use other factors to create a proprietary relevance method. On the other hand, a federated e-procurement search engine 3308 might establish relevance based on recency of the published article, or the citations or views of the published articles from each connected journal source.

Many traditional e-procurement search engines 3306 rely on all the supplier and product data to be loaded in advance into their systems, typically in the form of so-called "hosted catalogs". With all the data available in advance, a search engine may be constructed in the normal ways that traditional search engines are constructed. Relevance ranking may borrow from techniques used by traditional search engines but may further be tuned based on richness of product information, supplier rankings, product rankings, product popularity, price and other factors.

Implementing a real-time universal search in federated e-procurement systems 3308 searching across hosted catalogs, punchout supplier websites, and other content sources, naturally face the challenge of finding and handling search results from disparate sources in real-time. For example, they do not necessarily have a priori knowledge of the content within remote, disparate sources, and would have to incorporate unique relevance ranking approaches to organize the search results.

Federated e-procurement systems 3308, such as those disclosed herein, may advantageously address real-time relevance ranking using different approaches, since none of the approaches taken by the other three types of systems being compared here would be able to address what is needed in a real-time federated universal search context encountered in a Federated e-procurement system.

Systems such as those disclosed herein may provide the asynchronous streaming of items, a core stream-based relevancy technique, the use of various relevance factors such as supplier preference, supplier item relevance, category relevance, and user preference. A configurable relevance tuner may also be provided that gives the organization, total control over the relevance factors for their specific environment.

While real-time cross-catalog relevance tuning is an advantage for e-procurement systems that implement a real-time federated universal search across distributed disparate sources, there are other issues that remain unaddressed. For example, remote sources could behave very differently in their handling of a given query. Differences in query grammar, native relevance ranking, and more can result in an overall different treatment across punchout supplier sources and other remote sources. As a result, in real-time universal federated search results in Procurement, it is possible to get some irrelevant results, even when relying on inputs such as "preferred" sources. The presence of irrelevant search results causes dissatisfaction on part of the users and could erode confidence in the real-time universal search paradigm altogether.

Despite efforts to improve in relevance ranking and tuning, the risk of irrelevant results coming into the mix is real in Federated e-procurement systems. However, Federated e-procurement systems do have richer knowledge of users, such as the department and divisions they work in, their peers who are user of the system, past product selections and purchases by themselves and other users, and other information.

The disclosed technology may, in some embodiments, enable Federated e-procurement systems to vastly reduce or eliminate irrelevant results that emerge from real-time universal federated searching of disparate sources in e-procurement. Rather than relying on relevance scoring and ranking approaches alone, some embodiments may be adapted to identify and eliminate irrelevant results from a real-time federated universal search result set in a Federated e-procurement context.

Figure 34:
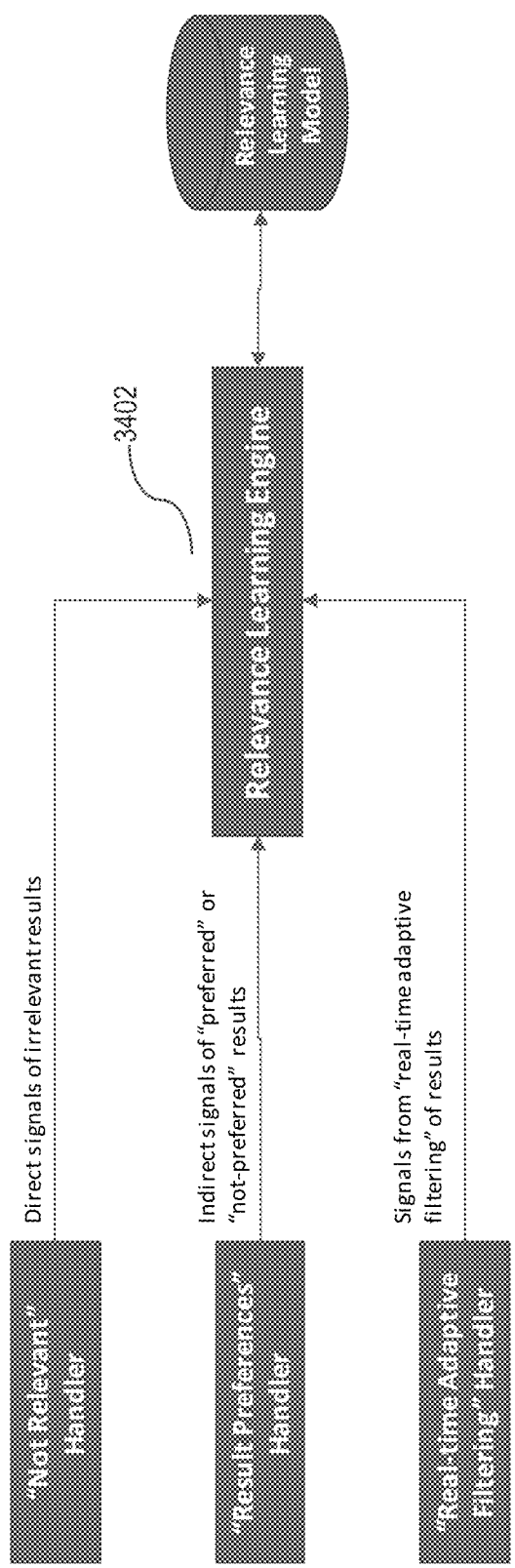
FIG. 34 shows an example set of inputs to a relevance learning engine.

Instead of relying solely on relevance scoring, relevance ranking, and tuning as the only approach to ensuring relevant results in a Federated e-procurement system, there is the opportunity to implement an adaptive relevance filtering approach that eliminates irrelevant results from being shown to the user in a Federated e-procurement system. An aspect of this adaptive relevance filtering approach is a Relevance Learning Engine, shown in FIG. 34. The purpose of this Relevance Learning Engine is that it continuously learns about the likely relevance of any given product result item to a given query for a given category for a given user context. As an example, the Relevance Learning Engine may be configured to continually learn from the following: direct signals of irrelevant results, indirect signals of preferred and not-preferred results, and real-time adaptive filtering of results.

Figure 35:
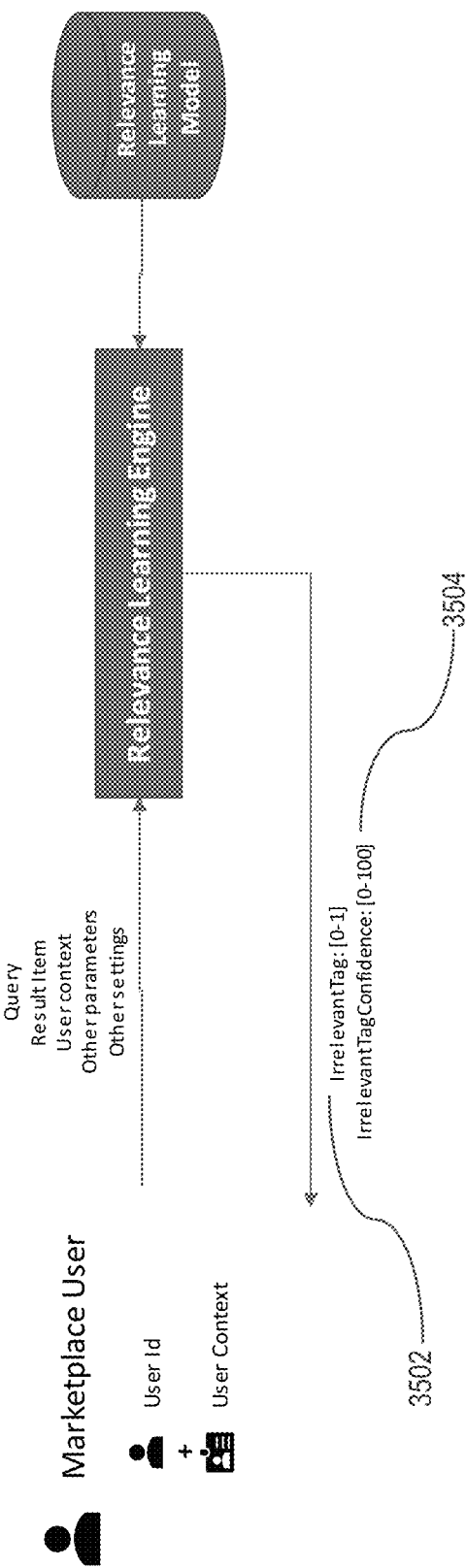
FIG. 35 shows an example application of the relevance learning engine to a universal search result item.

As seen in FIG. 35, when the Relevance Learning Engine is applied in the federated real-time universal search process, every relevance scored search result item may be sent to the Relevance Learning Engine 3402 which provides an indicator 3502 whether the item is Irrelevant to the context provided, and a degree of confidence 3504 in that assessment. In some embodiments, a federated search results handler may then apply this irrelevance indicator where there is high confidence and remove them from the user's view.

Figure 36:
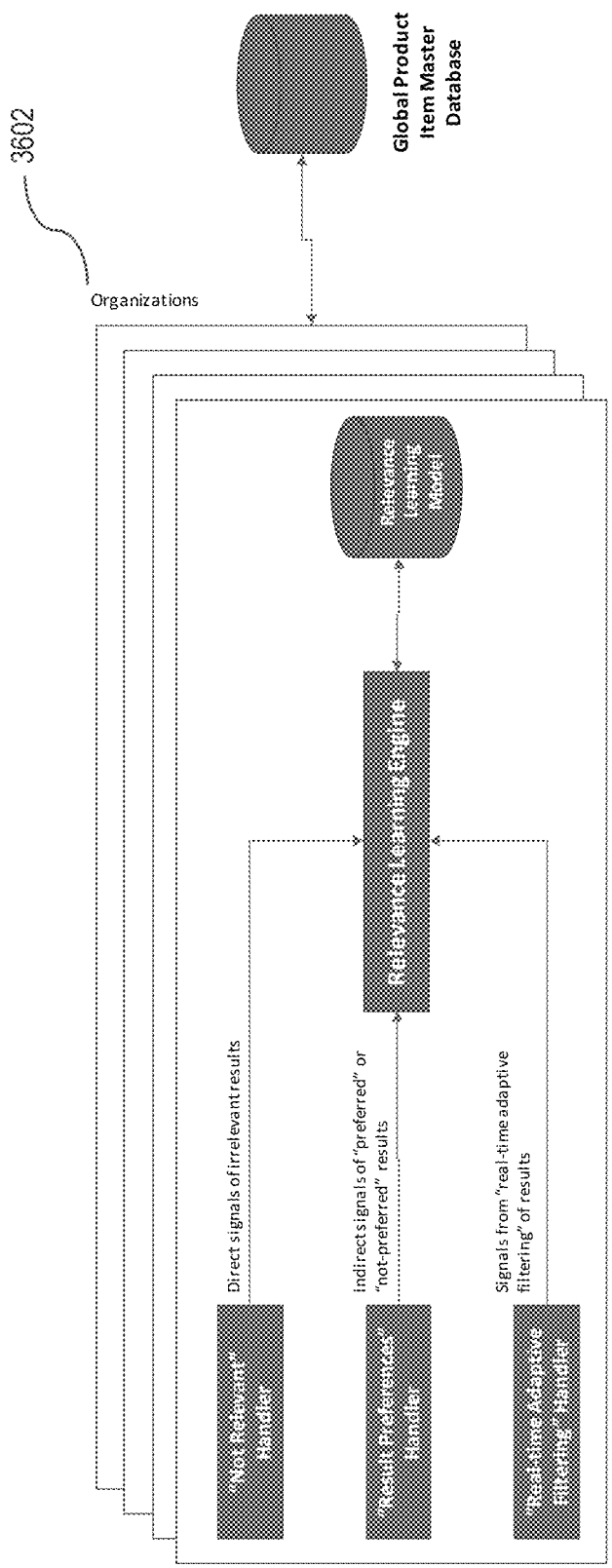
FIG. 36 shows an example process for continuous enrichment of a global product item master database with relevance learning models.

As shown in FIG. 36, in some embodiments a Relevance Learning Model across different organizations 3602 may also be further provided, with suitable anonymization as needed, to a Global Product Item Master Database to continually grow the wealth of knowledge about any product encountered in e-procurement across the entire set of organizations using it. The growing richness of information around product, product selection and preference, product purchase, product relevance in different contexts in the Global Product Item Master Database may be used to provide continual enrichment of the Universal Search experience across any given organization, and the functioning of Cognitive Advisors within any given organization. In some embodiments, Cognitive Advisors may include processes that process such information in real-time to provide users various features and recommendations based upon their configured purpose and input data.

Figure 37:
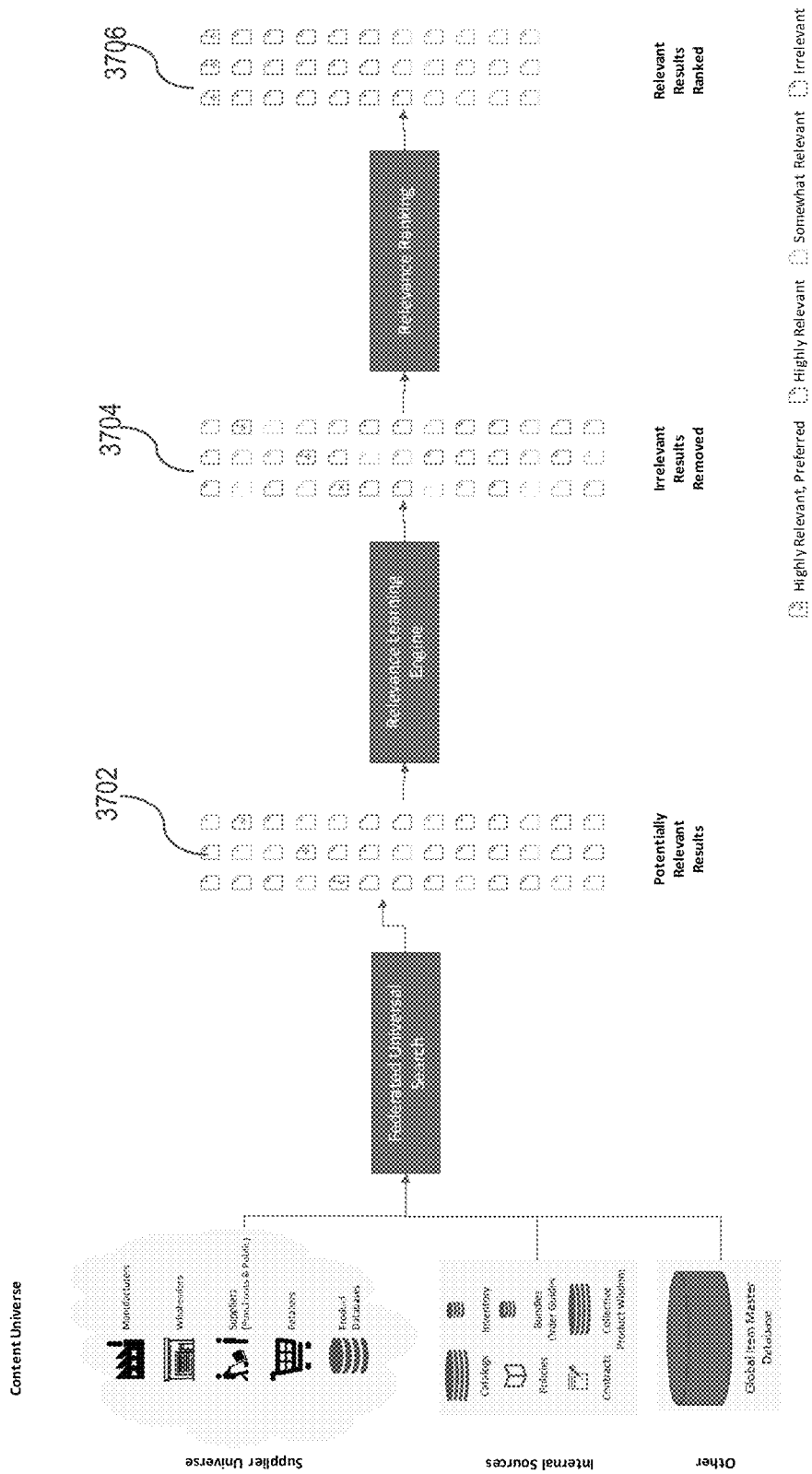
FIG. 37 shows an example process for adaptive relevance filtering.

Whether implemented individually or in combination, a Relevance Learning Engine and a Relevance Ranking may each play distinct roles in the Federated Universal Search in e-procurement. FIG. 37 shows an example of a process for adaptive relevance filtering in e-procurement. The Relevance Learning Engine approach outlined herein aims to deliver relevant results by focusing on finding and eliminating irrelevant results. As shown in FIG. 37, one feature that may be provided in some embodiments for a real-time relevance processing pipeline is that it is suitable in a real-time federated universal search for products in Federated e-procurement.

With each search result 3704 in the universal search result set gathered in real-time, the user is presented with an action link (or button) called "Not Relevant". A user can mark a given search result as "Not Relevant" as they see fit. When the user marks a given search result as "Not Relevant", the system may perform one or more of the following: record the entire context of the user, the query context, the result context including the source which produced the result and its rank order and more, hide this result item from the search results for this user, push this action with complete context to the Relevance Learning Engine, which may be configured to learn about irrelevant results for given contexts, and provide access to hidden results via a separate link provided at the top of the search results (e.g., "Show Hidden Results (n)", where "n" is the number of hidden results).

The Relevance Learning Engine may advantageously improve the relevance of search results in a variety of ways. For example, when the same user does the same query later, the previously hidden result may be hidden from the user's view, which then shows only relevant results 3704. This can be accomplished by, for example, associating values with characteristics of the results (e.g., IrrelevantTag=1, IrrelevantTagConfidence=100) that are available to the Relevance Learning Engine. When the same user does a similar query at any time, the previously hidden result is hidden or suitably ranked lower based on the similarity of the query to the original query context in which the result item was originally hidden. This leads to ranked relevant results 3706. This can be accomplished by, for example, examining a value (e.g., IrrelevantTag) returned by the Relevance Learning Engine for the particular result context.

When other users in the same department/division as the given user, perform the same or similar queries, the previously hidden results may have their relevance score dampened significantly to push them down the search result list based upon the associated value (e.g., IrrelevantTag and IrrelevantTagConfidence).

When other users in different departments or divisions from a particular user perform the same or similar queries, the previously hidden results may have their relevance score dampened somewhat to push them towards the later part of the search result list, again based upon the associated values and characteristics (e.g., IrrelevantTag and IrrelevantTagConfidence).

Other users are given the option, from within the interface to see Hidden search results, to Unhide a result that they deem relevant, but was hidden before. This signal is also captured with complete context and sent into the relevance learning engine. Over time, the relevance learning engine adapts and improves the relevance of search results by hiding or lowering the rank of potentially irrelevant search results.

FIG. 38 shows an example of a dataset produced by the act of one or more users hiding a given search result item for a given query. The action 3802 associated with each user 3804 may be performed to influence search results containing the same item for other users in different user and query contexts.

There are a number of advantages that this approach of identifying irrelevant results from direct signals may provide. For example, some embodiments may take advantage of the fact that a Federated e-procurement provider may know the user identity, and practically all search engine implementations tend to be created with a focus on letting the users view and consume a search result set produced by the search engine. As a result, users cannot manipulate the result set directly. By contrast, some embodiments, may offer the users the direct ability to modify their personal search experience by marking select products in the search result listing as "Not Relevant."

As another advantage, since Federated e-procurement systems are usually tailored to specific organization needs, and the users of such tailored system are only the authorized users of the organization, the risk that exists in traditional systems of users "gaming" the search engine for their own motives does not exist. As a result, this is a trusted user context in which it is safe to let the user modify their universal search result sets as they deem personally useful.

As another example advantage, the direct signal of "Not Relevant" from a given user in a given context for a given search for a given product item listed in universal search results, not only directly benefits them by removing the clutter of irrelevant results from their result set, but may also enable the entire organization to benefit from it through the use of the Relevance Learning Engine. Other advantages and benefits exist, and will be apparent to those of ordinary skill in the art in light of this disclosure.

Additionally, in some embodiments, irrelevant results, preferred results, and not-preferred results may also be identified based upon indirect signals. In a Federated e-procurement system, there are many indirect signals of a given user's preference or non-preference for a given product in a given context. Here are some specific types of "indirect signals" of product preference. Some examples are described below.

For a given query, in the universal search result set, when a user goes past, say, the first 5 results and first clicks on the 6th search result to see their details, or perhaps adds the 8th search result directly to the cart while ignoring the first 7 results, these are strong signals of user's preference for one search result over another.

Clicking on an item detail page, adding an item to be compared with other items, saving the item as a favorite, adding an item to a bundle or order guide, adding an item to the cart, purchasing a given item . . . all these are increasingly stronger signals of preference for a given search result item over another (a given product over another). Items that are overlooked and not even clicked on to view their details are clearly not preferred by the user.

Typically, these signals are not utilized in a relevance learning process. However, some embodiments of the disclosed technology may implement the entire query and search results interaction as well as the interaction with all aspects that deal with individual items (like compare, favorites, bundles, order guides, cart etc.), and thus capture these indirect signals on a granular level about user preferences in every given query context. This is fed into the Relevance Learning Engine. The Relevance Learning Engine in turn formulates a model of preference for an item in a context across all users.

Effectively, the signals of preference are factored into the Relevance Learning Engine's dataset as values such as the "IrrelevantTag" score for any given product item in any given query and user context. This approach of learning from indirect signals of product preferences provides a variety of advantages. For example, in some embodiments an e-procurement platform may take advantage of the fact that it knows the user identity, and knows a lot more about the user's context.

Similarly, some embodiments may extrapolate the value of these indirect signals from this user to their value to other peers of that user in their department or division, and further out to other users in their business region, and still further out to users in the organization as a whole in a suitable manner through the Relevance Learning Engine.

By default, a real-time universal federated search system, would try to do real-time streaming of results into the end-user interface to engender a snappy, high performance, speedy user experience. For certain, more complex queries, despite the many different ways to enhance relevance ranking, the search results may still be filled with irrelevant results, due mostly in part to the poor handling of complex queries in punchout supplier sites or other remote sources.

Figure 39:
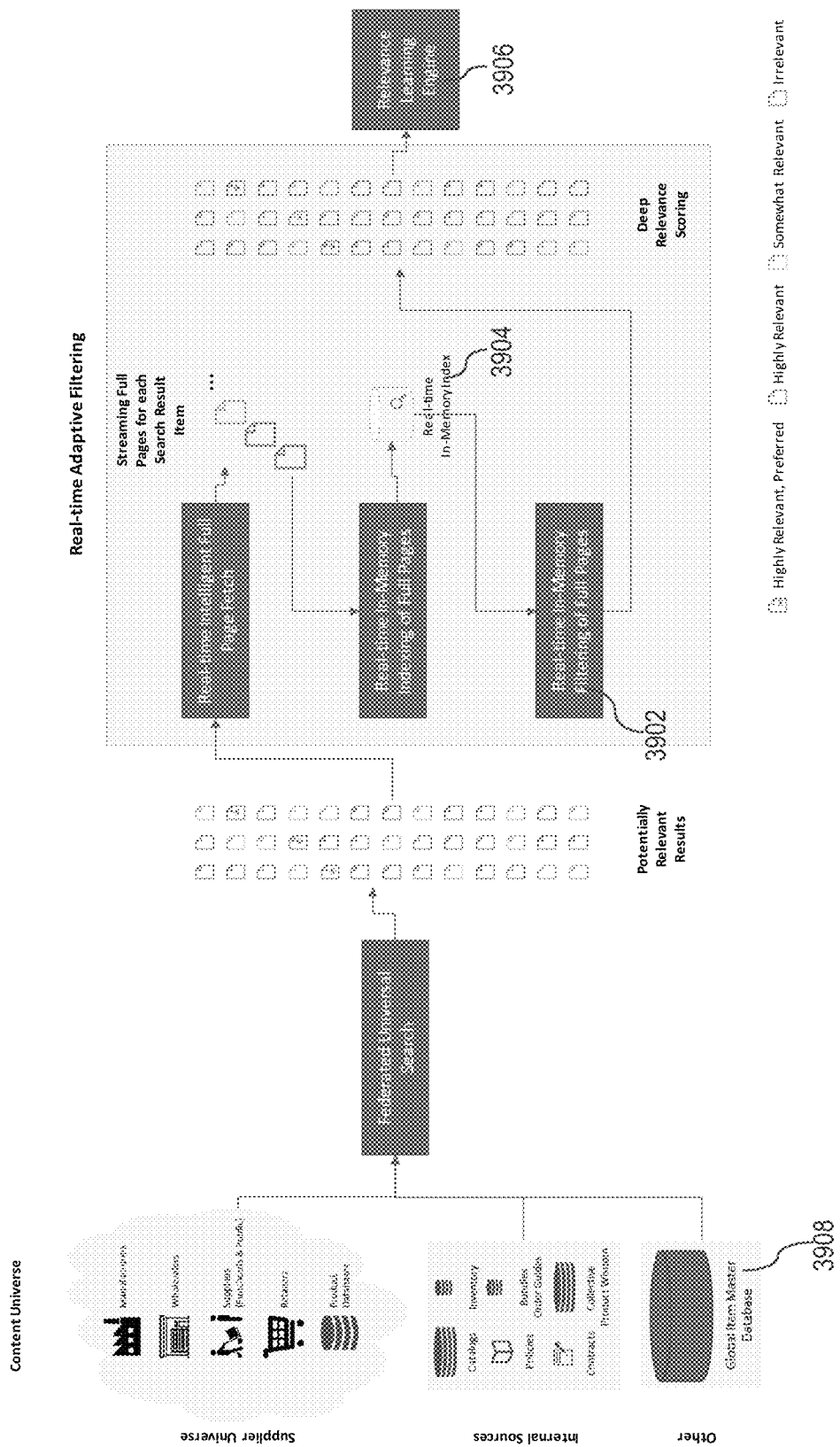
FIG. 39 shows an example process for deep relevance scoring with real-time adaptive filtering.

To handle this type of need, a system implemented based on this disclosure may implement a "Give me only relevant results" option, a so-called "High relevance only mode". When the user chooses to see only relevant results, the system may perform one or more of the following: as raw search results are streaming from multiple sources, the system queues each raw search result for fetching their full result pages, the queue is adaptively managed so that multiple requests for pages from any given remote source is politely handled, while ensuring that the user experience is not slowed down, each full result page is processed to extract rich metadata including description, attributes and values from product specifications and more, each item detail record thus gathered from each full result page is queued for adding into an in-memory full-text index, a new relevance score is assigned to all pages, which can be thought of as a "Deep Relevance Score" from real-time analysis of every search result page for relevance based on content about the product retrieved from its source in the moment (e.g., FIG. 39 shows an example process for Deep Relevance Scoring with real-time adaptive filtering 3902), the full query context (including all the complex query terms and constraints the user may have provided) is applied on the in-memory full-text index 3904, and any matching result is scored and tagged with other standard criteria for relevance ranking and streamed in real-time to be presented to the end user, the complete details of both relevant and irrelevant items are fed into the Relevance Learning Engine 3906, and the item detail record is dispatched into the Global Product Item Master database 3908 for updating information on known items. This real-time adaptive filtering approach streams to the user interface only relevant results in real-time, thus compensating for the vagaries and limitations of remote sources and punchout supplier sites.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

4. Example Processes

FIG. 40 discussed below is shown in simplified, schematic format for purposes of illustrating a clear example and other embodiments may include more, fewer, or different elements connected in various manners. FIG. 40 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 40 illustrates an example process performed by a server of enabling multiple cognitive advisors in a cognitive advisor framework for processing user queries.

In some embodiments, in step 4002, the server is programmed or configured to maintain a database containing buyer data and supplier data. The buyer data is related to buyer organization hierarchies and buyer online activities, the buyer online activities including browsing product pages, selecting product data for review, adding products to shopping lists or carts, providing product or supplier reviews, obtaining requisitions or purchase orders, and placing product orders. The supplier data is related to suppliers, products, and invoices. The buyer organizational hierarchies can include data related to a company, a division, a region, or a department.

In some embodiments, in step 4004, the server is programmed or configured to receive a query associated with a buyer account.

In some embodiments, in step 4006, the server is programmed or configured to compute a query context for the query that includes buyer items and additional items derived from the query based on the database. The buyer items include a level of an organizational hierarchy in which the buyer account fits. The buyer items can also include a geographic location or a supplier preference of the buyer account.

In some embodiments, the query identifies a specific product. Computing the query context comprises including as the additional items a product category of the specific product or a list of products similar to the specific products based on a similarity measure.

In some embodiments, in step 4008, the server is programmed or configured to select a plurality of cognitive advisors from a group of cognitive advisors based on the query context. Each of the group of cognitive advisors being a digital model has a distinct set of input parameters and output data. The output data is a recommendation of one or more products or supplier accounts.

In some embodiments, a specific cognitive advisor of the group of cognitive advisors has a level of an organizational hierarchy as an input parameter and is configured to search the buyer data associated with buyer accounts that fit in the level.

In some embodiments, the server can be configured to further determine an execution order among the plurality of cognitive advisors. In step 4010, the server is programmed or configured to execute the plurality of cognitive advisors to generate a corresponding plurality of lists of results in the execution order.

In some embodiments, in step 4012, the server is programmed or configured to cause displaying a summary of the plurality of lists of results and detail related to a specific list of results of the plurality of lists of results. The server can be configured to further cause displaying an option to view an explanation for the specific list of results on one page. In some embodiments, the server can be configured to further determine a display order among the plurality of cognitive advisors such that the summary of the plurality of lists of results is in an accordion format, with a plurality of sections respectively for the plurality of lists arranged in the display order. The displaying can comprise, when a particular section of the plurality of sections is selected, collapsing any other section that is expanded, expanding the particular section, and replacing detail related to the specific list of results by detail related to a particular list of results corresponding to the particular section.

In some embodiments, the server is programmed or configured to record a selection of the particular section or a selection of an entry on the particular list of results in the database.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 41:
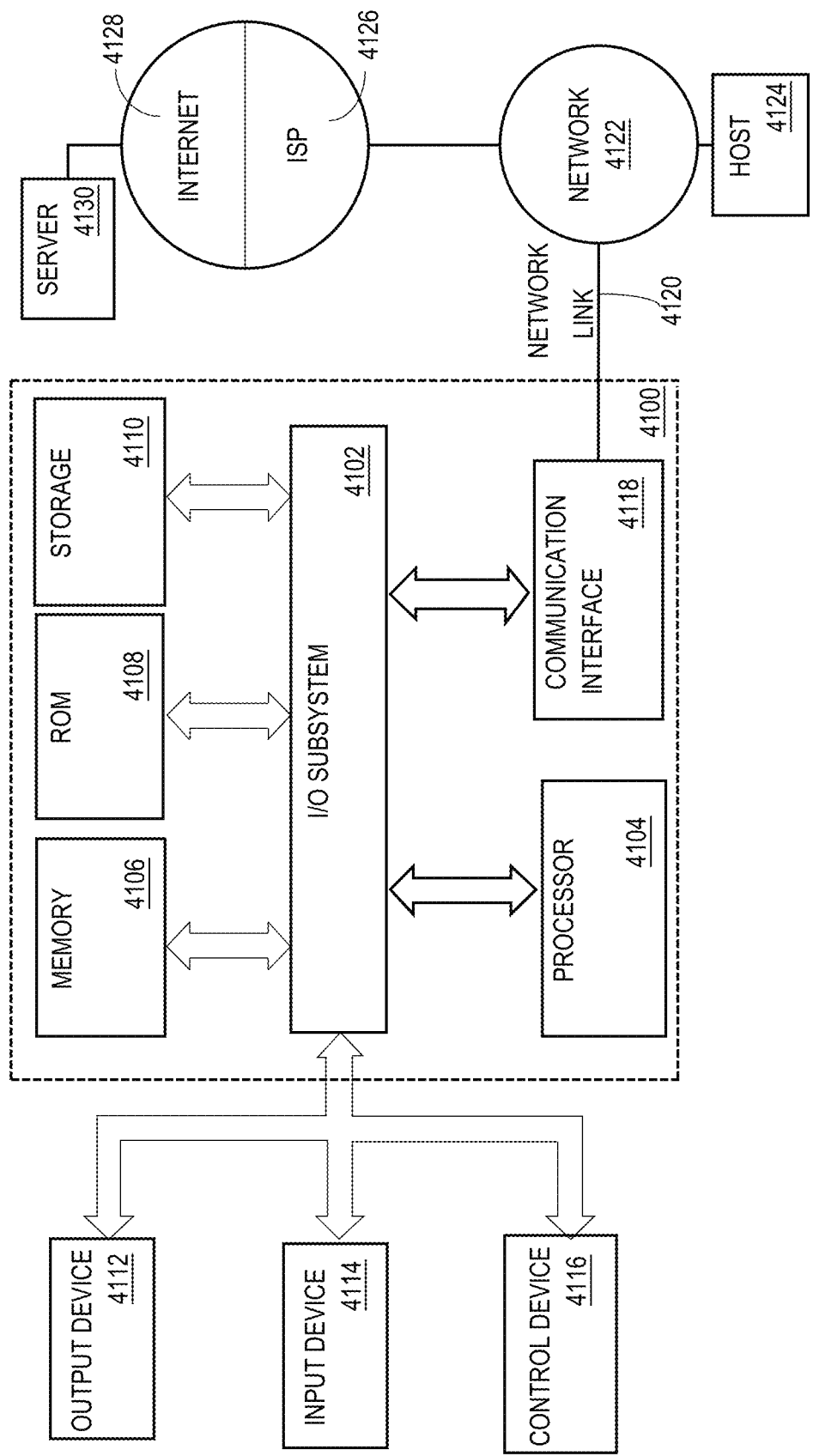
FIG. 41 is a block diagram that illustrates a computer system upon which an embodiment of the invention may be implemented.

FIG. 41 is a block diagram that illustrates an example computer system with which an embodiment may be implemented. In the example of FIG. 41, a computer system 4100 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 4100 includes an input/output (I/O) subsystem 4102 which may include a bus and/or other communication mechanism(s) for communicating information and/or instructions between the components of the computer system 4100 over electronic signal paths. The I/O subsystem 4102 may include an I/O controller, a memory controller and at least one I/O port. The electronic signal paths are represented schematically in the drawings, for example as lines, unidirectional arrows, or bidirectional arrows.

At least one hardware processor 4104 is coupled to I/O subsystem 4102 for processing information and instructions. Hardware processor 4104 may include, for example, a general-purpose microprocessor or microcontroller and/or a special-purpose microprocessor such as an embedded system or a graphics processing unit (GPU) or a digital signal processor or ARM processor. Processor 4104 may comprise an integrated arithmetic logic unit (ALU) or may be coupled to a separate ALU.

Computer system 4100 includes one or more units of memory 4106, such as a main memory, which is coupled to I/O subsystem 4102 for electronically digitally storing data and instructions to be executed by processor 4104. Memory 4106 may include volatile memory such as various forms of random-access memory (RAM) or other dynamic storage device. Memory 4106 also may be used for storing temporary variables or other intermediate information during execution of instructions to be executed by processor 4104. Such instructions, when stored in non-transitory computer-readable storage media accessible to processor 4104, can render computer system 4100 into a special-purpose machine that is customized to perform the operations specified in the instructions.

Computer system 4100 further includes non-volatile memory such as read only memory (ROM) 4108 or other static storage device coupled to I/O subsystem 4102 for storing information and instructions for processor 4104. The ROM 4108 may include various forms of programmable ROM (PROM) such as erasable PROM (EPROM) or electrically erasable PROM (EEPROM). A unit of persistent storage 4110 may include various forms of non-volatile RAM (NVRAM), such as FLASH memory, or solid-state storage, magnetic disk or optical disk such as CD-ROM or DVD-ROM, and may be coupled to I/O subsystem 4102 for storing information and instructions. Storage 4110 is an example of a non-transitory computer-readable medium that may be used to store instructions and data which when executed by the processor 4104 cause performing computer-implemented methods to execute the techniques herein.

The instructions in memory 4106, ROM 4108 or storage 4110 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 4100 may be coupled via I/O subsystem 4102 to at least one output device 4112. In one embodiment, output device 4112 is a digital computer display. Examples of a display that may be used in various embodiments include a touch screen display or a light-emitting diode (LED) display or a liquid crystal display (LCD) or an e-paper display. Computer system 4100 may include other type(s) of output devices 4112, alternatively or in addition to a display device. Examples of other output devices 4112 include printers, ticket printers, plotters, projectors, sound cards or video cards, speakers, buzzers or piezoelectric devices or other audible devices, lamps or LED or LCD indicators, haptic devices, actuators or servos.

At least one input device 4114 is coupled to I/O subsystem 4102 for communicating signals, data, command selections or gestures to processor 4104. Examples of input devices 4114 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 4116, which may perform cursor control or other automated control functions such as navigation in a graphical interface on a display screen, alternatively or in addition to input functions. Control device 4116 may be a touchpad, a mouse, a trackball, or cursor direction keys for communicating direction information and command selections to processor 4104 and for controlling cursor movement on display 4112. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 4114 may include a combination of multiple different input devices, such as a video camera and a depth sensor.

In another embodiment, computer system 4100 may comprise an internet of things (IoT) device in which one or more of the output device 4112, input device 4114, and control device 4116 are omitted. Or, in such an embodiment, the input device 4114 may comprise one or more cameras, motion detectors, thermometers, microphones, seismic detectors, other sensors or detectors, measurement devices or encoders and the output device 4112 may comprise a special-purpose display such as a single-line LED or LCD display, one or more indicators, a display panel, a meter, a valve, a solenoid, an actuator or a servo.

When computer system 4100 is a mobile computing device, input device 4114 may comprise a global positioning system (GPS) receiver coupled to a GPS module that is capable of triangulating to a plurality of GPS satellites, determining and generating geo-location or position data such as latitude-longitude values for a geophysical location of the computer system 4100. Output device 4112 may include hardware, software, firmware and interfaces for generating position reporting packets, notifications, pulse or heartbeat signals, or other recurring data transmissions that specify a position of the computer system 4100, alone or in combination with other application-specific data, directed toward host 4124 or server 4130.

Computer system 4100 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 4100 in response to processor 4104 executing at least one sequence of at least one instruction contained in main memory 4106. Such instructions may be read into main memory 4106 from another storage medium, such as storage 4110. Execution of the sequences of instructions contained in main memory 4106 causes processor 4104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 4110. Volatile media includes dynamic memory, such as memory 4106. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 4102. Transmission media can also take the form of acoustic or light waves, such as those generated during radio-wave and infra-red data communications.

Various forms of media may be involved in carrying at least one sequence of at least one instruction to processor 4104 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 4100 can receive the data on the communication link and convert the data to be read by computer system 4100. For instance, a receiver such as a radio frequency antenna or an infrared detector can receive the data carried in a wireless or optical signal and appropriate circuitry can provide the data to I/O subsystem 4102 such as place the data on a bus. I/O subsystem 4102 carries the data to memory 4106, from which processor 4104 retrieves and executes the instructions. The instructions received by memory 4106 may optionally be stored on storage 4110 either before or after execution by processor 4104.

Computer system 4100 also includes a communication interface 4118 coupled to bus 4102. Communication interface 4118 provides a two-way data communication coupling to network link(s) 4120 that are directly or indirectly connected to at least one communication networks, such as a network 4122 or a public or private cloud on the Internet. For example, communication interface 4118 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 4122 broadly represents a local area network (LAN), wide-area network (WAN), campus network, internetwork or any combination thereof. Communication interface 4118 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 4118 sends and receives electrical, electromagnetic or optical signals over signal paths that carry digital data streams representing various types of information.

Network link 4120 typically provides electrical, electromagnetic, or optical data communication directly or through at least one network to other data devices, using, for example, satellite, cellular, Wi-Fi, or BLUETOOTH technology. For example, network link 4120 may provide a connection through a network 4122 to a host computer 4124.

Furthermore, network link 4120 may provide a connection through network 4122 or to other computing devices via internetworking devices and/or computers that are operated by an Internet Service Provider (ISP) 4126. ISP 4126 provides data communication services through a world-wide packet data communication network represented as internet 4128. A server computer 4130 may be coupled to internet 4128. Server 4130 broadly represents any computer, data center, virtual machine or virtual computing instance with or without a hypervisor, or computer executing a containerized program system such as DOCKER or KUBERNETES.

Server 4130 may represent an electronic digital service that is implemented using more than one computer or instance and that is accessed and used by transmitting web services requests, uniform resource locator (URL) strings with parameters in HTTP payloads, API calls, app services calls, or other service calls. Computer system 4100 and server 4130 may form elements of a distributed computing system that includes other computers, a processing cluster, server farm or other organization of computers that cooperate to perform tasks or execute applications or services. Server 4130 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 4130 may comprise a web application server that hosts a presentation layer, application layer and data storage layer such as a relational database system using structured query language (SQL) or no SQL, an object store, a graph database, a flat file system or other data storage.

Computer system 4100 can send messages and receive data and instructions, including program code, through the network(s), network link 4120 and communication interface 4118. In the Internet example, a server 4130 might transmit a requested code for an application program through Internet 4128, ISP 4126, local network 4122 and communication interface 4118. The received code may be executed by processor 4104 as it is received, and/or stored in storage 4110, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 4104. While each processor 4104 or core of the processor executes a single task at a time, computer system 4100 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of enabling multiple cognitive advisors in a cognitive advisor framework for processing user queries, comprising:
   maintaining, by a processor, a database containing buyer data and supplier data,
      the buyer data being related to buyer organization hierarchies and buyer online activities,
      the buyer online activities including browsing product pages, selecting product data for review, adding products to shopping lists or carts, providing product or supplier reviews, obtaining requisitions or purchase orders, or placing product orders,
      the supplier data being related to suppliers, products, and invoices;
   receiving, by the processor, a query inputted on a user device associated with a buyer account;
   computing, by the processor, a query context for the query that includes buyer items and additional items derived from the query based on the database, the buyer items being associated with a level of an organizational hierarchy in which the buyer account fits;
   selecting a plurality of cognitive advisors from a group of cognitive advisors based on the query context,
      each of the group of cognitive advisors being a digital model having a distinct set of input parameters and output data,
      a specific cognitive advisor of the group of cognitive advisors having a level of an organizational hierarchy as an input parameter and being configured to search the buyer data associated with buyer accounts that fit in the inputted level of organization hierarchy, the output data being a recommendation of one or more products or supplier accounts;
   executing the plurality of cognitive advisors to generate a corresponding plurality of lists of results;
   sending, by the processor, instructions to the user device for displaying a summary of the plurality of lists of results and detail related to a specific list of results of the plurality of lists of results.

2. The computer-implemented method of claim 1, further comprising determining an execution order among the plurality of cognitive advisors the executing being performed in the execution order.

3. The computer-implemented method of claim 1, further comprising determining a display order among the plurality of cognitive advisors, the summary of the plurality of lists of results being in an accordion format with a plurality of sections respectively for the plurality of lists arranged in the display order.

4. The computer-implemented method of claim 3, the displaying comprising, when a particular section of the plurality of sections is selected, collapsing any other section that is expanded, expanding the particular section, and replacing detail related to the specific list of results by detail related to a particular list of results corresponding to the particular section.

5. The computer-implemented method of claim 4, further comprising recording a selection of the particular section or a selection of an entry on the particular list of results.

6. The computer-implemented method of claim 1,
   the query identifying a specific product,
   the additional items derived from the query indicating a product category of the specific product or including a list of products similar to the specific products based on a similarity measure.

7. The computer-implemented method of claim 1, the buyer items further being associated with a geographic location or a supplier preference of the buyer account.

8. The computer-implemented method of claim 1, further comprising causing displaying an option to view an explanation for the specific list of results.

9. The computer-implemented method of claim 1, the specific cognitive advisor being configured to recommend a bundle of products given a specific product identifier or a specific role within the level of an organizational hierarchy.

10. One or more non-transitory storage media storing instructions which, when executed by one or more processors, cause performance of a method of enabling multiple cognitive advisors in a cognitive advisor framework for processing user queries, the method comprising:
   maintaining, by a processor, a database containing buyer data and supplier data,
      the buyer data being related to buyer organization hierarchies and buyer online activities,
      the buyer online activities including browsing product pages, selecting product data for review, adding products to shopping lists or carts, providing product or supplier reviews, obtaining requisitions or purchase orders, or placing product orders,
      the supplier data being related to suppliers, products, and invoices;
   receiving, by the processor, a query inputted on a user device associated with a buyer account;
   computing, by the processor, a query context for the query that includes buyer items and additional items derived from the query based on the database, the buyer items being associated with a level of an organizational hierarchy in which the buyer account fits;

selecting a plurality of cognitive advisors from a group of cognitive advisors based on the query context, each of the group of cognitive advisors being a digital model having a distinct set of input parameters and output data, a specific cognitive advisor of the group of cognitive advisors having a level of an organizational hierarchy as an input parameter and being configured to search the buyer data associated with buyer accounts that fit in the inputted level of organization hierarchy, the output data being a recommendation of one or more products or supplier accounts;

executing the plurality of cognitive advisors to generate a corresponding plurality of lists of results;

sending, by the processor, instructions to the user device for displaying a summary of the plurality of lists of results and detail related to a specific list of results of the plurality of lists of results.

11. The one or more non-transitory storage media of claim 10, the method further comprising determining an execution order among the plurality of cognitive advisors, the executing being performed in the execution order.

12. The one or more non-transitory storage media of claim 10, the method further comprising determining a display order among the plurality of cognitive advisors, the summary of the plurality of lists of results being in an accordion format with a plurality of sections respectively for the plurality of lists arranged in the display order.

13. The one or more non-transitory storage media of claim 12, the displaying comprising, when a particular section of the plurality of sections is selected, collapsing any other section that is expanded, expanding the particular section, and replacing detail related to the specific list of results by detail related to a particular list of results corresponding to the particular section.

14. The one or more non-transitory storage media of claim 13, the method further comprising recording a selection of the particular section or a selection of an entry on the particular list of results.

15. The one or more non-transitory storage media of claim 10, the query identifying a specific product, the additional items derived from the query indicating a product category of the specific product or including a list of products similar to the specific products based on a similarity measure.

16. The one or more non-transitory storage media of claim 10, the buyer items further being associated with a geographic location or a supplier preference of the buyer account.

17. The one or more non-transitory storage media of claim 10, the method further comprising causing displaying an option to view an explanation for the specific list of results.

18. The one or more non-transitory storage media of claim 10, the specific cognitive advisor being configured to recommend a bundle of products given a specific product identifier or a specific role within the level of an organizational hierarchy.

* * * * *